United States Patent
Kotik et al.

(10) Patent No.: US 12,080,903 B2
(45) Date of Patent: Sep. 3, 2024

(54) PRESSURE MANAGEMENT DEVICE FOR BATTERY PACK

(71) Applicants: Robert Bosch GmbH, Stuttgart (DE); Nikola Corporation, Phoenix, AZ (US); Mark Kotik, Rochester Hills, MI (US); Adam Bisaro, Shelby Township, MI (US); Kevin Mitchell Lynk, Phoenix, AZ (US); Anthony Albert Heaton, Chandler, AZ (US); Sebastian Schoch, Ingersheim (DE)

(72) Inventors: Mark Kotik, Rochester Hills, MI (US); Adam Bisaro, Shelby Township, MI (US); Kevin Mitchell Lynk, Phoenix, AZ (US); Anthony Albert Heaton, Chandler, AZ (US); Sebastian Schoch, Ingersheim (DE)

(73) Assignees: Robert Bosch GmbH, Stuttgart (DE); Nikola Corporation, Phoenix, AZ (US)

( * ) Notice: Subject to any disclaimer, the term of this patent is extended or adjusted under 35 U.S.C. 154(b) by 505 days.

(21) Appl. No.: 17/600,022

(22) PCT Filed: Mar. 29, 2020

(86) PCT No.: PCT/US2020/025604
§ 371 (c)(1),
(2) Date: Sep. 29, 2021

(87) PCT Pub. No.: WO2020/214389
PCT Pub. Date: Oct. 22, 2020

(65) Prior Publication Data
US 2022/0255170 A1 Aug. 11, 2022

Related U.S. Application Data

(60) Provisional application No. 62/834,174, filed on Apr. 15, 2019, provisional application No. 62/959,597, filed on Jan. 10, 2020.

(51) Int. Cl.
*H01M 50/209* (2021.01)
*H01M 50/271* (2021.01)
(Continued)

(52) U.S. Cl.
CPC ....... *H01M 50/209* (2021.01); *H01M 50/271* (2021.01); *H01M 50/317* (2021.01); *H01M 50/572* (2021.01); *H01M 2220/20* (2013.01)

(58) Field of Classification Search
CPC ............ H01M 50/209; H01M 50/271; H01M 50/317; H01M 50/572; H01M 2220/20;
(Continued)

(56) References Cited

U.S. PATENT DOCUMENTS

2017/0005384 A1  1/2017  Harris et al.
2017/0331165 A1* 11/2017 Obrist ............... H01M 10/6557
2020/0251795 A1*  8/2020 Makowska ....... H01M 10/0525

FOREIGN PATENT DOCUMENTS

JP  2010-238554 A  10/2010
JP  2013-178966 A  9/2013
(Continued)

OTHER PUBLICATIONS

International Search Report corresponding to PCT Application No. PCT/US2020/025604, mailed Nov. 9, 2020 (3 pages).

*Primary Examiner* — Cynthia K Walls
(74) *Attorney, Agent, or Firm* — Maginot, Moore & Beck LLP

(57) ABSTRACT

A battery pack includes a battery pack housing having a lid joined to an open end via a fluid-impermeable seal. The battery pack further includes a battery module disposed within the battery housing and comprising a plurality of electrochemical cells. In addition, the battery pack includes a pressure compensation device positioned within the battery pack housing, the pressure compensation device having (Continued)

a first bladder fluidly coupled to a second bladder by a primary fitting. The battery pack housing is filled with a dielectric fluid. And further, the pressure compensation device has a second fluid.

16 Claims, 32 Drawing Sheets

(51) Int. Cl.
*H01M 50/317* (2021.01)
*H01M 50/572* (2021.01)

(58) Field of Classification Search
CPC .. H01M 50/30; H01M 10/613; H01M 10/625; H01M 10/643; H01M 10/6568; H01M 50/213; H01M 50/249; H01M 50/24; H01M 2200/20; Y02E 60/10
See application file for complete search history.

(56) References Cited

FOREIGN PATENT DOCUMENTS

| | | |
|---|---|---|
| JP | 2014-49427 A | 3/2014 |
| KR | 10-1560556 B1 | 10/2015 |
| KR | 10-2017-0135469 A | 12/2017 |
| KR | 10-1831817 B1 | 2/2018 |

* cited by examiner

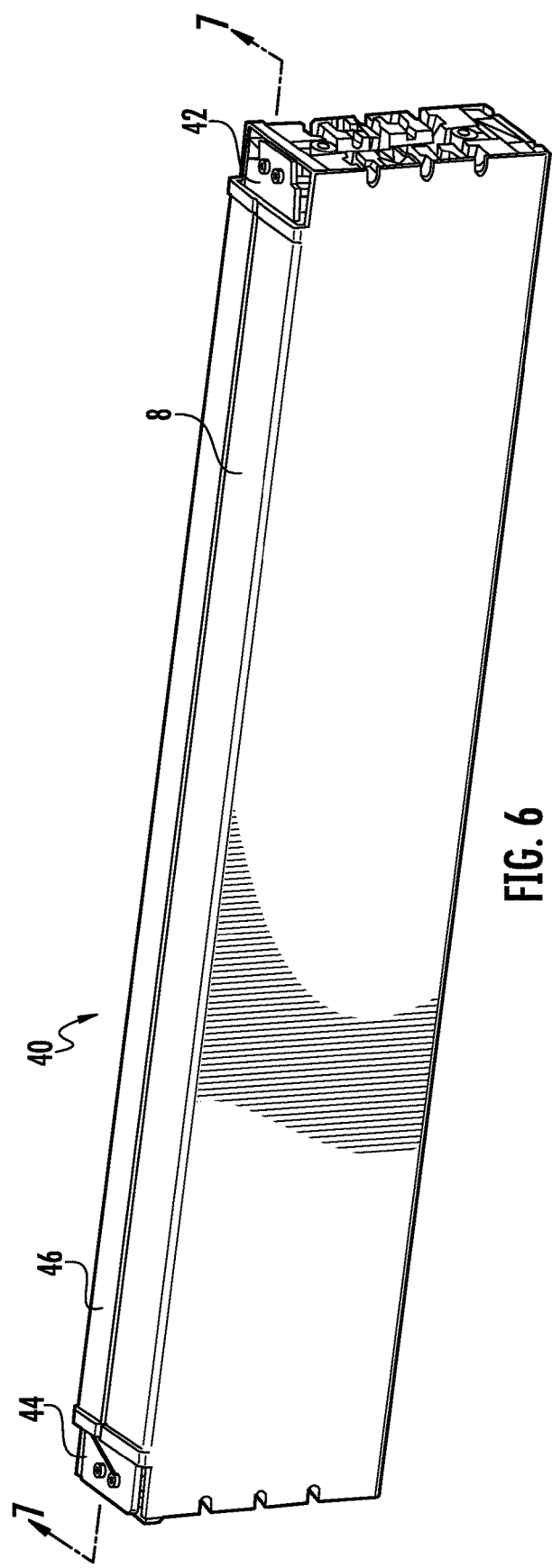
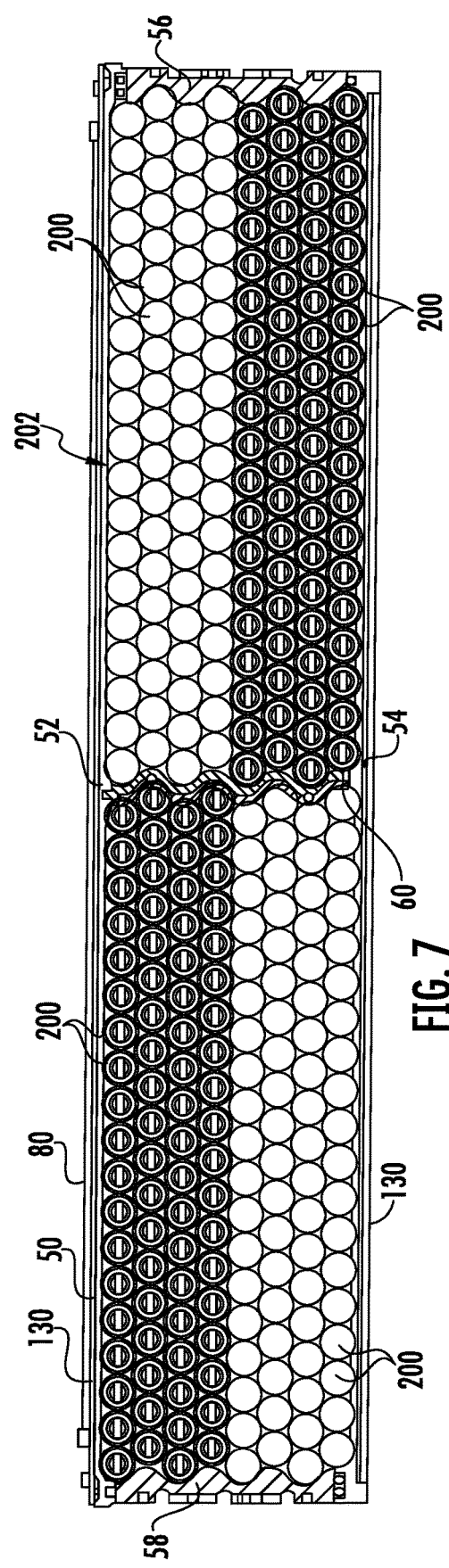
FIG. 6
FIG. 7

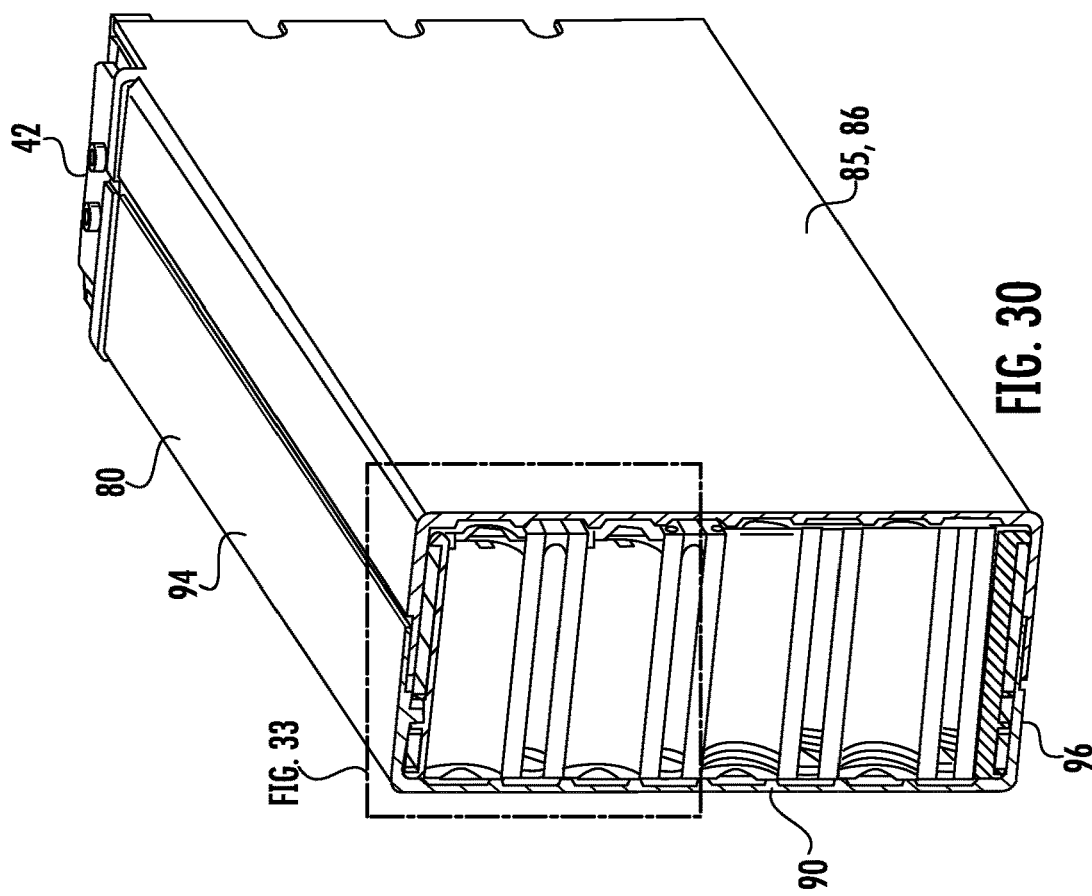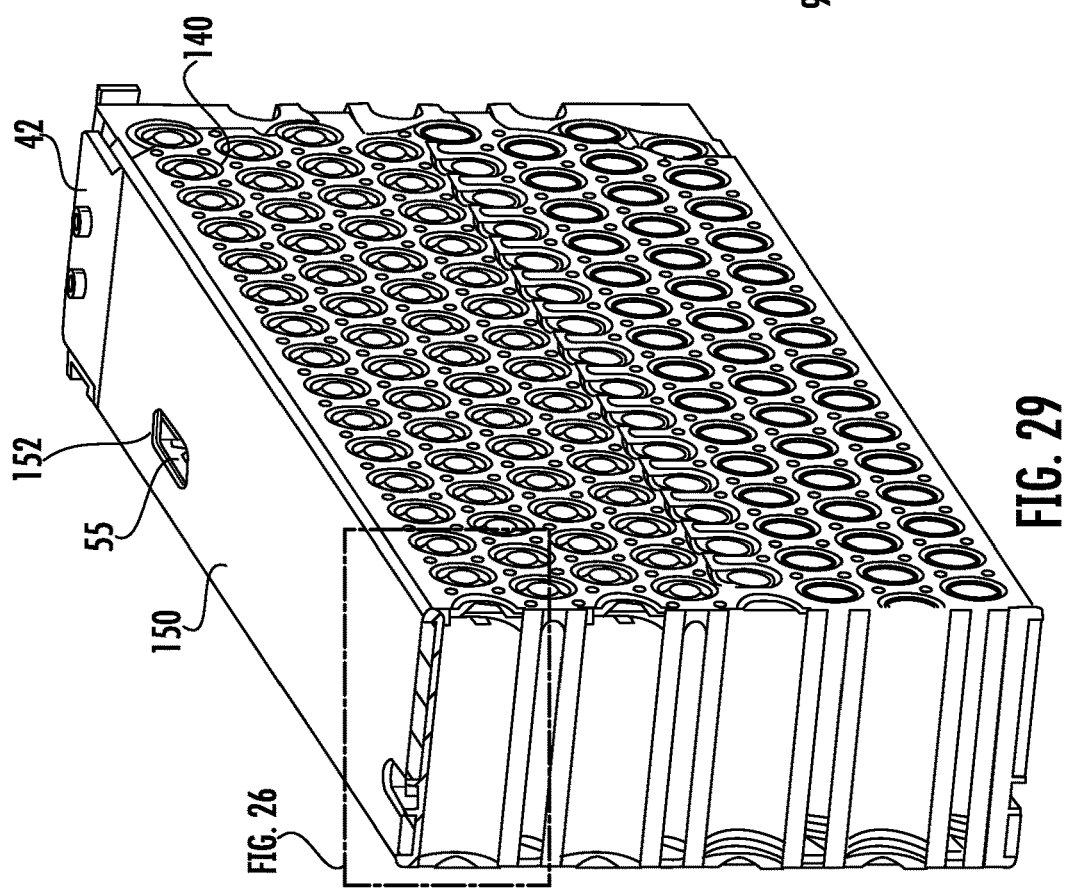

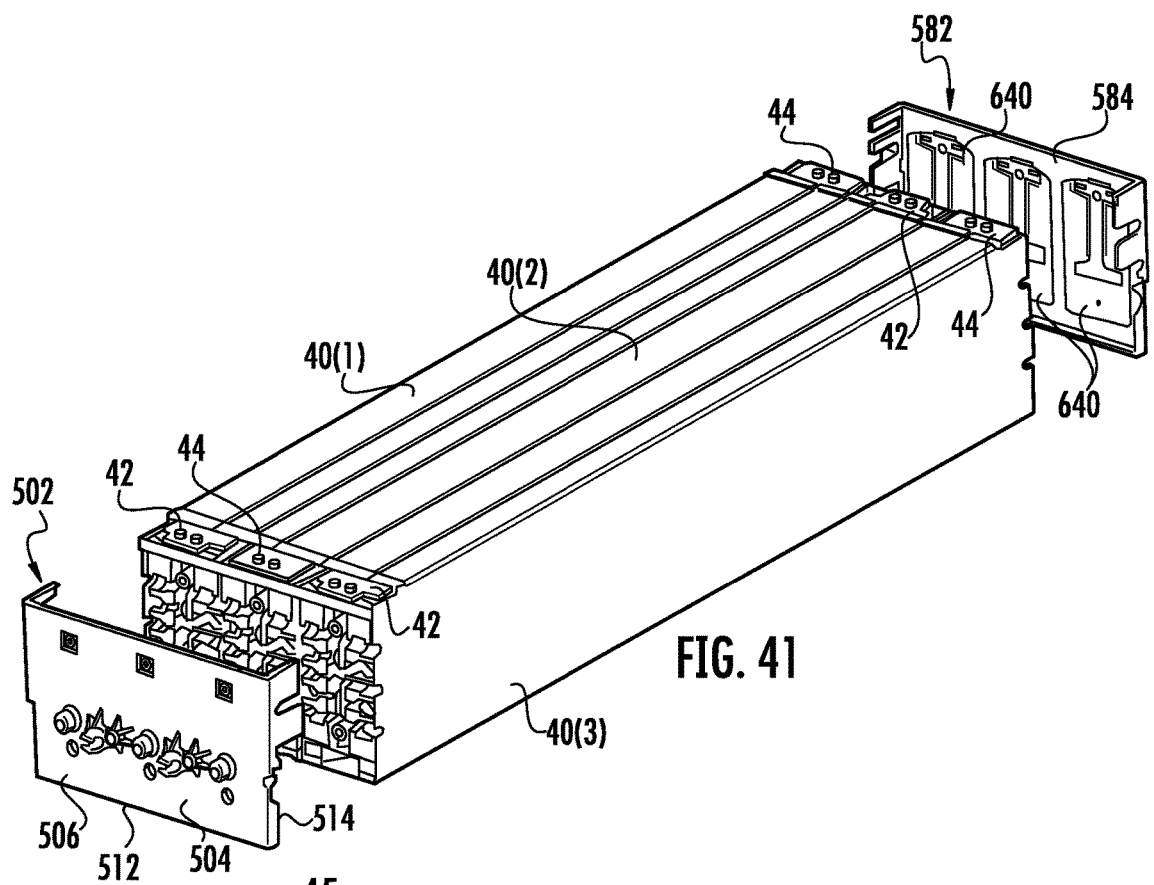
FIG. 41
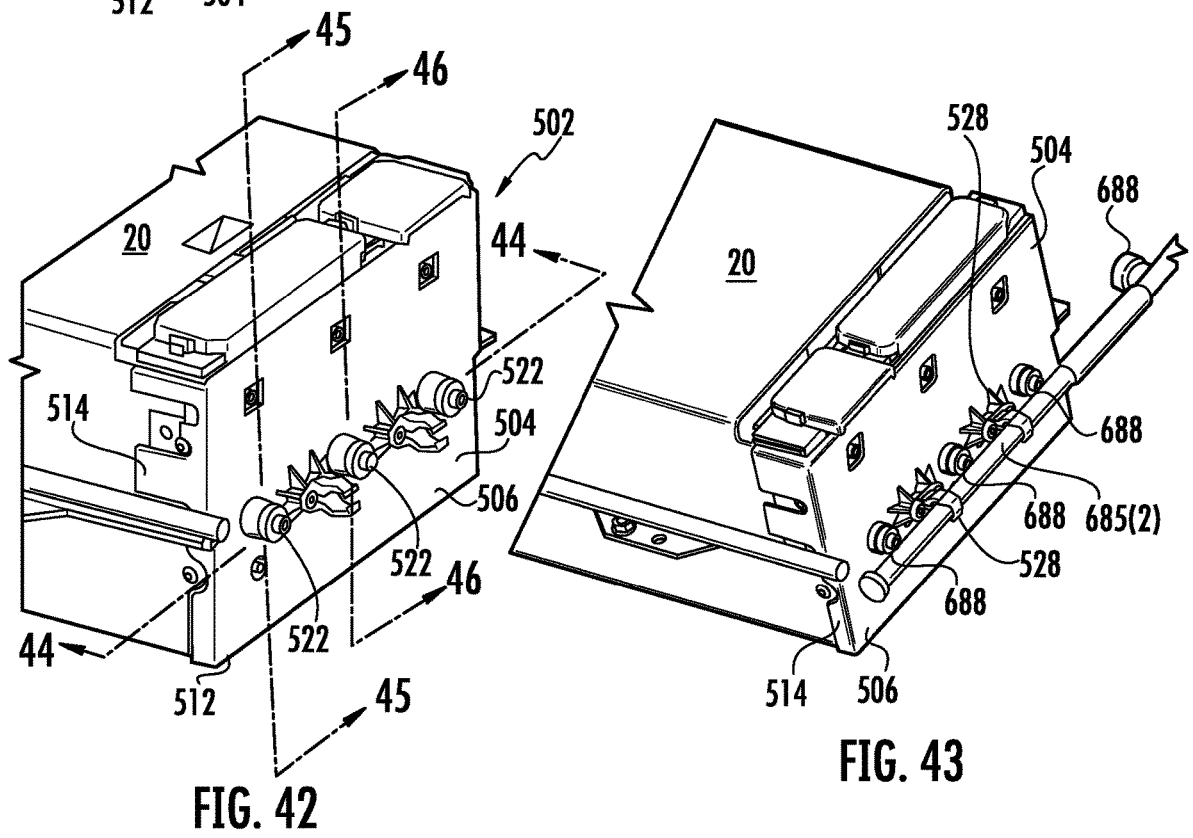
FIG. 42
FIG. 43

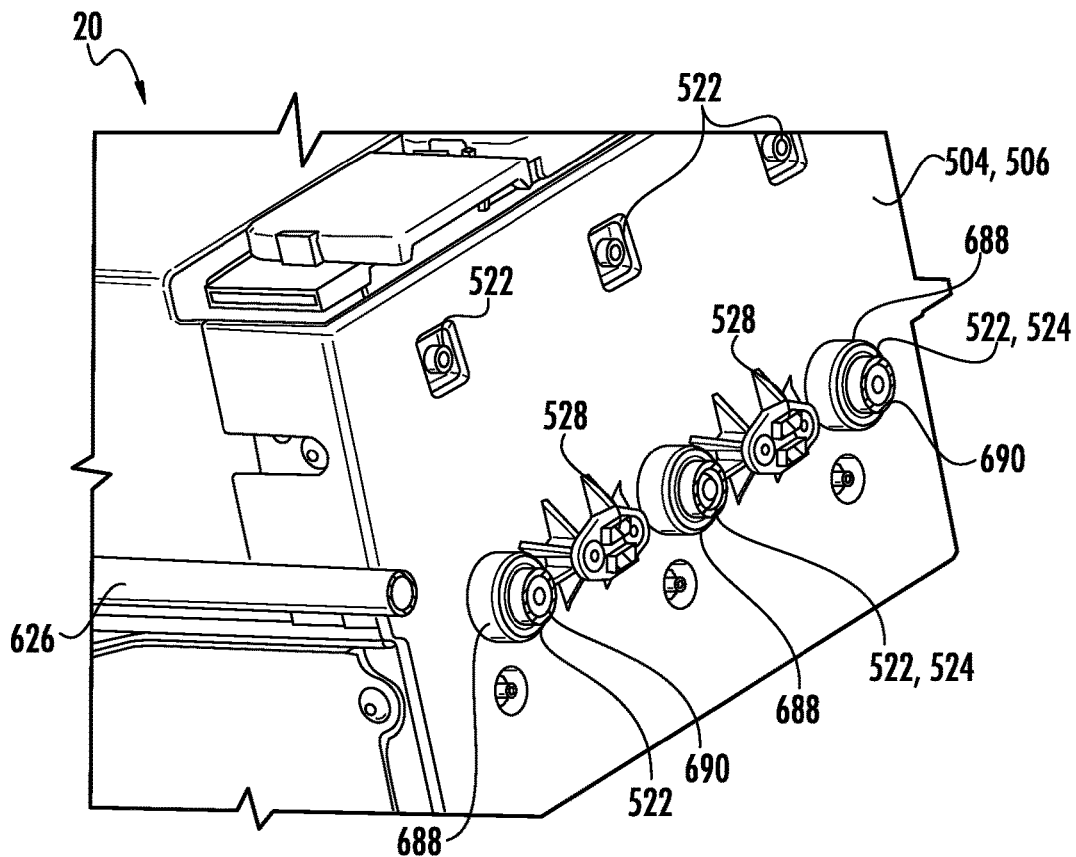
FIG. 44
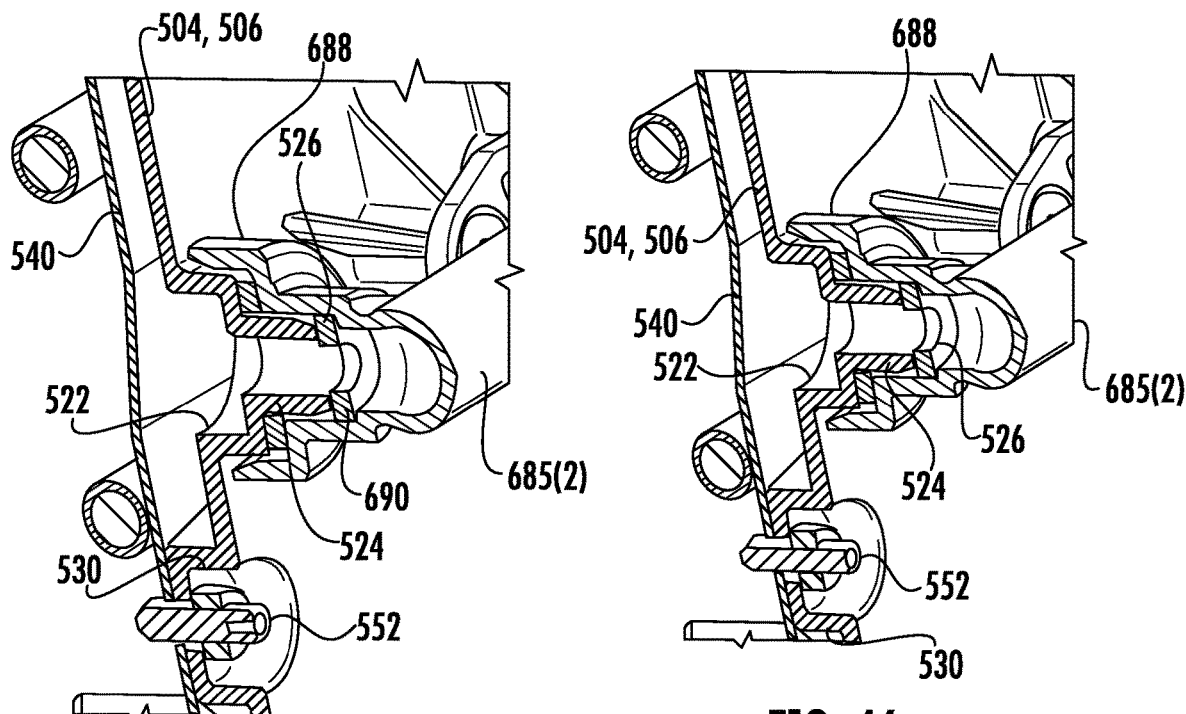
FIG. 45
FIG. 46

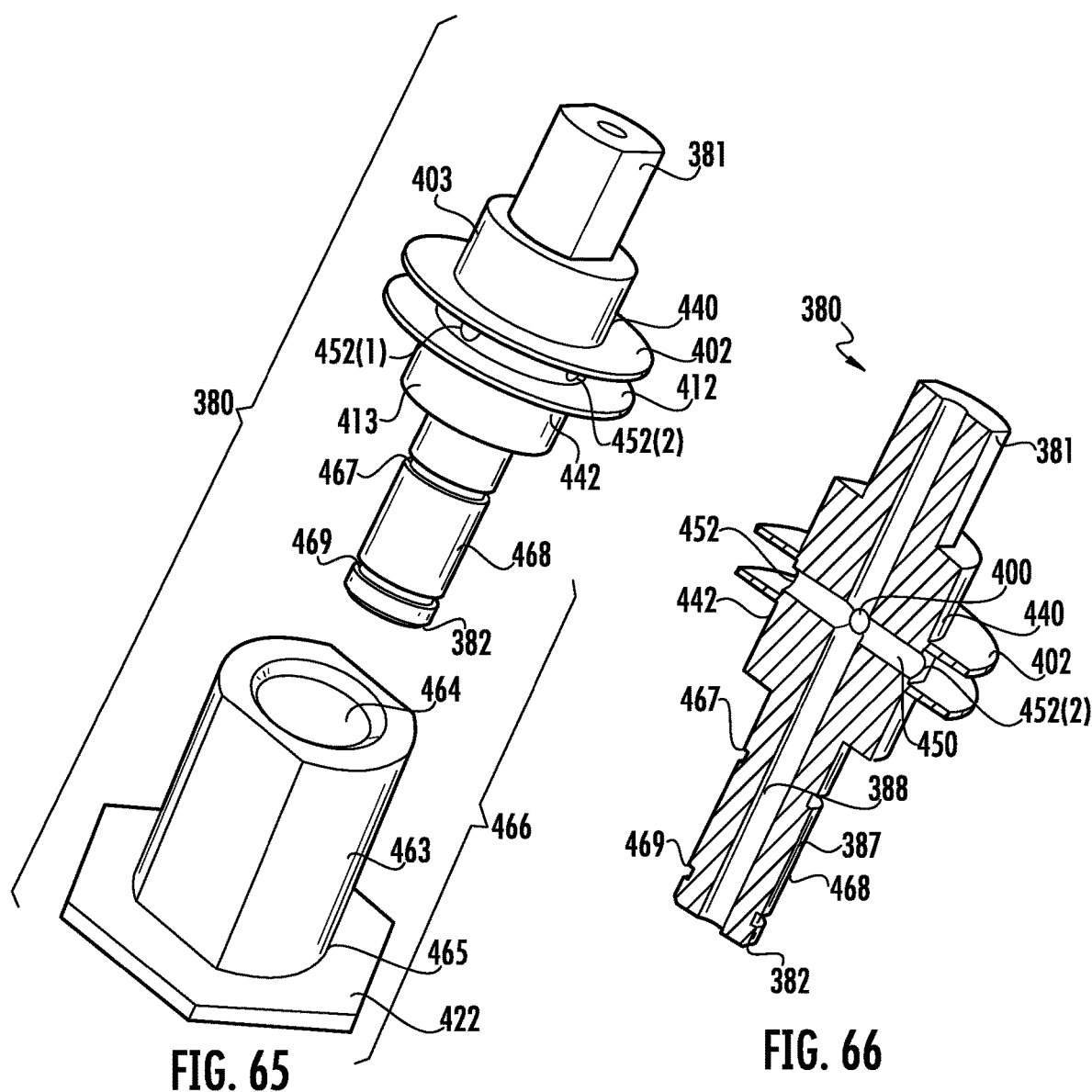

PRESSURE MANAGEMENT DEVICE FOR BATTERY PACK

This application is a 35 U.S.C. § 371 National Stage Application of PCT/US2020/025604, filed on Mar. 29, 2020, which claims the benefit of priority of (i) U.S. provisional application Ser. No. 62/834,174, filed on Apr. 15, 2019, and (ii) U.S. provisional application Ser. No. 62/959,597, filed on Jan. 10, 2020, the disclosures of which are incorporated herein by reference in their entirety.

BACKGROUND

Battery packs provide power for various technologies ranging from portable electronics to renewable power systems and environmentally friendly vehicles. For example, hybrid electric vehicles use a battery pack and an electric motor in conjunction with a combustion engine to increase fuel efficiency. Battery packs may be formed of a plurality of battery modules, where each battery module includes several electrochemical cells. Within the battery module, the cells may be electrically connected in series or in parallel. Likewise, the battery modules may be electrically connected in series or in parallel within the battery pack.

Different cell types have emerged in order to deal with the space requirements of a very wide variety of applications and installation situations, and the most common types used in vehicles are cylindrical cells, prismatic cells, and pouch cells. For example, cylindrical cells are widely used due to their ease of manufacturability and stability. However, due to their curved shape, cylindrical cells may have a lower packing efficiency in a battery module than some other cell types. In addition, because electrical connections are needed at each end of the cylindrical cells, there are additional challenges in providing a battery module having efficient space management. Moreover, when current collectors are disposed at each of the opposed ends of the cell, cell cooling via immersion in a liquid coolant is also challenging.

In some conventional battery modules, cell support structures are provided to retain the cells in a desired configuration and provide cell cooling. However, such cell support structures may be complex and have sufficient bulk to further reduce the battery module packing efficiency. A power generation and storage device is needed that is simple to use and manufacture, has a stable, ordered arrangement of cylindrical cells within the battery module, and provides cell cooling while occupying a minimal volume of the space within the battery module.

SUMMARY

In some aspects, a battery pack includes a battery pack housing having a lid joined to an open end via a fluid-impermeable seal. The battery pack further includes a battery module disposed within the battery housing and comprising a plurality of electrochemical cells. In addition, the battery pack includes a pressure compensation device positioned within the battery pack housing, the pressure compensation device having a first bladder fluidly coupled to a second bladder by a primary fitting. The battery pack housing is filled with a dielectric fluid. And further, the pressure compensation device has a second fluid.

In other aspects, a battery pack includes a battery pack housing having a lid joined to an open end via a fluid-impermeable seal. The battery pack also includes a cassette disposed within the battery housing comprising at least a pair of battery modules, wherein each of the battery modules comprise a plurality of electrochemical cells. Further, the battery pack includes a pressure compensation device positioned within the battery pack housing. The pressure compensation device includes (i) a first bladder at least partially positioned between the lid and the cassette, (ii) a second bladder fluidly coupled to the first bladder by a primary fitting and disposed at least partially around the cassette, and (iii) a third bladder fluidly coupled to the second bladder by a secondary fitting. The battery pack housing is filled with a dielectric fluid. And the pressure compensation device comprises a second fluid. And further the primary fitting protrudes through the lid of the battery housing and is coupled to a vent block having a bore positioned outside of the battery pack housing. Additionally, the bore opens at a predetermined fluid pressure.

In some embodiments, the second fluid is air.

In some embodiments, the bladder housing comprises a pair of sheets, each sheet of the pair of sheets comprising a metal-and-polymer laminate. The pair of sheets are joined to each other along a fluid-sealed seal line, and the bladder interior space is bounded by each sheet of the pair of sheets and the seal line.

In some embodiments, the bladder housing is capable of conforming to the shape of the module housing and other ancillary structures disposed in the battery pack housing.

In some embodiments, the bladder is at least partially enclosed within a fluid permeable support shell.

In some embodiments, the support shell includes a first portion, and a second portion that is separable from the first portion, the first portion and the second portion cooperating to form a segmented, hollow structure and the bladder is disposed within the structure.

In some embodiments, the support shell comprises a first half-shell having a U shape, and a second half-shell having a U-shape, and the second half-shell partially disposed inside the half-shell, and the second half-shell is freely movable relative to the first half-shell.

In some embodiments, the primary fitting is partially disposed in the bladder. The primary fitting includes a primary fitting first end that protrudes through a sealed opening in the bladder; a primary fitting second end that is opposed to the primary fitting first end; and a primary fitting sidewall that extends between the primary fitting first end and the primary fitting second end. An inner surface of the sidewall provides the primary fitting fluid passage, whereby the primary fitting fluid passage extends between the primary fitting first end and the primary fitting second end. The primary fitting includes an opening in the primary fitting sidewall. The opening provides a transverse fluid passage that allows fluid communication between the primary fitting fluid passage and the bladder interior space.

In some embodiments, the bladder comprises a first bladder that is disposed between a lid-facing surface of the module housing and the lid, and a second bladder that is disposed between the first bladder and the container. The primary fitting second end is disposed inside the second bladder, and the primary fitting provides fluid communication between second bladder and the vent block.

In some embodiments, the battery module includes a first battery module and a second battery module. The first battery module includes a first module housing and a first set of electrochemical cells disposed in the first module housing. The second battery module includes a second module housing and a second set of electrochemical cells disposed in the second module housing. In addition, the bladder comprises a first bladder and a second bladder. The first bladder is disposed between the lid and the first and second module housings, and the second bladder is disposed between the first module housing and the second module housing. In addition, the second bladder is in fluid communication with the first bladder.

In some embodiments, the bladder comprise a third bladder, and the second bladder and the third bladder are connected by a secondary fitting that provides fluid communication between an interior space of the second bladder and an interior space of the third bladder.

In some embodiments, the primary fitting provides fluid communication between the first bladder, the second bladder and the internal vacancy of the vent block.

In some embodiments, the vent block is disposed on an outer surface of the lid, and the primary fitting is configured to secure the vent block to the lid.

In some embodiments, the first vent comprises a polytetrafluoroethylene membrane.

In some embodiments, the second vent comprises an umbrella valve.

In some embodiments, the first fluid is non-flammable.

In some embodiments, a mesh sheet is disposed between the bladder and the battery module housing.

In some embodiments, the bladder includes a bladder peripheral edge and a sealed through opening at a location spaced apart from, and surrounded by, the bladder peripheral edge.

Each battery module includes bus bar assemblies that provide cell terminal interconnections within the battery module. Each bus bar assembly includes a substrate and an insulating layer that is attached to a cell-facing surface of the substrate. The insulating layer is electrically and thermally insulating, and is also flame resistant. In some embodiments, each surface of the insulating layer includes a pressure sensitive adhesive, whereby the insulating layer is attached to both the substrate and an end of the cells. The insulating layer may prevent short circuits as the cells expand and contract within the module. In addition, the insulating layer is flame resistant, and thus may retain its electrical and thermal isolation properties in the event of cell thermal runaway.

In the battery module, the positive terminal of each cell is connected to one bus bar assembly via a first electrical connector, and the negative terminal of that cell is connected to another bus bar assembly via a second electrical connector. In some embodiments, the first and second electrical connectors are configured so that the current carrying capacity of the first electrical connector is less than the current carrying capacity of the second electrical connector. By providing first and second electrical connectors in which the current carrying capacity of the first electrical connector is less than the current carrying capacity of the second electrical connector, each cell is electrically connected to the respective bus bar assemblies in such a way that the electrical connection to the cell positive terminal fails before the electrical connection to the cell negative terminal, thereby opening the internal electrical circuit of the battery module. An open internal electrical circuit of battery module 40 can help to prevent an unlikely scenario in which a cell internal short circuit could lead to a direct cell-to-cell short circuit of the cells of the battery module.

The battery pack includes several battery modules, and the battery modules are bundled together in subassemblies referred to as cassettes. The cassettes are disposed in the battery pack housing, and the interior space of the battery pack housing is flooded with an engineered fluid that is dielectric, non-flammable and chemically inert. Although the battery modules may be passively cooled due to immersion in the engineered fluid, the battery pack includes a thermal management system in which the engineered fluid is actively driven across cell surfaces. This is achieved by delivering fluid to each cassette, using in inlet plenum assembly to distribute the fluid to the battery modules within the cassette, using an outlet plenum assembly to collect fluid that has been heated by the cells, and removing the heated fluid from the cells. By providing both passive and active cooling of the cells, cell function is improved and cell durability is increased.

Because the battery pack is flooded with the engineered fluid, the battery modules and cassettes do not include fluid sealing features to facilitate active cooling. As a result, the components of the battery modules, cassettes and thermal management system are simplified relative to the active thermal management systems of some conventional battery packs, and thus are easier and less expensive to manufacture.

Advantageously, the thermal management system can be configured so that that a rate of fluid flow of the cooling fluid delivered to each battery module can be individually set, allowing the rate of flow of the cooling fluid to be increased in areas of the battery pack that are detected as being higher temperature than other areas. By this approach, the operating temperature of each battery module of the battery pack can be individually controlled, and overall battery pack temperature can be balanced.

BRIEF DESCRIPTION OF THE DRAWINGS

FIG. 6 is a perspective view of a battery module.

FIG. 7 is a cross-sectional view of the battery module as seen along line 7-7 of FIG. 6.

FIG. 29 is a cross-sectional view of the battery module with the spacer omitted.

FIG. 30 is a cross-sectional view of the battery module including the spacer.

FIG. 41 is a perspective exploded view of the cassette with the cassette housing omitted and illustrating the inlet plenum assembly.

FIG. 42 is a perspective view of a portion of the cassette illustrating the inlet plenum assembly.

FIG. 43 is a perspective view of a portion of the cassette illustrating the inlet plenum assembly including a manifold portion connected to the inlet openings of the inlet plenum assembly.

FIG. 44 is a cross-sectional view of the inlet plenum assembly as seen along line 44-44 of FIG. 42.

FIG. 45 is a cross-sectional view of the inlet plenum assembly as seen along line 45-45 of FIG. 42.

FIG. 46 is a cross-sectional view of the inlet plenum assembly as seen along line 46-46 of FIG. 42.

FIG. 65 is an exploded view of the primary fitting.

FIG. 66 is a cross-sectional view of a portion of the primary fitting.

DETAILED DESCRIPTION

Figure 1:
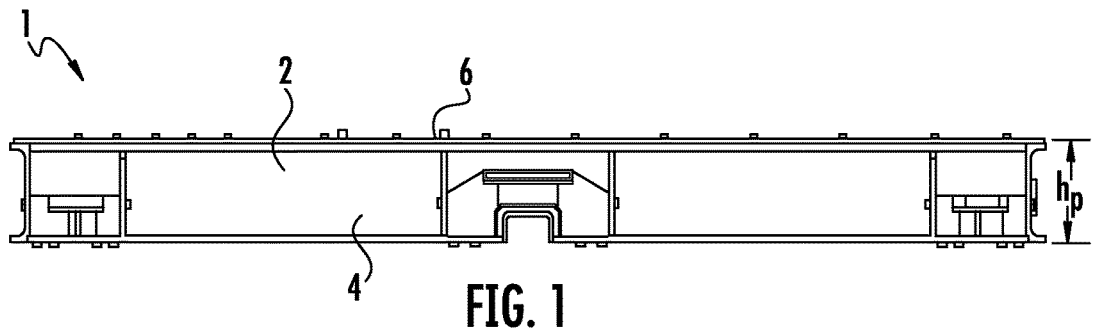
FIG. 1 is a side view of a battery pack.
Figure 2:
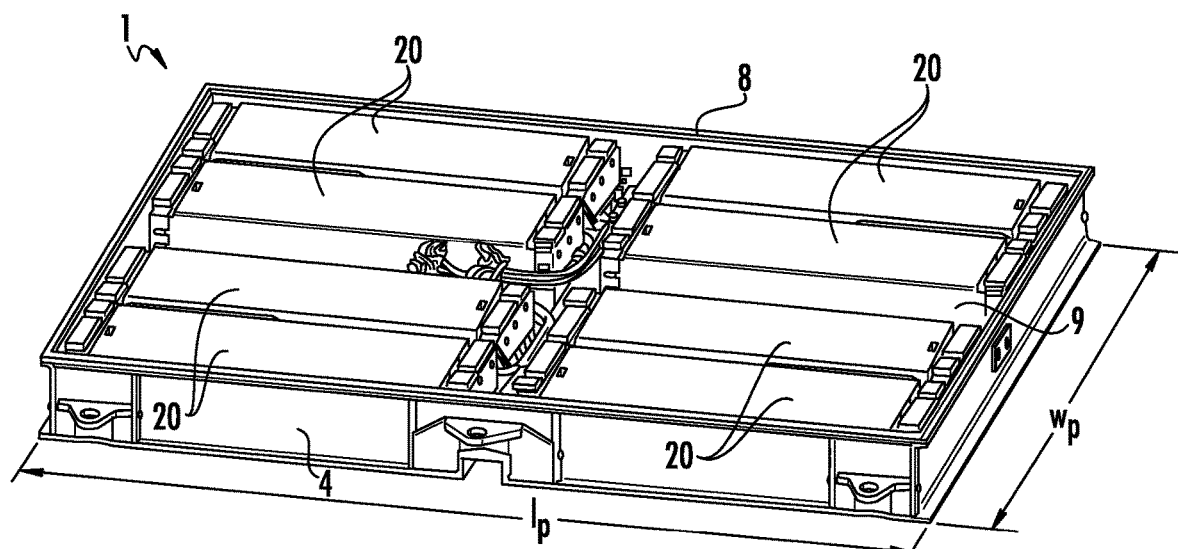
FIG. 2 is a perspective view of the battery pack of FIG. 1 with the lid and some ancillary structures omitted to illustrate the arrangement of cassettes within the battery pack housing.
Figure 3:
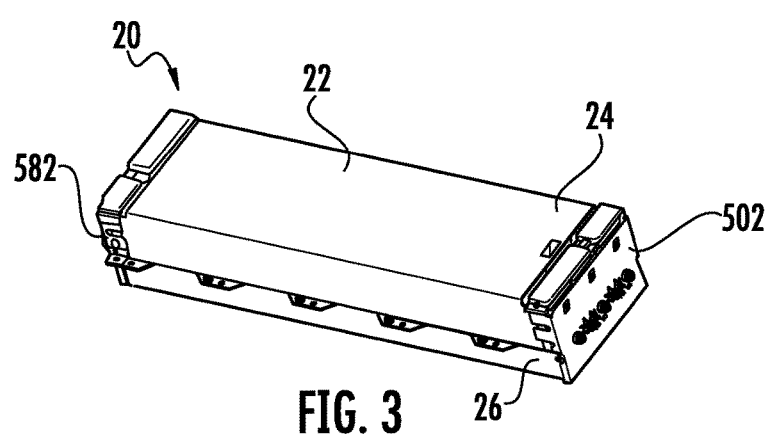
FIG. 3 is a perspective view of a cassette.
Figure 4:
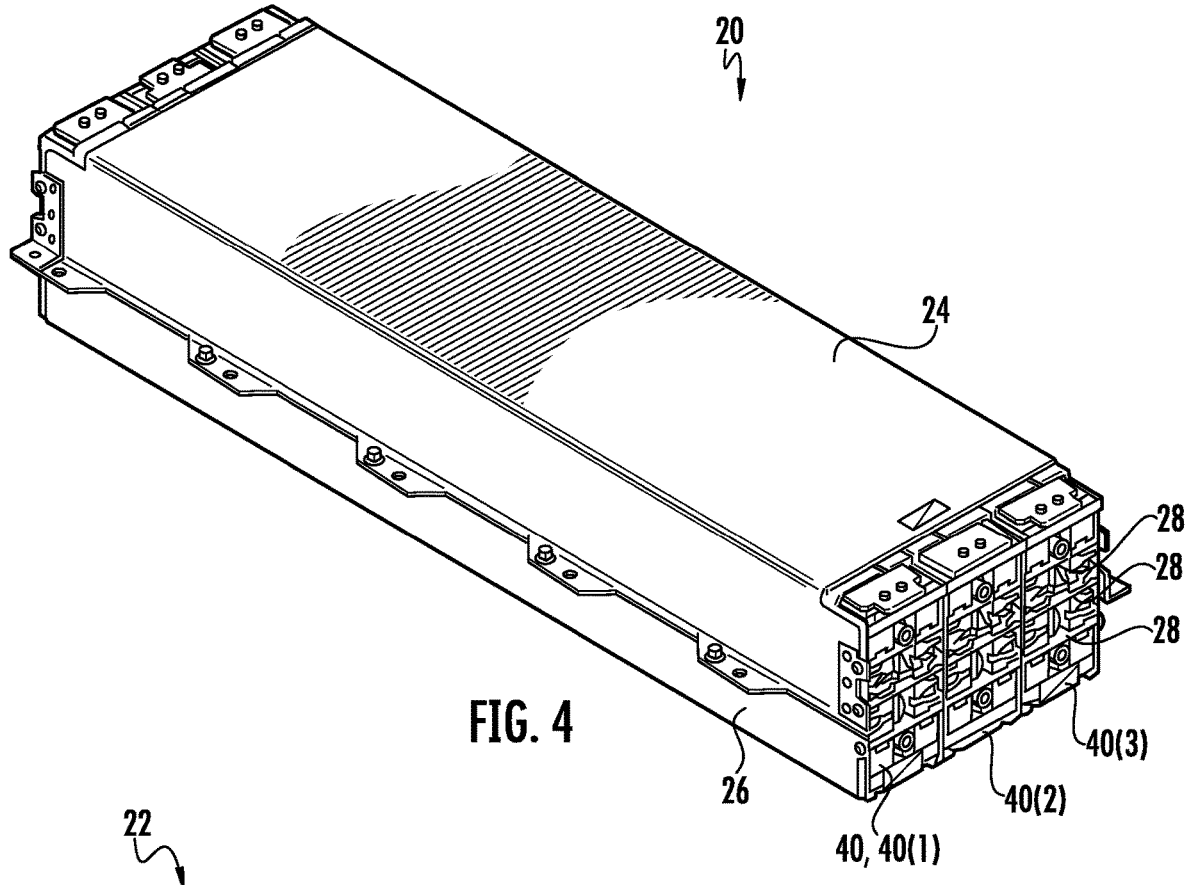
FIG. 4 is a perspective view of a cassette with the fluid inlet plenum assembly and outlet plenum assembly omitted to illustrate the battery modules disposed inside the cassette.

Referring to FIGS. 1-7, a battery pack 1 is configured to provide electrical power to a vehicle power train, and thus may operate at a relatively high voltage. As used herein, the term high voltage refers to voltages greater than 100 V. For example, in some embodiments, the battery pack 1 may operate at 400 V, and in other embodiments, the battery pack 1 may operate at 800 V. The battery pack 1 includes a battery pack housing 2 that is used to house battery modules 40, and each battery module 40 includes electrochemical cells 200. The battery pack housing 2 includes a container 4 and a lid 6 that closes an open end of the container 4, and is connected to the container open end via a fluid impermeable seal 8. The battery pack housing 2 has a low profile. As used herein, the term "low profile" refers to having a height hp that is small relative to length lp and width wp. In the battery pack housing 2, the height hp corresponds to a distance between the lid 6 and a bottom of the container 4.

The battery pack housing 2 is flooded (e.g. completely filled, filled to overflowing) with an engineered fluid, and sealed to prevent leakage and/or evaporation of the engineered fluid. The engineered fluid is dielectric, non-flammable and chemically inert. For example, the fluid may be an ethoxy-nonafluorobutane such as Novec™ 7200, manufactured by The 3M Company, Minnesota, USA. The battery pack 1 includes a thermal management system 500 that provides active cooling to the cells 200 of each battery module 40 within the flooded battery pack 1, as discussed in detail below. In addition, the battery pack 1 includes a pressure management system 300 that allows the closed, fluid-filled and sealed battery pack housing 2 to accommodate variations in environmental temperature and pressure, as discussed in detail below.

In some embodiments, the battery pack 1 may include twelve battery modules 40 or more. In the illustrated embodiment, the battery pack 1 includes 24 battery modules 40. For ease of handling and assembly, the battery modules 40 are arranged in subassemblies that each contain three battery modules 40(1), 40(2), 40(3). The subassemblies of the battery modules 40 are referred to as "cassettes" 20. The three battery modules 40(1), 40(2), 40(3) of the subassembly are supported within a cassette housing 22. In the illustrated embodiment, the battery pack housing 2 receives and supports eight cassettes 20, which are arranged in a two-dimensional array within the battery pack container 4.

Each battery module 40(1), 40(2), 40(3) of a given cassette 20 may be electrically connected to the other battery modules of the given cassette 20. Similarly, each cassette 20 within the battery pack 1 is electrically connected to the other cassettes 20 of the battery pack 1. The electrical connections may be parallel, serial or a combination of parallel and serial, as required by the specific application.

Figure 8:
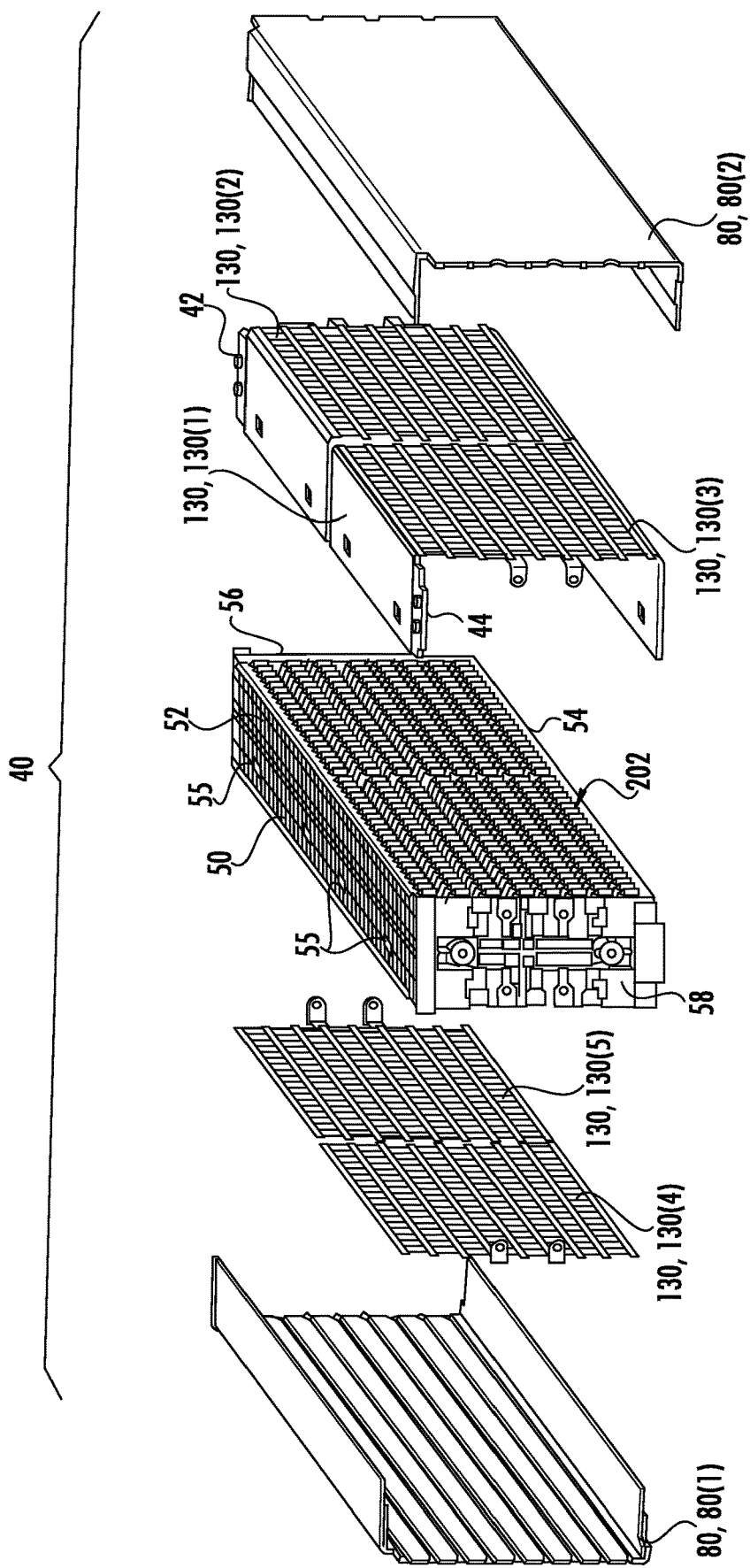
FIG. 8 is an exploded perspective view of the battery module.

Referring to FIG. 8, all the battery modules 40 of the battery pack 1 are substantially identical. For this reason, only one battery module 40 will be described in detail, and common elements are referred to with common reference numbers. The battery module 40 includes an array 202 of electrochemical cells 200. The cells 200 are supported within the battery module 40 by a frame 50 that retains the cells 200 in a two-dimensional array 202, as discussed in detail below. The frame 50 is disposed in a spacer 80 that provides fluid passageways that direct the engineered fluid, serving as a coolant, over exposed portions of the cells 200, as discussed in detail below. The frame 50 and the spacer 80 cooperate to provide a battery module housing 46 that includes a positive terminal 42 and a negative terminal 44. The cells 200 are electrically connected to each other and to a respective positive or negative battery module terminal 42, 44 using bus bars 130 that are configured to simply and reliably accommodate high electrical current, as discussed in detail below.

Figure 9:
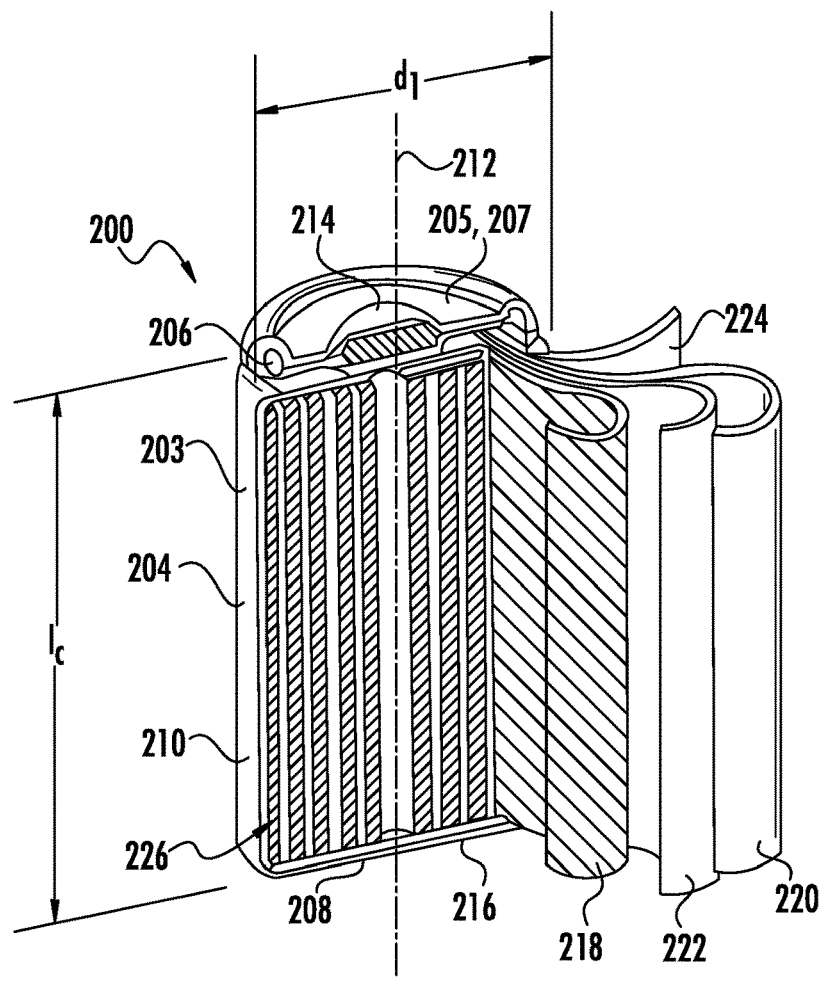
FIG. 9 is a perspective, partially-exploded view of an electrochemical cell.
Figure 10:
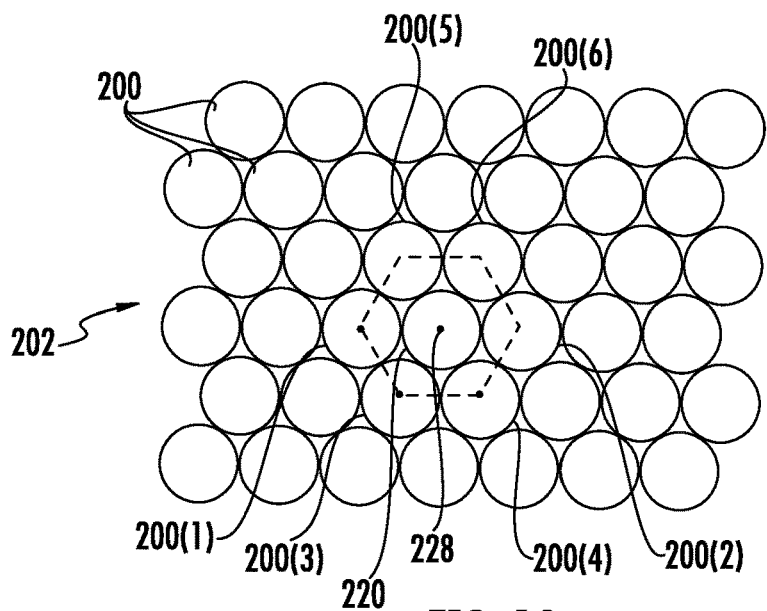
FIG. 10 is a schematic illustration of the arrangement of cells in the battery module.
Figure 13:
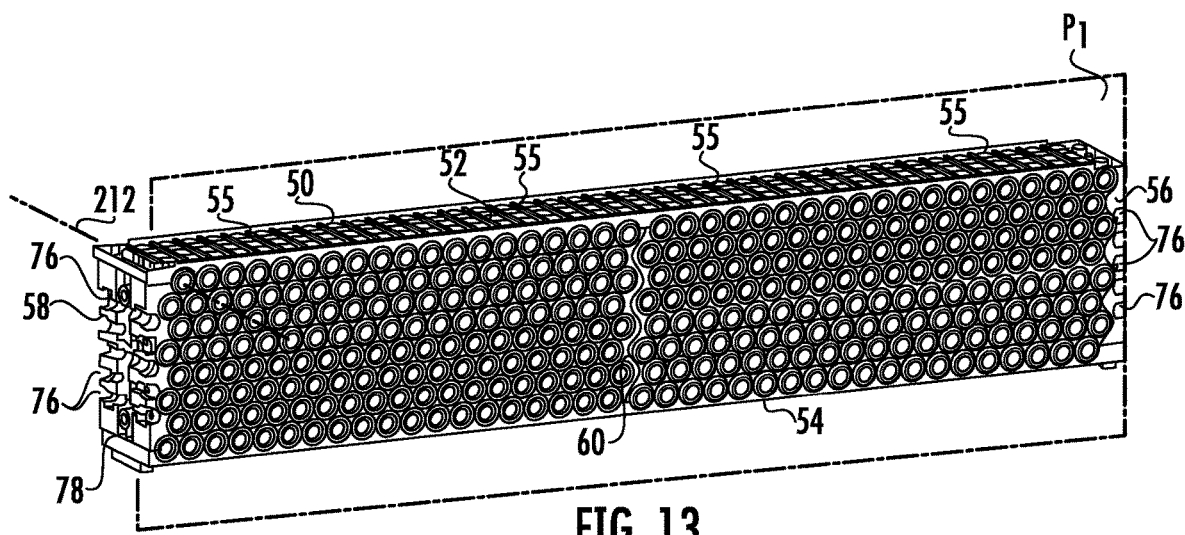
FIG. 13 is a perspective view of the frame including the cells.
Figure 14:
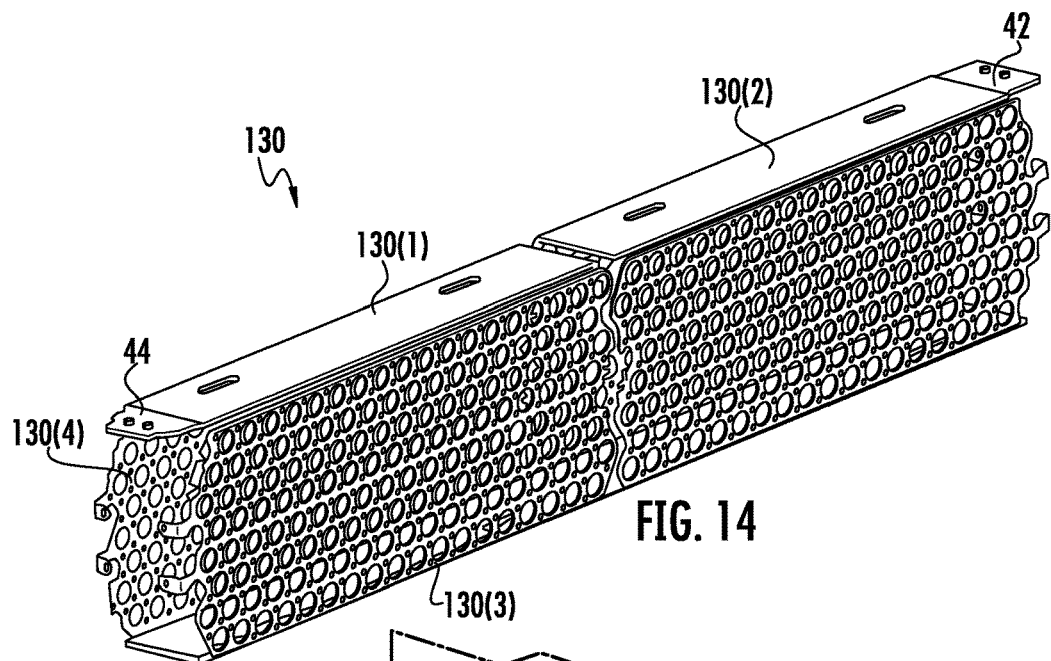
FIG. 14 is a perspective view of the isolated bus bar assemblies as seen from a first side of the battery module.
Figure 15:
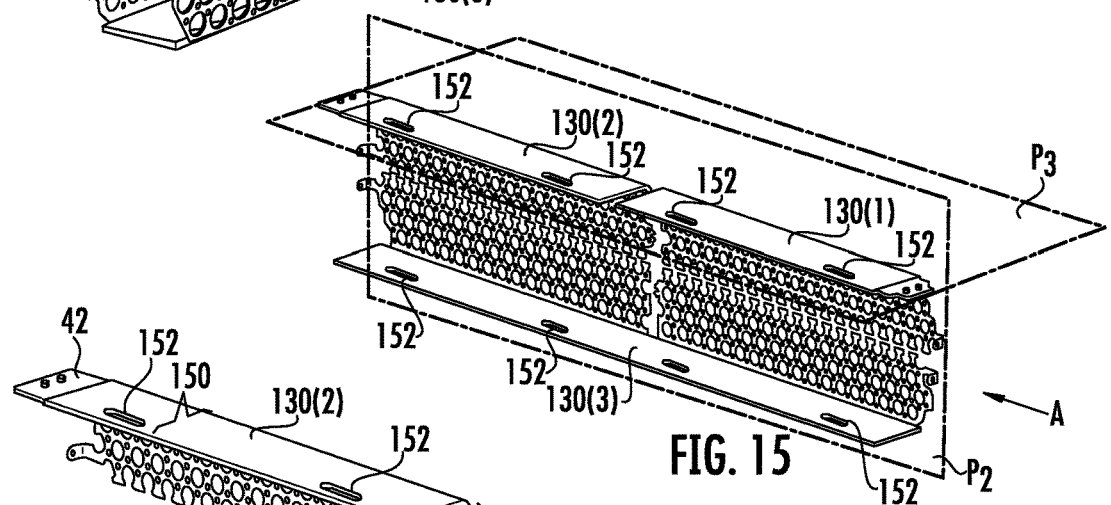
FIG. 15 is a perspective view of the first through third bus bar assemblies.
Figure 16:
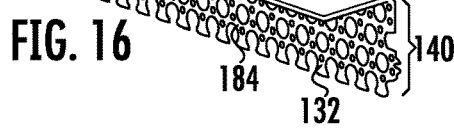
FIG. 16 is a perspective view of the second bus bar assembly.
Figure 17:
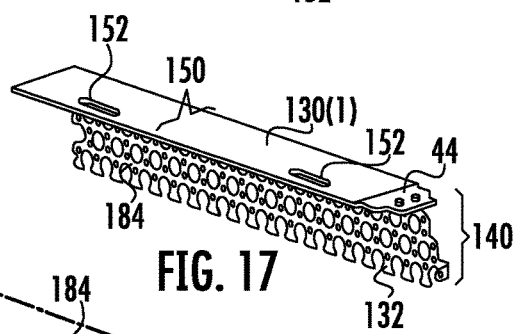
FIG. 17 is a perspective view of the first bus bar assembly.
Figure 18:
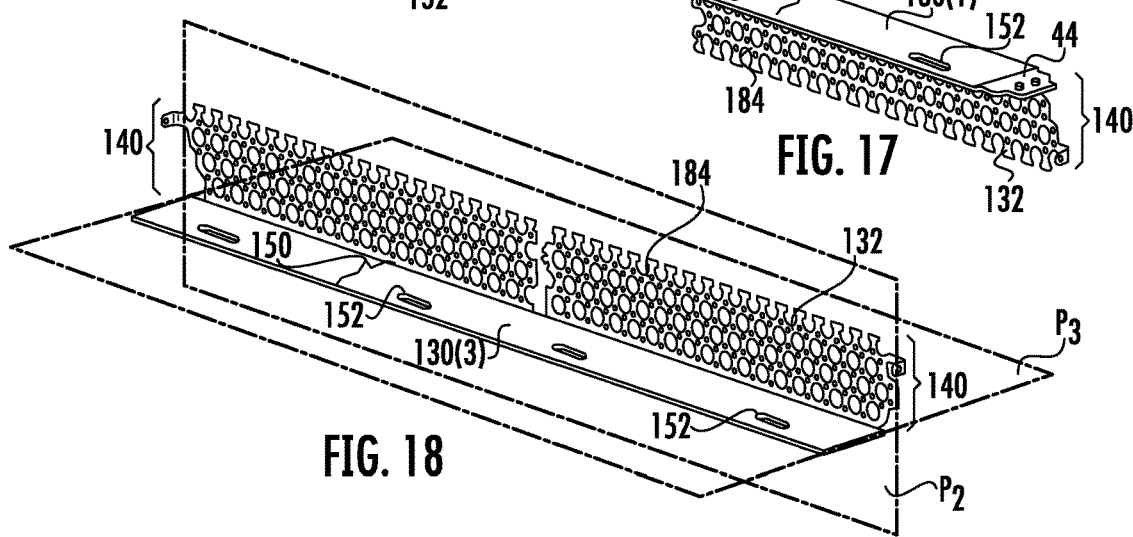
FIG. 18 is a perspective view of the third bus bar assembly.
Figure 19:
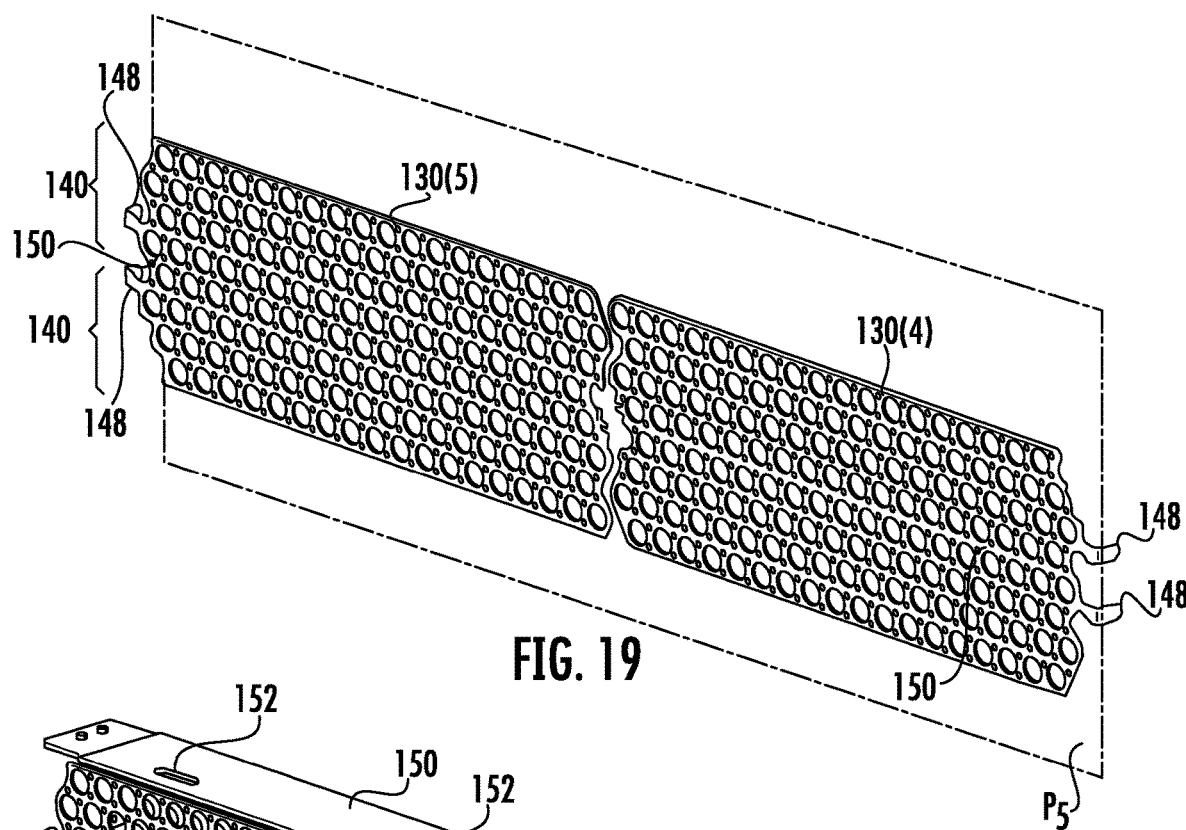
FIG. 19 is a perspective view of the fourth and fifth bus bar assemblies.
Figure 20:
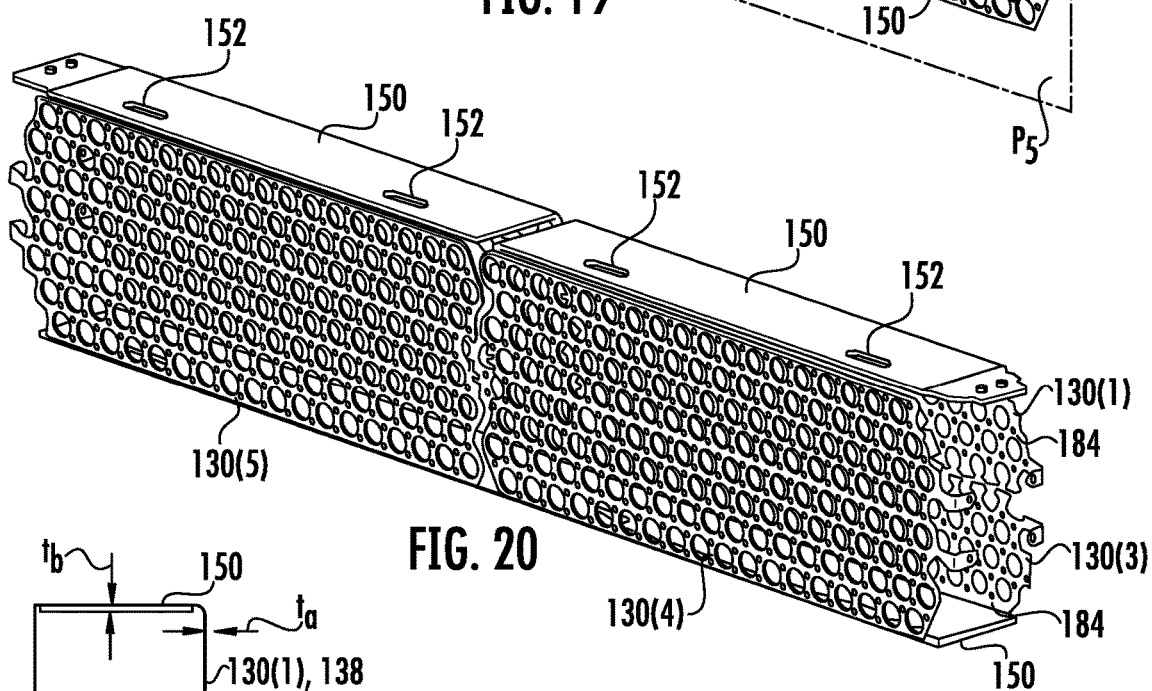
FIG. 20 is a perspective view of the isolated bus bar assemblies as seen from a second side of the battery module.

Referring to FIGS. 9-10 and 13, the cells 200 are cylindrical lithium-ion cells. Each cell 200 includes a cylindrical cell housing 203 having a container portion 204 and a lid portion 205 that closes an open end of the container portion 204. The lid portion 205 is disposed on a first end 207 of the cell 200, and is sealed to the container portion 204 by an electrically insulating gasket 206. The container portion 204 includes a closed end that is disposed at a second end 208 of the cell housing 203, where the second end 208 is opposed to the cell first end 207 including the lid portion 205. The container portion 204 includes a cell housing sidewall 210 that protrudes from, and is perpendicular to, the closed end 208. The container portion 204 is elongated along a cell longitudinal axis 212 that extends between the cell first end 207 and the cell second end 208. That is, the longitudinal axis 212 extends in parallel to the cell housing sidewall 210. Each cell 200 has the same shape and dimensions, including a cell diameter d1.

An electrode assembly 226 is sealed within the cell housing 203 along with an electrolyte to form a power generation and storage unit. The electrode assembly 226 includes a stacked arrangement of a positive electrode 218, a first separator 222, a negative electrode 220 and a second separator 224, in which the stacked arranged has been rolled to provide a "jelly roll". One of the electrodes, for example the positive electrode 218, is electrically connected to the lid portion 205, which serves as a positive terminal 214 of the cell 200. In addition, the other electrode, for example the negative electrode 220, is electrically connected to the container portion 204, which serves as a negative terminal 216 of the cell 200.

Due to their curved shape, the cylindrical cells 200 may have a lower packing efficiency in a battery module than some other cell types. In order to maximize packing efficiency of the cylindrical cells 200, the cells 200 are stored in the battery module 40 in a "close packed" configuration. As used herein, the term "closed packed" refers to a configuration in which the cells 200 are arranged side-by-side in rows. In addition, when the cells 200 are seen in an end view (FIG. 9), alternating rows are relatively offset in a direction parallel to the row such that the centers 228 of the cells 200 of one row are midway between the centers 228 of the cells 200 of the adjacent rows. In addition, each cell 200 is in direct contact with adjacent cells (i.e., 200(1), 200(2)) within its row and with adjacent cells (i.e., 200(3), 200(4), 200(5), 200(6)) of adjacent rows. Sometimes, this cell configuration is also referred to as a "hexagonal packing" configuration. In the illustrated embodiment, the array 202 includes eight rows of cells 200, and includes thirty-eight cells per row. In other embodiments, the array 202 may include a greater or fewer number of rows and/or a greater or fewer number of cells 200 per row, as required by the specific application. The cells 200 within the array 202 are aligned so that when the cells 200 are viewed in side view, an end 207 or 208 of each cell 200 is disposed in a first plane P1 (FIG. 13) that is common to each cell 200 of the cell array 202.

Figure 11:
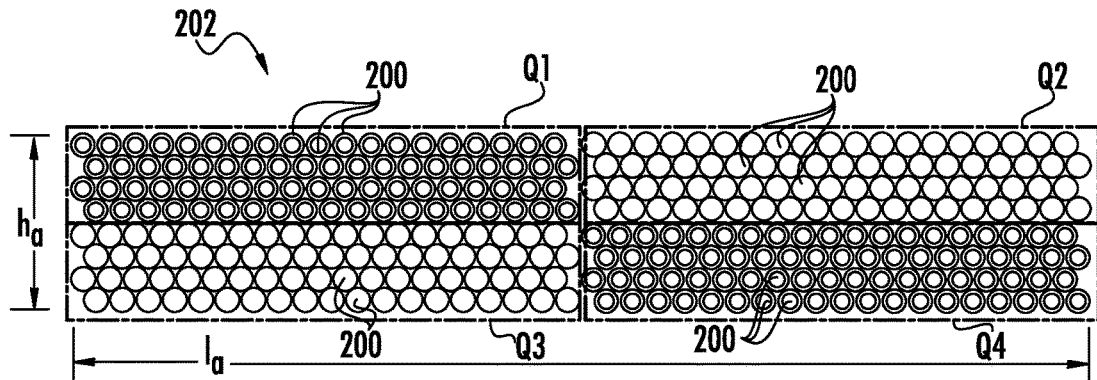
FIG. 11 is a side view of the array of cells within the battery module, illustrating the arrangement of cells in quadrants.

Referring to FIG. 11, within the array 202, the cells 200 are grouped in quadrants Q1, Q2, Q3, Q4, and all cells 200 in a given quadrant have the same orientation such that terminals of the same polarity are disposed on the same side of the given quadrant. In addition, the cells 200 in adjacent quadrants have opposite polarities when the array 202 is viewed in a direction facing the cell ends 207, 208. For example, as seen in FIG. 10, one side of the array 202 is illustrated whereby the cells 200 are seen in an end view. In FIG. 10, the first and second quadrants Q1, Q2 are side-by-side and overlie the third and fourth quadrants Q3,Q4, which are also side-by-side. The cells 200 of the first quadrant Q1 and the fourth quadrant Q4 have the same orientation, e.g., an orientation in which the second 208 of the cells 200 (and thus the negative terminal 216) is visible. In addition, the cells 200 of the second and third quadrants Q2, Q3 have the same orientation, e.g., an orientation in which the first end 207 of the cells 200 (and thus the positive terminals 214) is visible. By grouping the cells 200 in quadrants Q1, Q2, Q3, Q4, providing electrical connections between cells 200 of the array 202 via the bus bars 130 is simplified.

Figure 12:
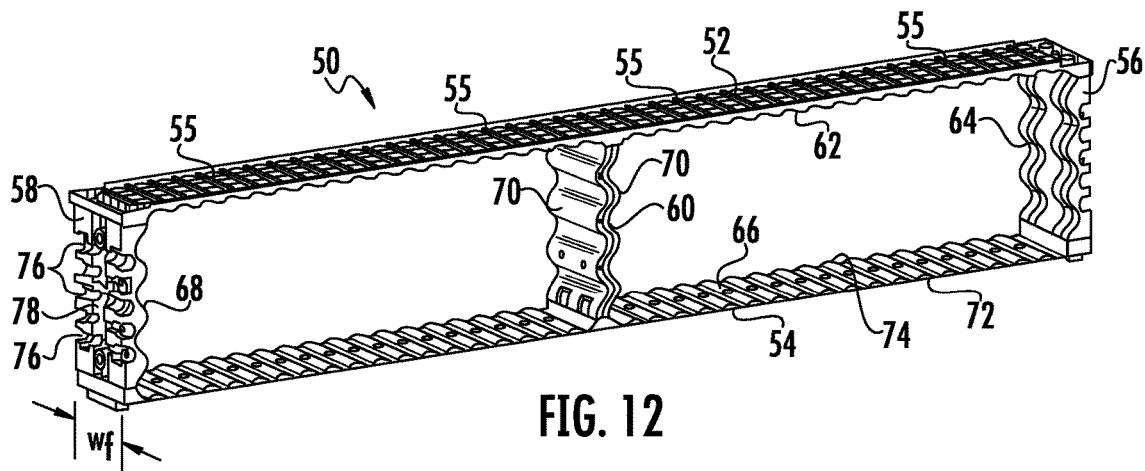
FIG. 12 is a perspective view of the isolated frame.

Referring to FIGS. 12 and 13, the frame 50 retains the cells 200 in the close packed arrangement. The frame 50 includes a cover plate 52, a base plate 54, a first end cap 56 that joins a first end of the cover plate 52 to a first end of the base plate 54, and a second end cap 58 that joins a second end of the cover plate 52 to a second end of the base plate 54. In addition, the frame 50 includes a center wall 60 that joins the cover plate 52 to the base plate 54 and disposed generally mid-way between the first and second end caps 56, 58. The first and second end caps 56, 58 and the center wall 60 are perpendicular to the cover plate 52 and the base plate 54. The cover plate 52, the base plate 54, the first and second end caps 56, 58 and the center wall 60 are thin plates having a width wf that corresponds to a length lc of a cell 200, where the length lc of a cell 200 is a distance between the first end 207 (e.g. the lid portion 205) and the closed second end 208. The cover plate 52 and the base plate 54 have a length that accommodates a length la of the cell array 202, which in turn corresponds to a dimension of a row of cells

200. In addition, the first and second end caps 56, 58 and the center wall 60 are dimensioned to accommodate the height ha of the cell array 202.

The frame 50 surrounds a periphery of the cell array 202, and overlies the sidewall 210 of each cell of the array 202. In other words, the cells 200 are oriented such that the cell longitudinal axis 212 of each cell 200 is parallel to each of the cover plate 52, the base plate 54, the first and second end caps 56, 58 and the center wall 60. As a result, each of the cell first and second ends 207, 208, and thus the cell positive and negative terminals 214, 216 of each cell 200, are exposed on each open side 72, 74 of the frame 50.

The cell-facing surfaces 62, 64, 66, 68, 70 of the cover plate 52, the base plate 54 the first and second end caps 56, 58 and the center wall 60 are contoured to accommodate the cylindrical shape of the cell sidewalls 210 of the outermost cells 200 of the array 202. For example, the cell-facing surfaces 62, 64, 66, 68, 70 may have a wavy contour that receives and supports the outermost cells of the array 202. In some embodiments, to further secure and retain the cells 200 in the desired close-packed configuration, adhesive may be used to fasten the cell housing 203 of a given cell 200 the cell housings 203 of each adjacent cell 200.

The outward facing surfaces of each of the first and second end caps 56, 58 may include first grooves 76 that extend in a width direction of the first and second end caps 56, 58 (e.g., in a direction parallel to the longitudinal axes 212 of the cells 200). The first grooves 76 have a curved concave surface that receives and supports retaining bars 28, discussed further below. The outward facing surfaces of each of the first and second end caps 56, 58 may include a second grooves 78 that extends in a height direction of the first and second end caps 56, 58 (e.g., in a direction perpendicular to the longitudinal axes 212 of the cells 200). The second groove 78 have a curved concave surface that receives and supports a wiring harness (not shown).

Referring to FIGS. 8 and 14-21, the bus bars 130 provide cell terminal interconnections within the battery module 40. The bus bars 130 include five bus bar assemblies 130(1), 130(2), 130(3), 130(4), 130(5) that cooperate to electrically connect the cells 200 of a given quadrant Q1, Q2, Q3, Q4 in parallel, and to provide serial electrical connections between the quadrants Q1, Q2, Q3, Q4 and the terminals 42, 44 of the battery module 40. For example, the first bus bar assembly 130(1) provides a parallel electrical connection between the negative terminals 216 of a first subset of cells 200 of the cell array 202, where the first subset of cells 200 corresponds to the cells 200 within the first quadrant Q1. In addition, the first bus bar assembly 130(1) serially connects the cells 200 of the first quadrant Q1 to the battery module negative terminal 44.

The second bus bar assembly 130(2) provides a parallel electrical connection between the positive terminals 214 of a second subset of cells 200 of the cell array 202, where the second subset of cells 200 corresponds to the cells 200 within the second quadrant Q2. In addition, the second bus bar assembly 130(2) serially connects cells 200 of the second quadrant Q2 to the battery module positive terminal 42.

The third bus bar assembly 130(3) provides a parallel electrical connection between the positive terminals 214 of a third subset of cells 200 of the cell array 202, where the third subset of cells 200 corresponds to the cells 200 within the third quadrant Q3. In addition, the third bus bar assembly 130(3) provides a parallel electrical connection between the negative terminals 216 of a fourth subset of cells 200 of the cell array 202, where the fourth subset of cells 200 corresponds to the cells 200 within the fourth quadrant Q4. Still further, the third bus bar assembly 130(3) serially connects the cells 200 of the third quadrant Q3 to the cells 200 of the fourth quadrant Q4.

The fourth bus bar assembly 130(4) provides a parallel electrical connection between the positive terminals 214 of the first subset of cells 200 of the cell array 202, e.g., to the cells 200 within the first quadrant Q1. In addition, the fourth bus bar assembly 130(4) provides a parallel electrical connection between the negative terminals 216 of the third subset of cells 200 of the cell array 202, e.g., to the cells 200 within the third quadrant Q3. Still further, the fourth bus bar assembly 130(4) serially connects the cells 200 of the first quadrant Q1 to the cells 200 of the third quadrant Q3.

The fifth bus bar assembly 130(5) provides a parallel electrical connection between the negative terminals 216 of the second subset of cells 200 of the cell array 202, e.g., to the cells 200 within the second quadrant Q2. In addition, the fifth bus bar assembly 130(5) provides a parallel electrical connection between the positive terminals 214 of the fourth subset of cells 200 of the cell array 202, e.g., to the cells 200 within the fourth quadrant Q4. Still further, the fifth bus bar assembly 130(5) serially connects the cells 200 of the second quadrant Q2 to the cells 200 of the fourth quadrant Q4.

Each of the five bus bar assemblies 130(1), 130(2), 130(3), 130(4), 130(5) includes an electrically conductive substrate 138, an insulation layer 180 that is disposed on a cell terminal-facing side 132 of the substrate 138, and electrical connectors 160 that provide an electrical connection between the substrate 138 and each respective cell terminal 214 or 216.

The substrate 138 is a rigid, electrically conductive, thin plate. The substrate 138 includes a first side 132 that faces the cells 120, a second side 134 that is opposed to the first side 132, and a peripheral edge 136. Each substrate 138 includes at least one tab 148 that protrudes from the peripheral edge 136. The tab 148 is folded toward the substrate first side 132 so that it extends perpendicular to the substrate first side 132. The tab 148 allows voltage and temperature sensor leads to be electrically connected to the substrate 138. In addition, fasteners (not shown) are used to secure voltage and temperature sensor leads along with the substrate 138 to the frame end caps 56, 58 via openings in the tabs 148.

Each substrate 138 includes an alpha portion 140 corresponding to a region in which parallel electrical connections are made between the substrate 138 and the cells 200 of a given quadrant, and a beta portion 150 corresponding to a region that provides a serial electrical connection, for example, between adjacent alpha regions or between an alpha region and a module terminal 42, 44. The peripheral edge 132 of the alpha portion 140 is curvilinear to accommodate a profile of the cell array 202.

The first, second and third bus bar assemblies 130(1), 130(2), 130(3) provide electrical connections between cells 200 on a first side of the cell array 202, and the substrate 138 of the first, second and third bus bar assemblies 130(1), 130(2), 130(3) is generally L shaped. A first leg of the "L" overlies the cell array first side (e.g., overlies an end of the cell including a cell terminal 214 or 216). The first leg of the "L" corresponds to the alpha portion 140 of the substrate 138. In addition, a second leg of the "L" is perpendicular to the first leg, and overlies a portion of the frame 50 (e.g., overlies sidewall of the cells 200). The second leg of the "L" corresponds to the beta portion 150 of the substrate 138.

The alpha portion 140 resides in a second plane P2 that is parallel to the first plane P1 in which the ends of the cells

200 are aligned. The alpha portion 140 includes primary connection through holes 142. A primary connection through hole 142 is provided for each cell 200 of the quadrant, and each primary connection through hole 142 is aligned with an end of a corresponding cell 200, thus exposing the cell terminal 214 or 216. The primary connection through hole 142 is circular, and has a diameter d2 that is smaller than the diameter d1 of the cells 200. The primary connection through holes 142 expose the ends of the cells so that an electrical connection can be made between the exposed cell terminal 214 or 216 and the alpha portion 140 using an electrical connector 160 such as a wire bond. The alpha portion also includes primary flow through holes 144 that are aligned with the small gaps between the sidewalls 210 of adjacent cells 200. As a reflection of the hexagonal packing arrangement of the cells 200, there are six primary flow through holes 144 that are disposed about a circumference of each primary connection through hole 142. The primary flow through holes 144 have a small diameter d3 to correspond to the small size of the gaps, and are smaller in diameter than the primary connection through holes 142. For example, in the illustrated embodiment, the diameter d3 of the primary flow through hole 144 is about 10 percent to 25 percent of the diameter d2 of the connection through holes 142.

The beta portion 150 resides in a third plane P3 that is perpendicular to the second plane P2. In the substrates 138 of the first and second bus bar assemblies 130(1), 130(2), the beta portion 150 overlies the frame cover plate 52. The beta portion 150 of the first bus bar assembly 130(1) is electrically connected to the battery module negative terminal 44, and the beta portion 150 of the second bus bar assembly 130(2) is electrically connected to the battery module positive terminal 42. In some embodiments, the beta portions 150 of the first and second bus bar assemblies 130(1), 130(2) may be made integrally with the respective terminals 42, 44, and in other embodiments, the beta portions 150 of the first and second bus bar assemblies 130(1), 130(2) may be joined to the respective terminals, for example by welding. In the illustrated embodiment, the negative battery module terminal 44 protrudes integrally from one edge of the beta portion 150 of the first bus bar assembly 130(1), and the positive battery module terminal 42 protrudes integrally from one edge of the beta portion 150 of the second bus bar assembly 130(2). As a result, the battery module terminals 42, 44 reside in the same plane as the beta portions 150 of the first and second bus bar assemblies 130(1), 130(2). In the substrate 138 of the third bus bar assemblies 130(3), the beta portion 150 overlies the frame base plate 54 and provides a serial electrical connection between the third quadrant Q3 and the fourth quadrant Q4.

Figure 21:
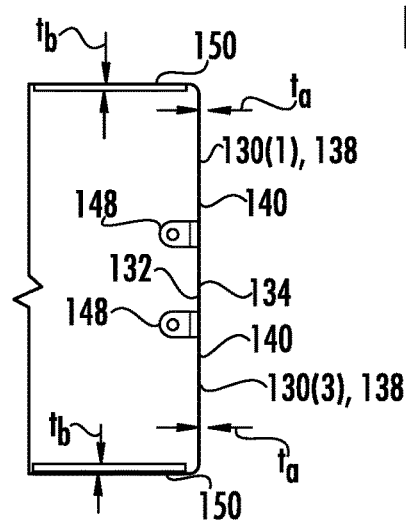
FIG. 21 is an end view of the first through third bus bar assemblies as seen in the direction of arrow A in FIG. 15.
Figure 22:
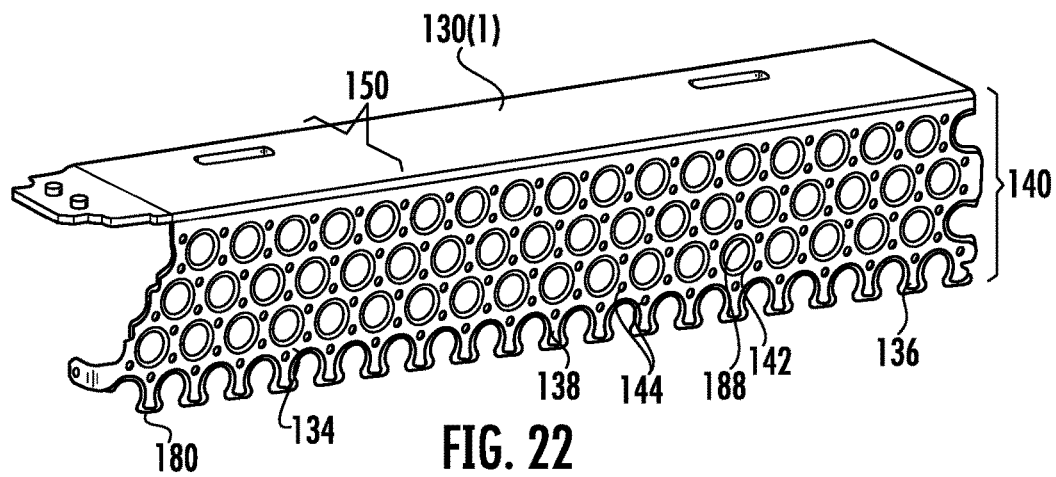
FIG. 22 is a perspective view of the first bus bar assembly.
Figure 23:
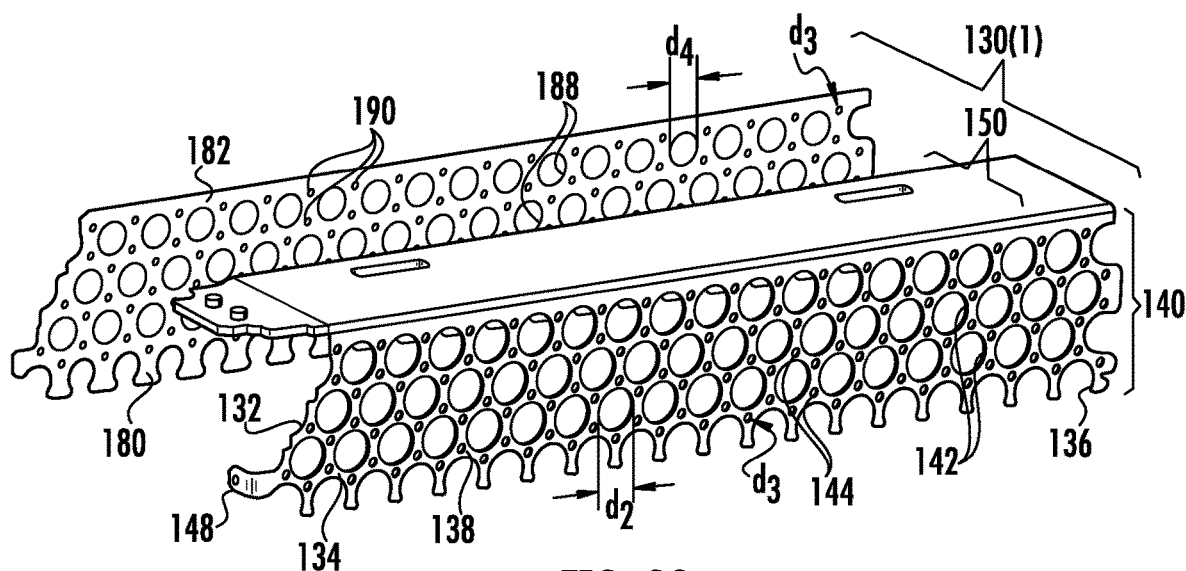
FIG. 23 is an exploded view of the first bus bar assembly.
Figure 24:
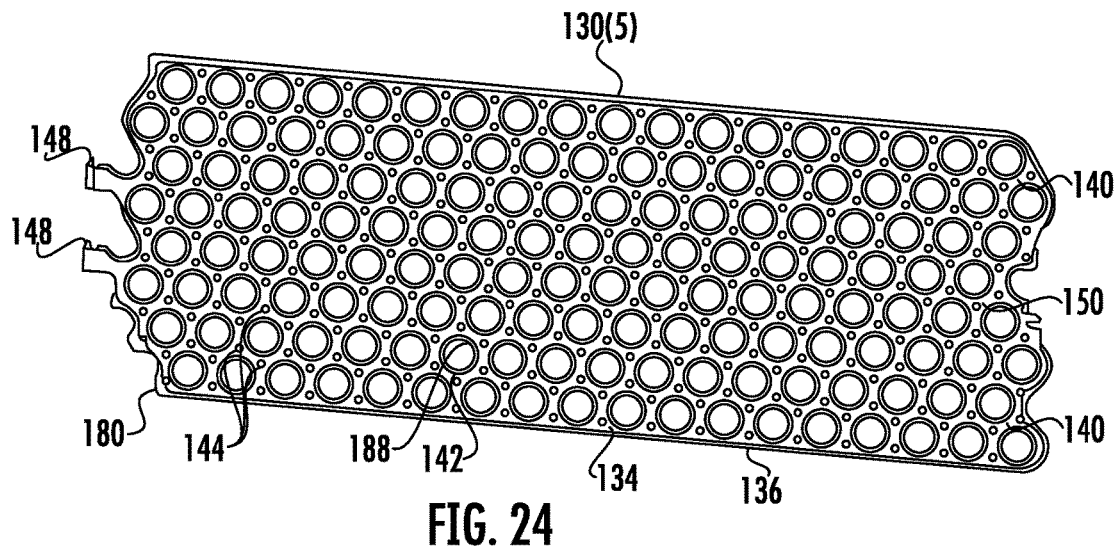
FIG. 24 is a perspective view of the fifth bus bar assembly.
Figure 25:
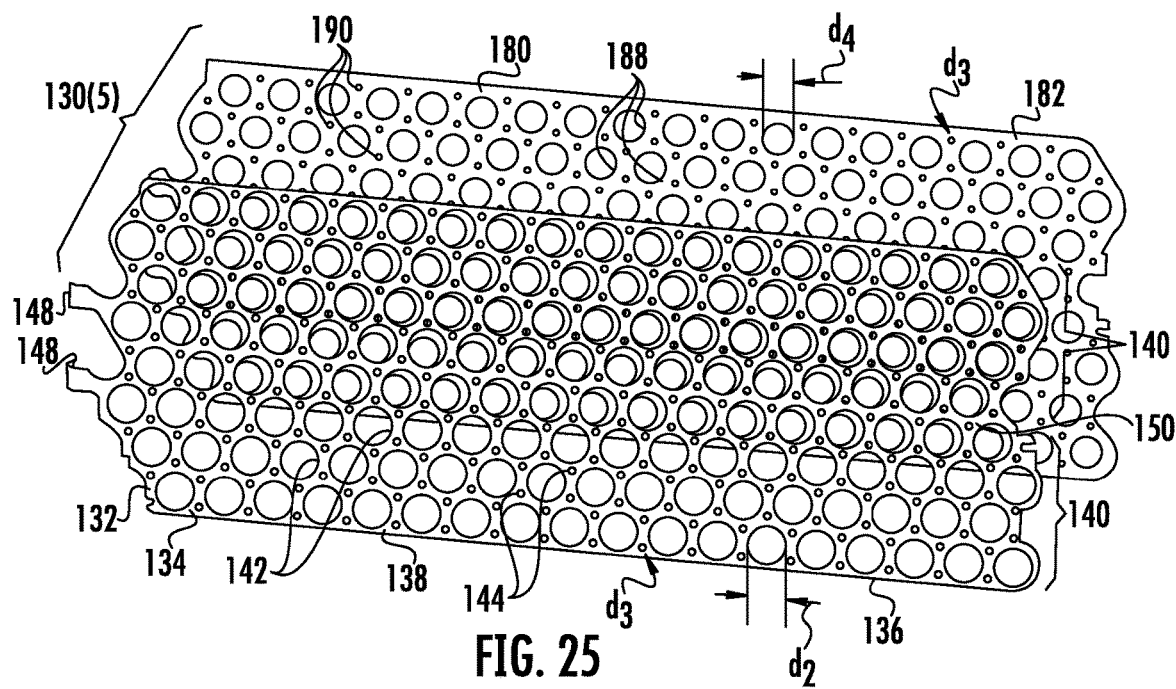
FIG. 25 is an exploded view of the fifth bus bar assembly.
Figure 26:
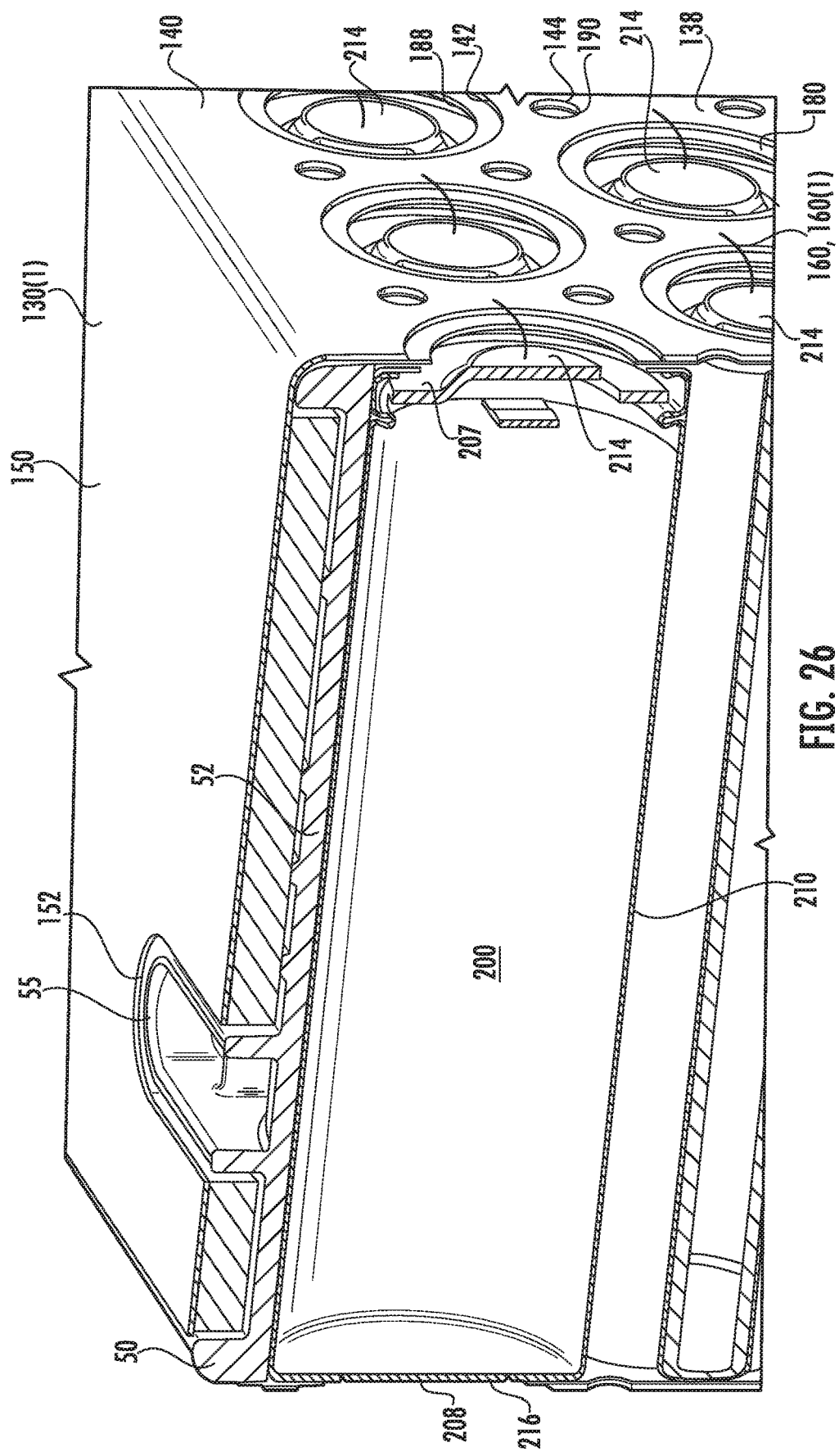
FIG. 26 is a detail view of the cross-sectional view of the battery module as indicated by dashed lines in FIG. 29.

In the substrates 138 of the first, second and third bus bar assemblies 130(1), 130(2), 130(3), the beta portion 150 has a thickness tb that is greater than the thickness ta of the alpha portion 140, where a thickness of the substrate corresponds to a distance between the first side 132 and the second side 134 (FIG. 21). The greater thickness of the beta portion 150 accommodates high current flow in this region. In addition, the beta portion 150 of the first, second and third bus bar assemblies 130(1), 130(2), 130(3) may include elongated openings 152. The openings 152 receive tabs 55 that protrude from the outward facing surfaces of the frame cover and base plates 52, 54, whereby the openings 152 allow for correct alignment and orientation of the bus bar assemblies 130(1), 130(2), 130(3) relative to the frame 50, and serve to retain the bus bar assemblies 130(1), 130(2), 130(3) in the correct alignment relative to the frame 50.

The fourth and fifth bus bar assemblies 130(4), 130(5), provide electrical connections between cells 200 on a second side of the cell array 202. The substrate 138 of the fourth and fifth bus bar assemblies 130(4), 130(5) is generally planar, overlies the cell array second side and includes two alpha portions 140, with the beta portion 150 disposed between, and co-planar with, the alpha portions 140. The substrate 138 of the fourth and fifth bus bar assemblies 130(4), 130(5) has a uniform thickness. The fourth and fifth bus bar assemblies 130(4), 130(5) are disposed in the same plane P5 in a side-by-side arrangement. The fourth and fifth bus bar assemblies 130(4), 130(5) are spaced apart within the plane P5. The plane P5 is parallel to the planes P1 and P2.

Referring to FIGS. 22-26 and 29, the insulation layer 180 is disposed on a cell terminal-facing side 132 of the substrate 138 so as to reside between the alpha portions 140 of the five bus bar assemblies 130(1), 130(2), 130(3), 130(4), 130(5) and the cell terminals 214, 216. The insulation layer 180 is electrically and thermally insulating. For example, in some embodiments, the insulation layer may have a dielectric breakdown voltage of 2.6 kV, and may have a thermal conductivity of 0.17 W/mK, whereby it can accommodate, without failure, temperatures of at least 800 degrees Celsius. In addition, the insulation layer 180 provides a flame barrier. For example, in some embodiments, the insulation layer 180 has a flame resistance rating of V-0, 5VA when classified using the UL 94 test method (e.g., a plastics flammability standard released by Underwriters Laboratories of the United States).

The insulation layer 180 includes secondary connection through holes 188. A secondary connection through hole 188 is provided for each cell 200 of the quadrant, and each secondary connection through hole 188 is aligned with a corresponding primary connection through hole 142, thereby exposing the ends of the cells so that an electrical connection can be made between the exposed cell terminal 214 or 216 and the alpha portion 140 using the electrical connector 160. The secondary connection through hole 188 is circular, and has a diameter d4 that is smaller than the diameter d1 of the cells 200 and the diameter d2 of the primary connection through holes 142. Since the secondary connection through hole 188 is smaller in diameter than the primary connection through hole 142, an insulating border or margin is provided within each primary connection through hole 142 that reduces the likelihood of a short circuit between the substrate 138 and a cell terminal 214, 216 in the vicinity of the primary connection through hole 142. The insulation layer 180 also includes secondary flow through holes 190 that are aligned with the primary flow through holes 144, and have the same diameter d3 as the primary flow through holes 144.

In some embodiments, the insulation layer 180 may be in the form of a thin sheet having a first side 182 that faces the alpha portion 140 and a second side 184 that faces the cell array 202. The sheet used to form the insulation layer 180 may be a paper sheet, a ceramic sheet, a paper sheet that is coated with a ceramic, a film or other suitable thin material. The first side 182 of the sheet-form insulation layer 180 may include an adhesive coating that secures the insulation layer 180 to the alpha portion 140. In addition, the second side 184 of the insulation layer 180 may include an adhesive coating that secures the insulation layer to the exposed cell ends. For example, the first and second sides 182, 184 of the insulation layer 180 may include a pressure sensitive adhesive coating. In other embodiments, the insulation layer 180 may be a coating that is provided on (for example, bonded to) the cell-facing side 132 of the alpha portion 140 of the substrate 138. The coating may be applied to the surface by any appropriate method such as a sintering process or a vapor deposition process.

Figure 27:
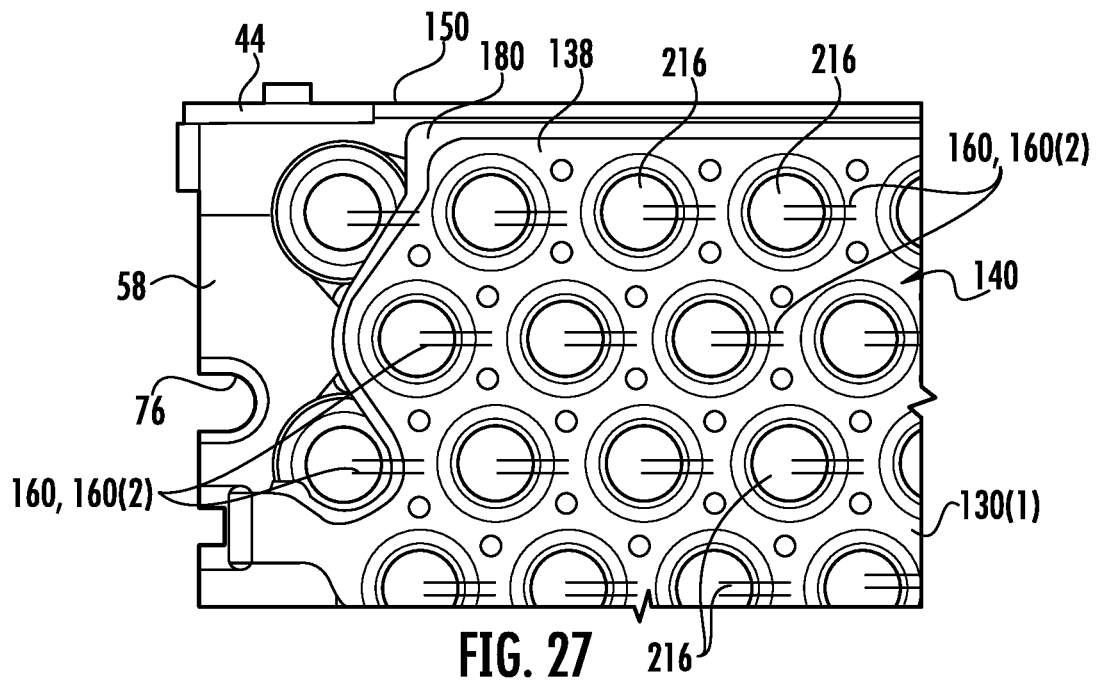
FIG. 27 is a detail view of a portion of the battery module showing electrical connections between negative cell terminals and the corresponding bus bar.
Figure 28:
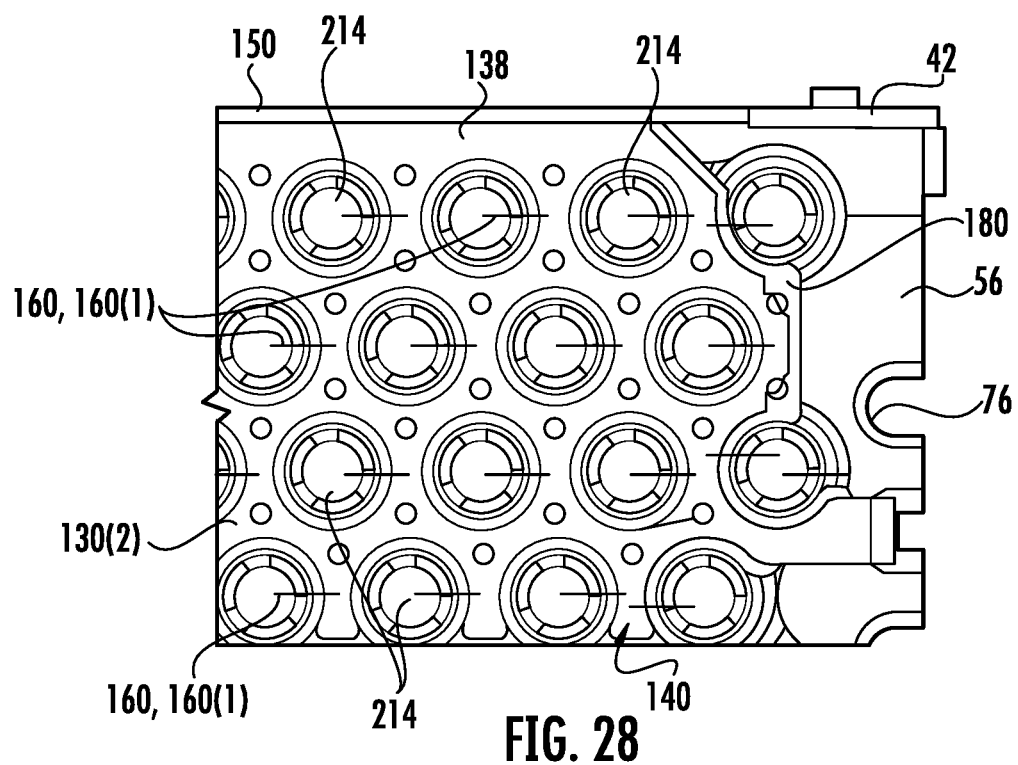
FIG. 28 is a detail view of a portion of the battery module showing electrical connections between positive cell terminals and the corresponding bus bar.
Figure 31:
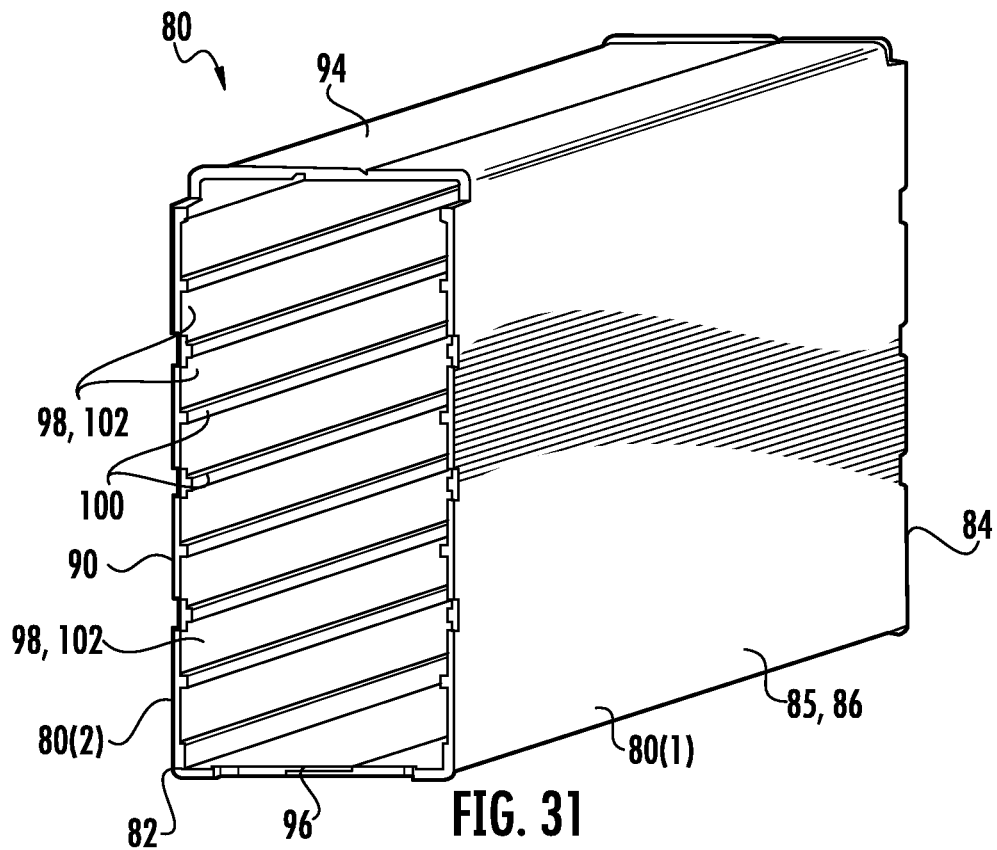
FIG. 31 is a perspective view of the isolated spacer.
Figure 32:
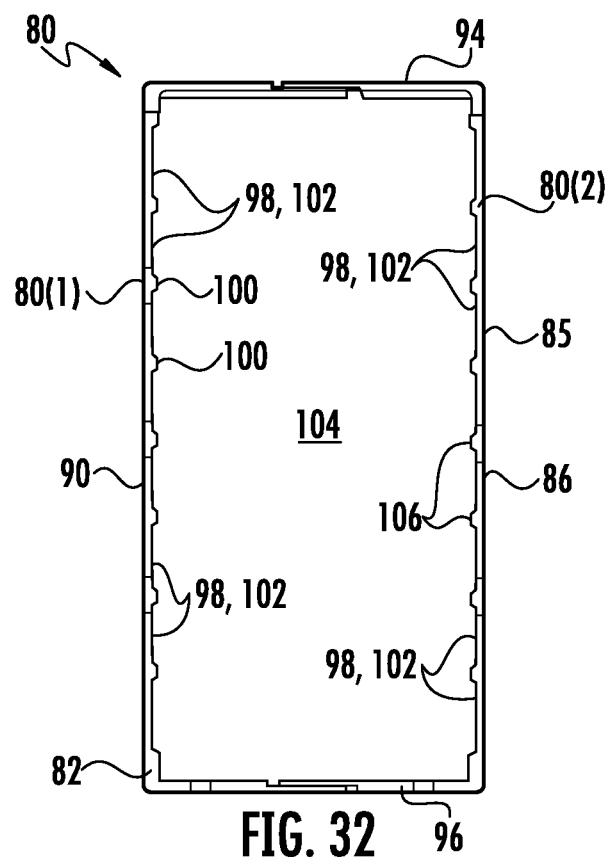
FIG. 32 is an end view of the isolated spacer.
Figure 33:
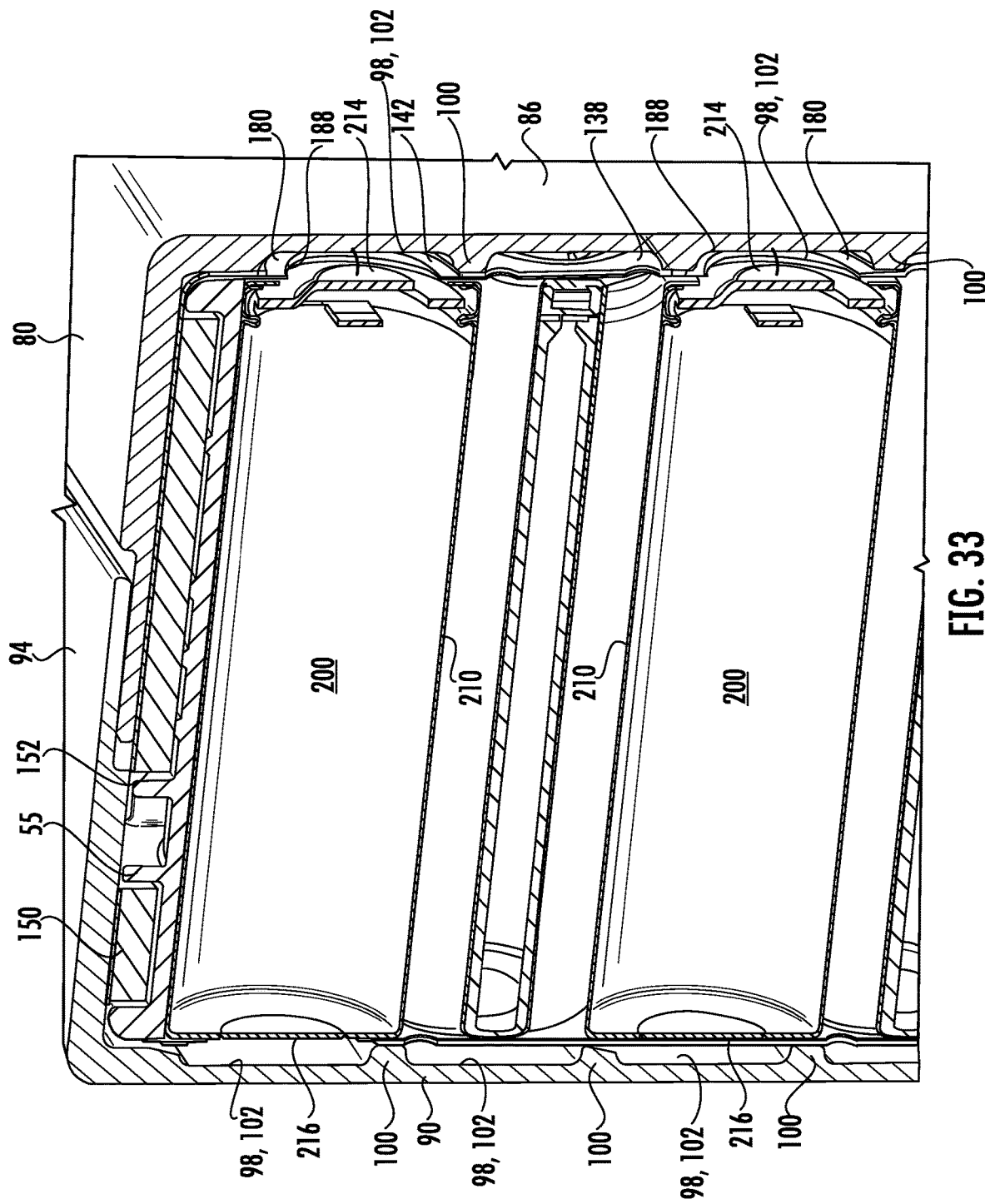
FIG. 33 is a detail view of the cross-sectional view of the battery module as indicated by dashed lines in FIG. 30.
Figure 34:
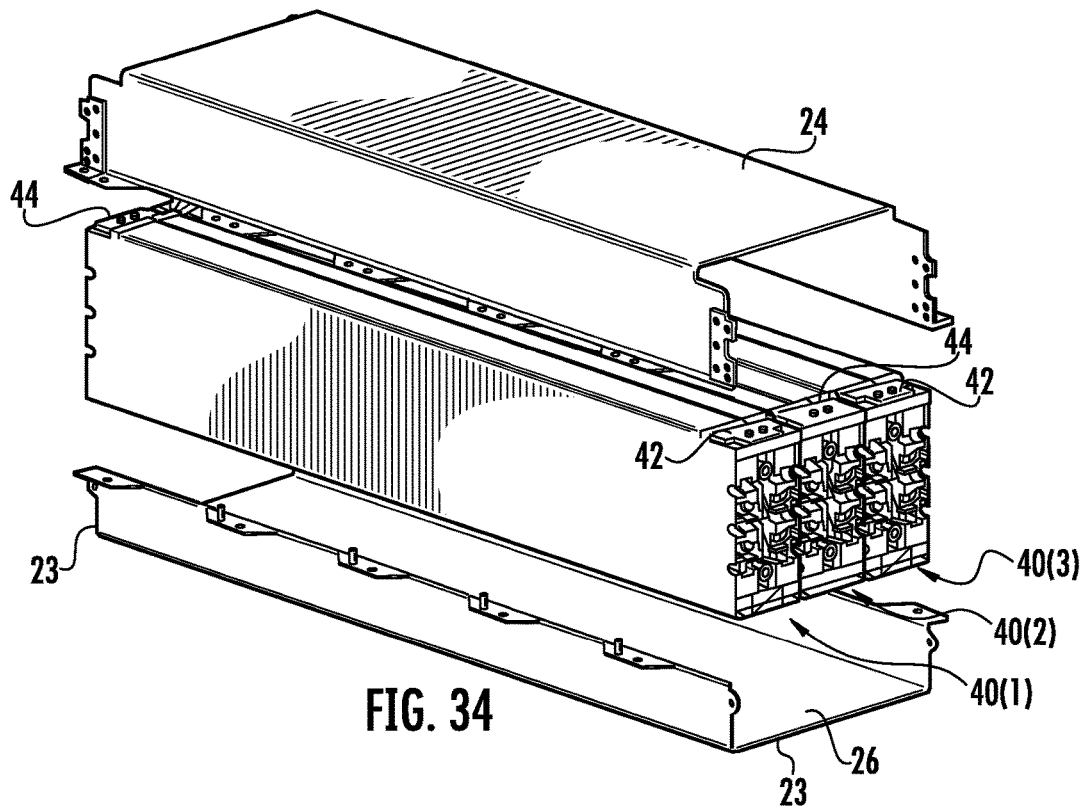
FIG. 34 is an exploded perspective view of the cassette.
Figure 35:
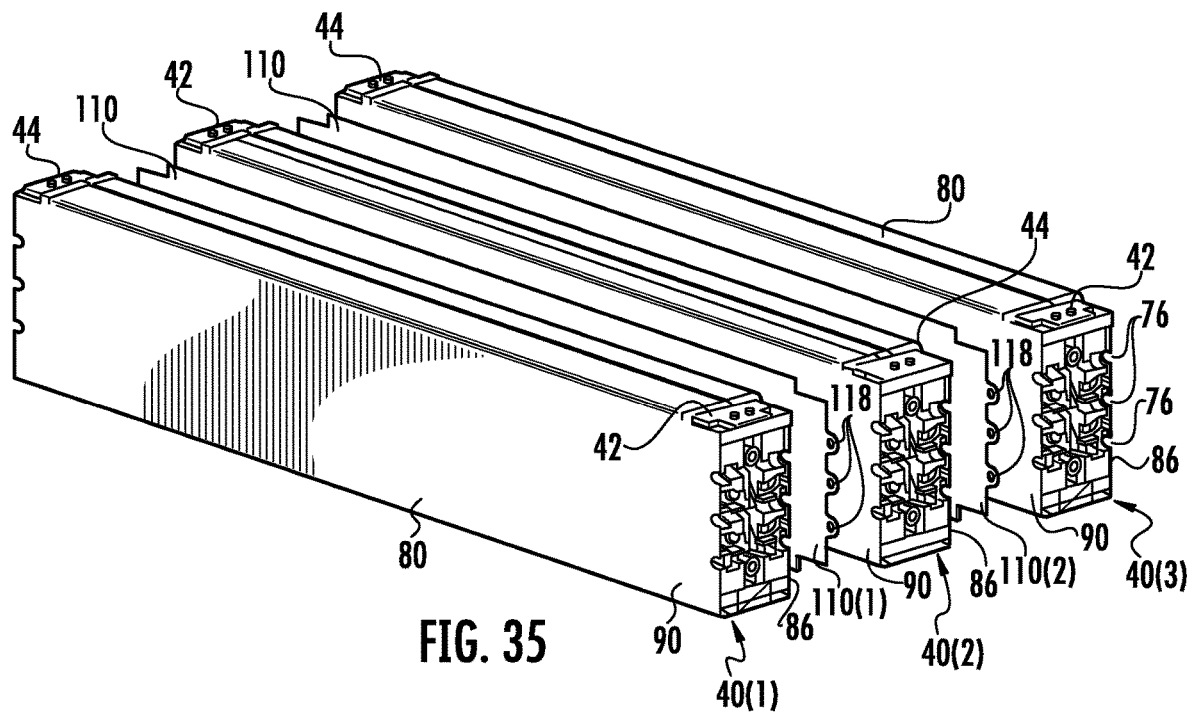
FIG. 35 is an exploded view of the battery modules and barriers of the cassette.
Figure 36:
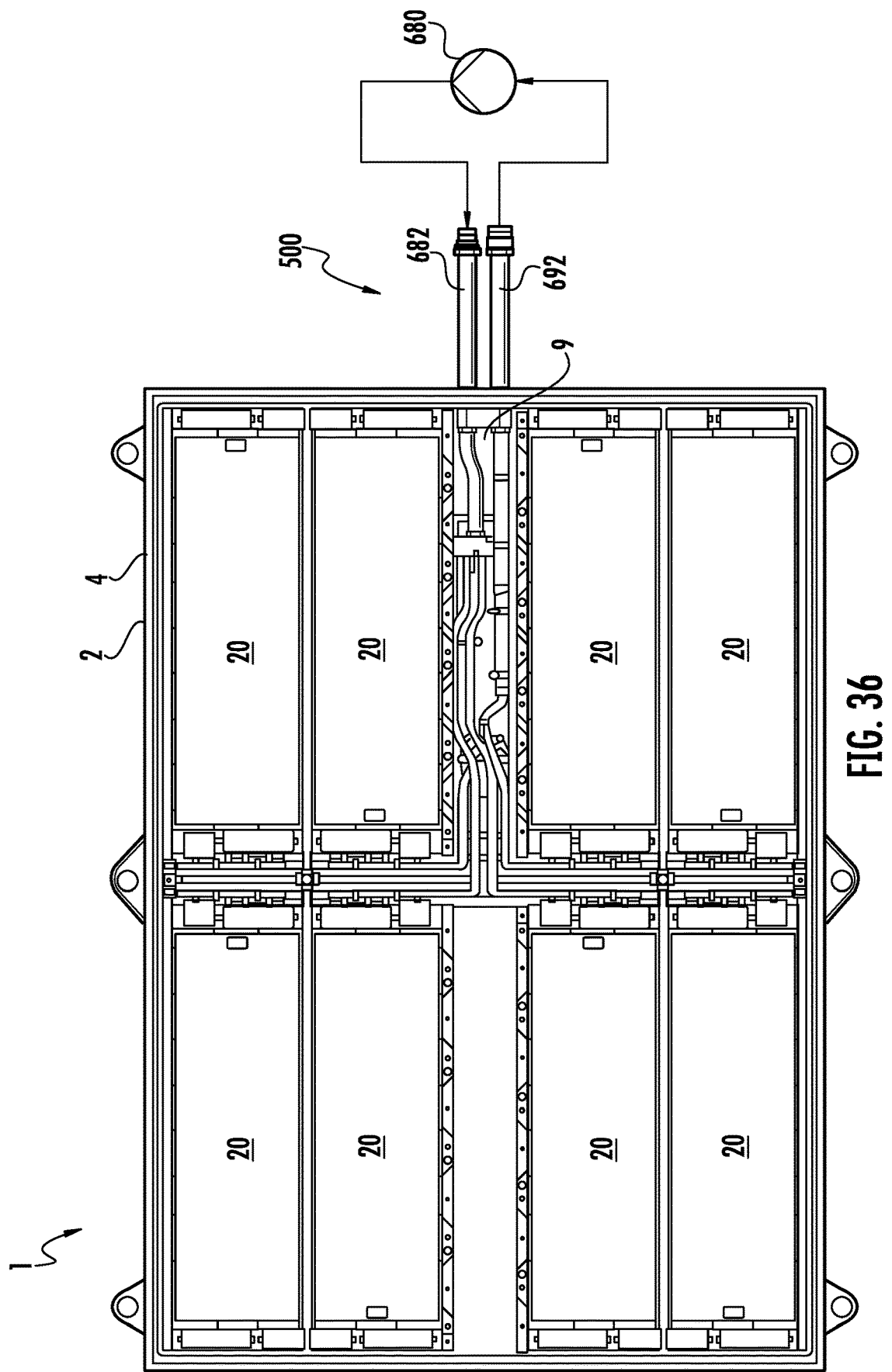
FIG. 36 is a top view of the battery pack housing with the lid and ancillary structures omitted to illustrate the thermal management system, with the pump illustrated schematically.
Figure 37:
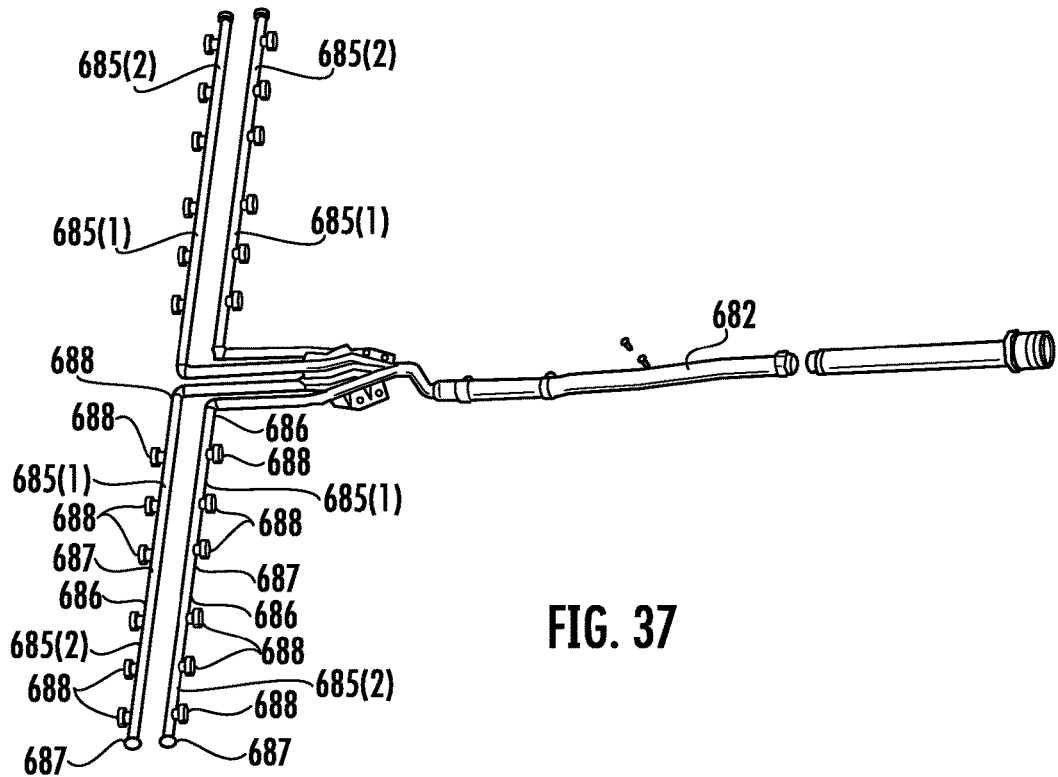
FIG. 37 is a perspective view of the isolated fluid delivery portion of the thermal management system.
Figure 38:
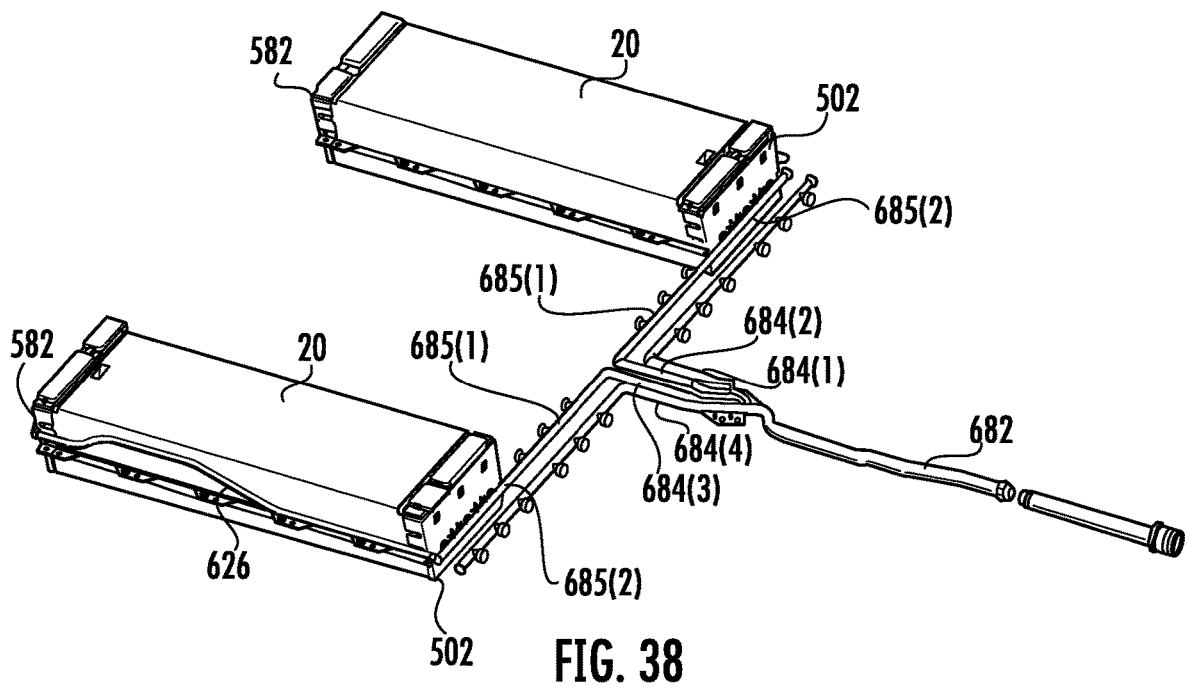
FIG. 38 is a perspective view of the isolated fluid delivery portion of the thermal management system illustrating connections between the fluid delivery portion and two cassettes.
Figure 39:
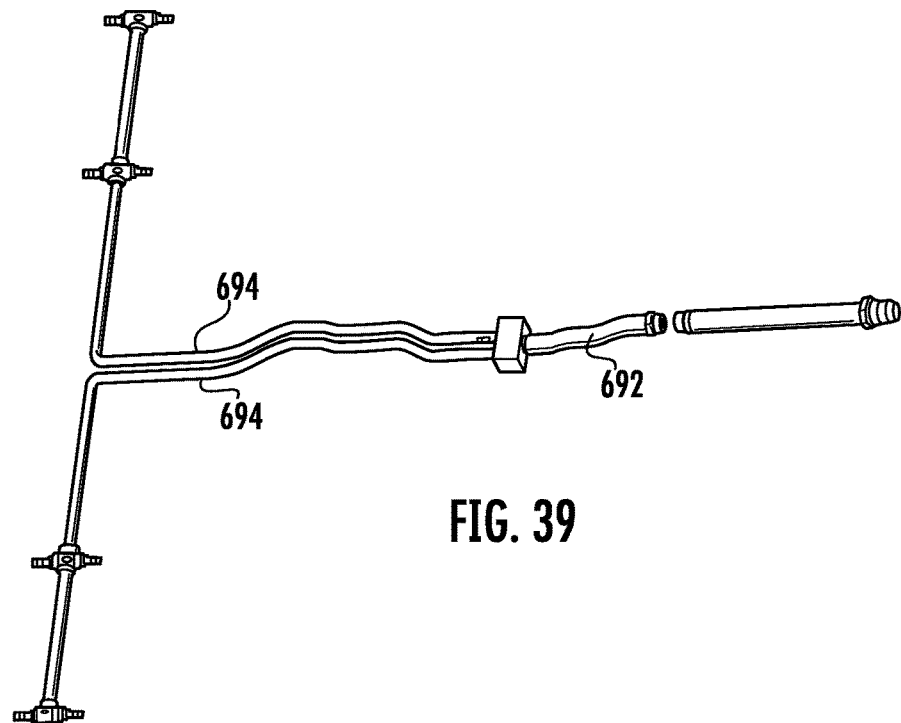
FIG. 39 is a perspective view of the isolated fluid return portion of the thermal management system.
Figure 40:
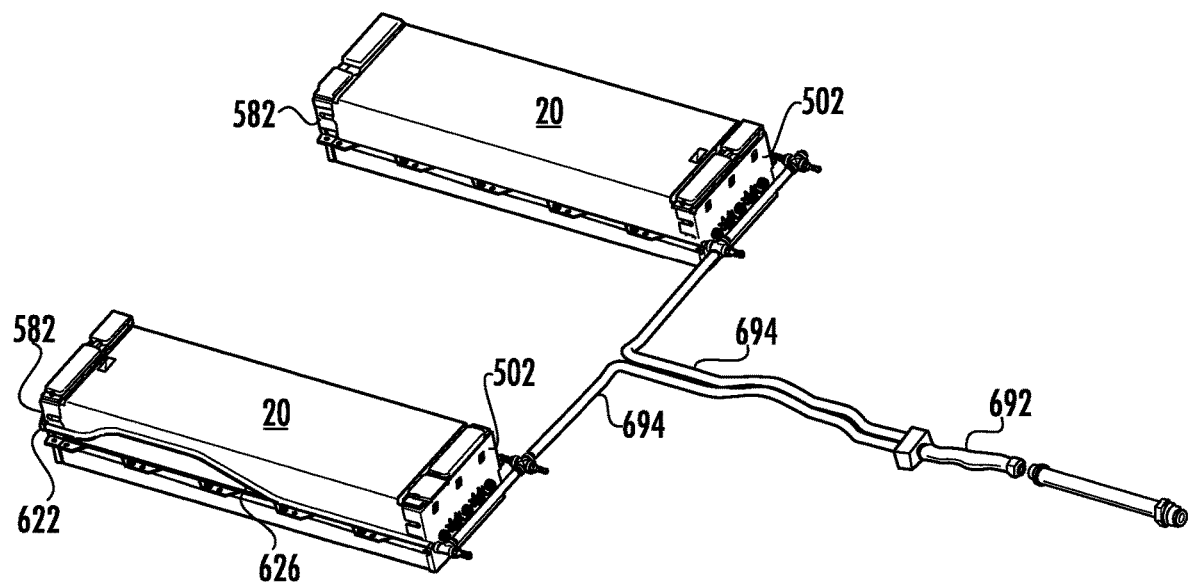
FIG. 40 is a perspective view of the isolated fluid return portion of the thermal management system illustrating connections between the fluid return portion and two cassettes.
Figure 47:
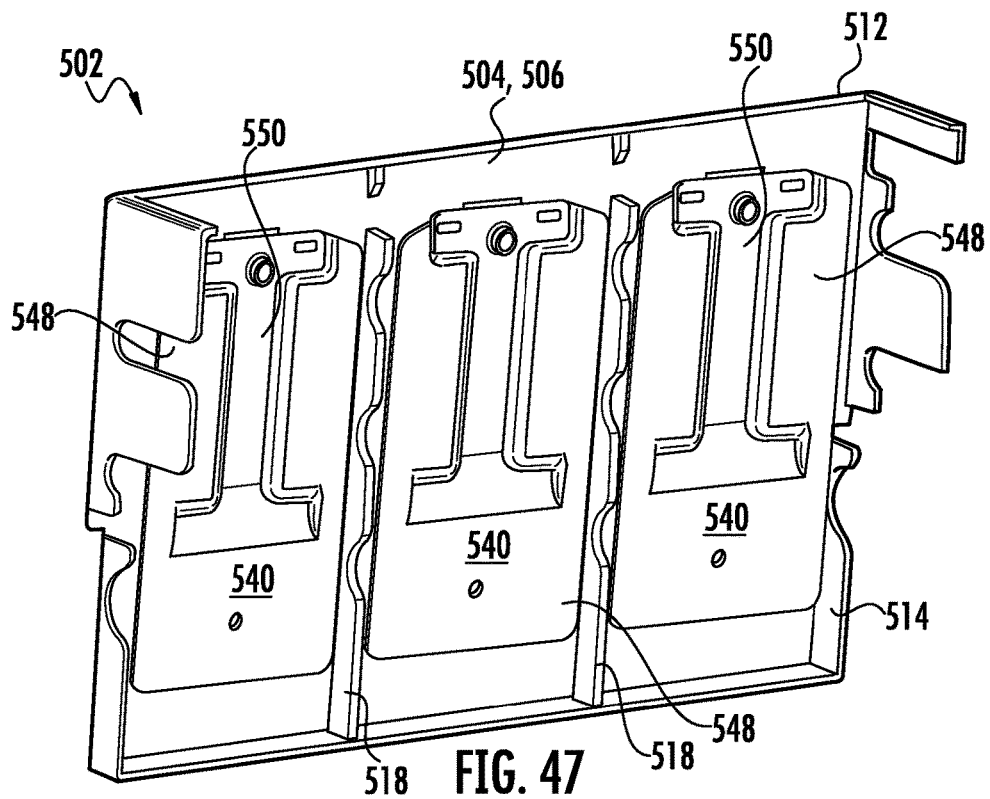
FIG. 47 is a perspective view of the module-facing surface of the inlet plenum assembly.
Figure 48:
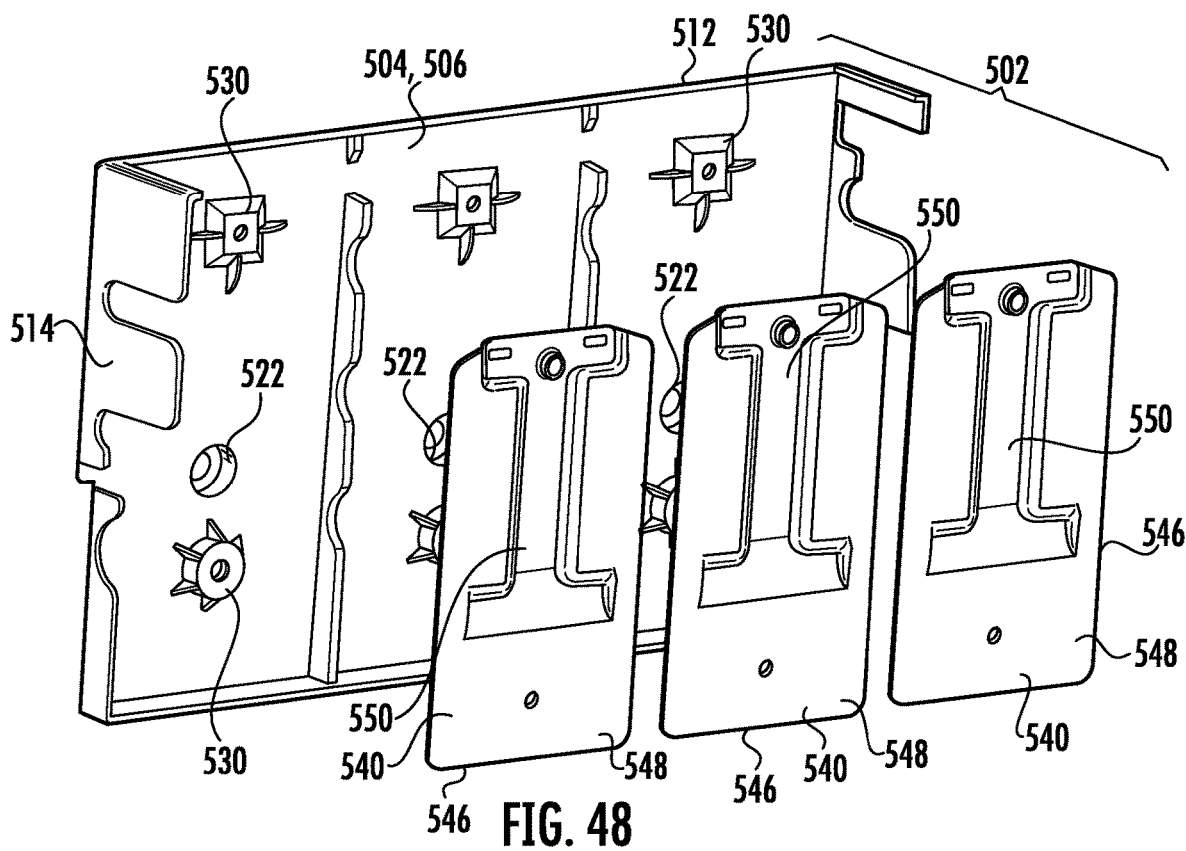
FIG. 48 is an exploded perspective view of the inlet plenum assembly of FIG. 47.
Figure 49:
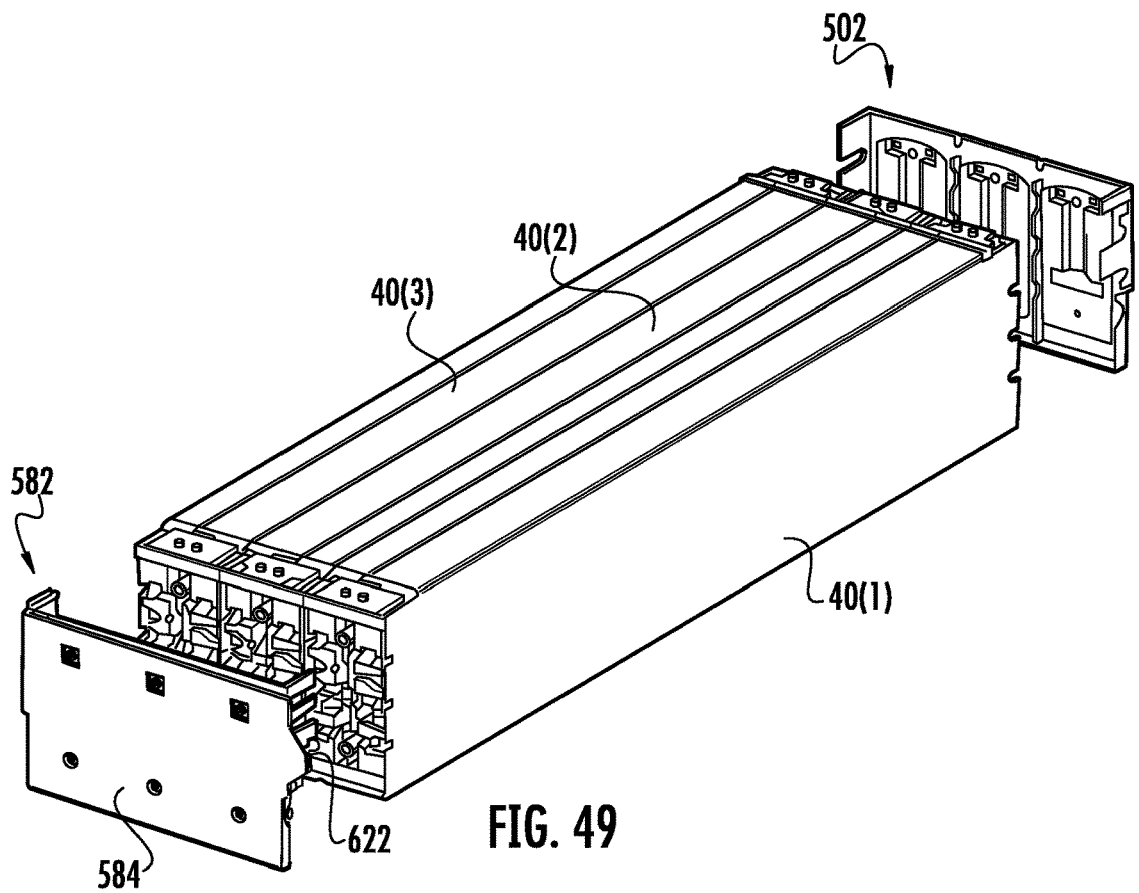
FIG. 49 is a perspective exploded view of the cassette with the cassette housing omitted and illustrating the outlet plenum assembly.
Figure 50:
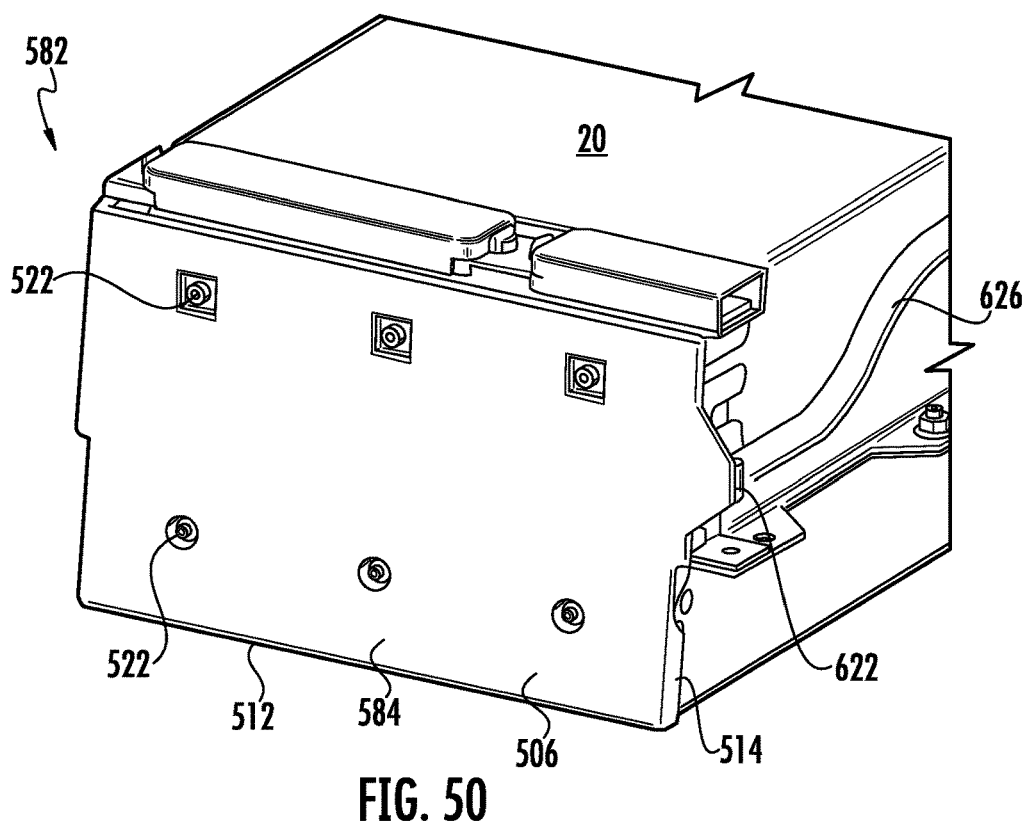
FIG. 50 is a perspective view of a portion of the cassette illustrating the outlet plenum assembly.
Figure 51:
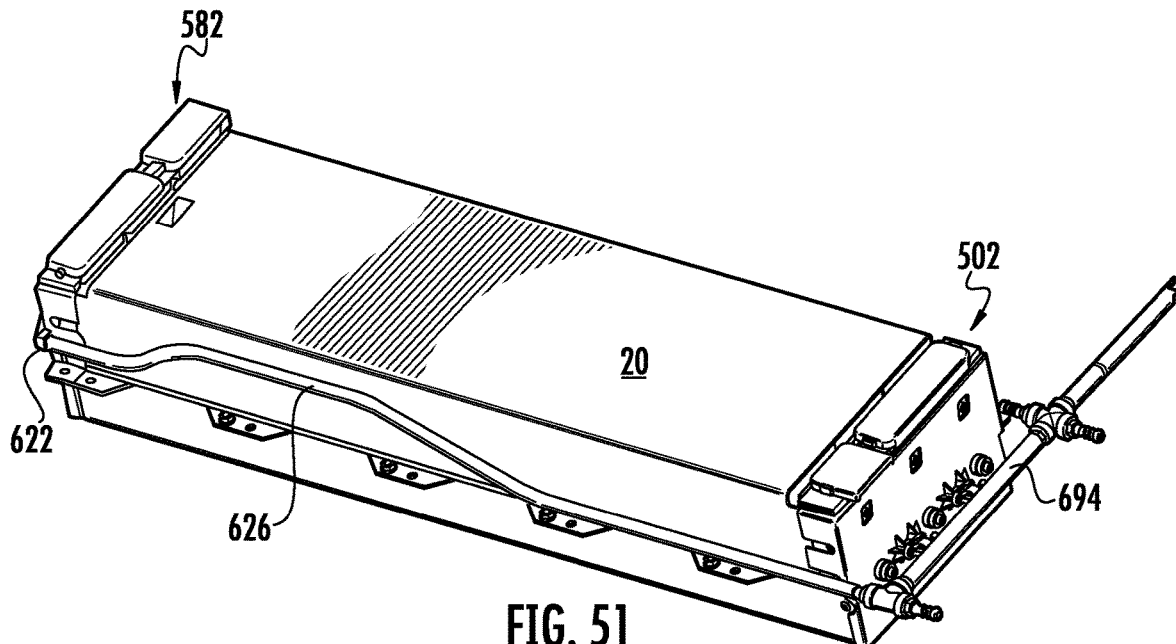
FIG. 51 is a perspective view of a portion of the cassette illustrating the outlet plenum assembly including fluid return branch line connected to the outlet opening of the outlet plenum assembly.
Figure 52:
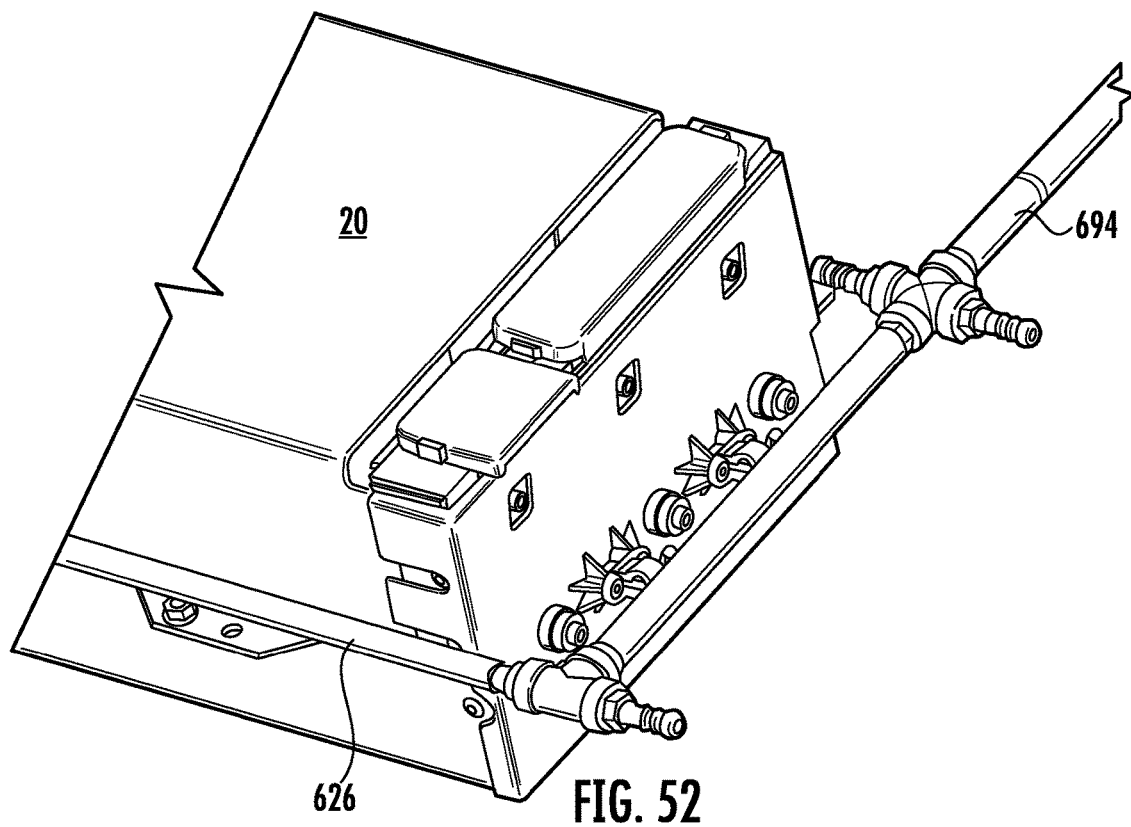
FIG. 52 is an enlarged perspective view FIG. 51.
Figure 53:
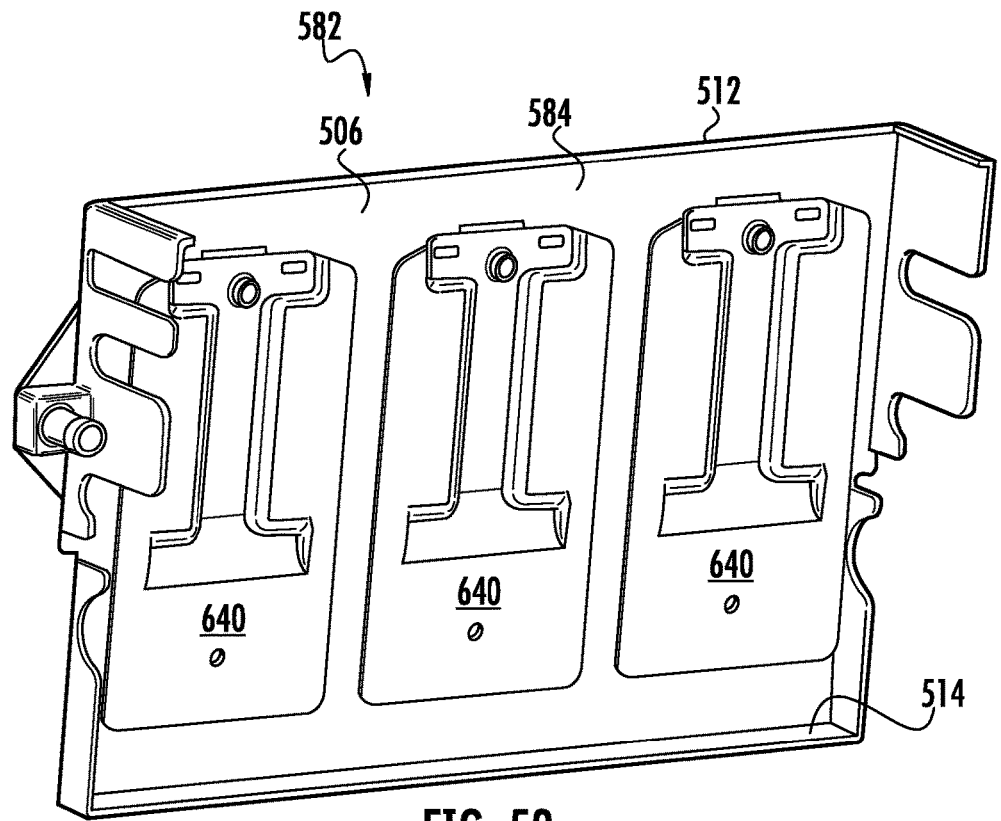
FIG. 53 is a perspective view of the module-facing surface of the outlet plenum assembly.
Figure 54:
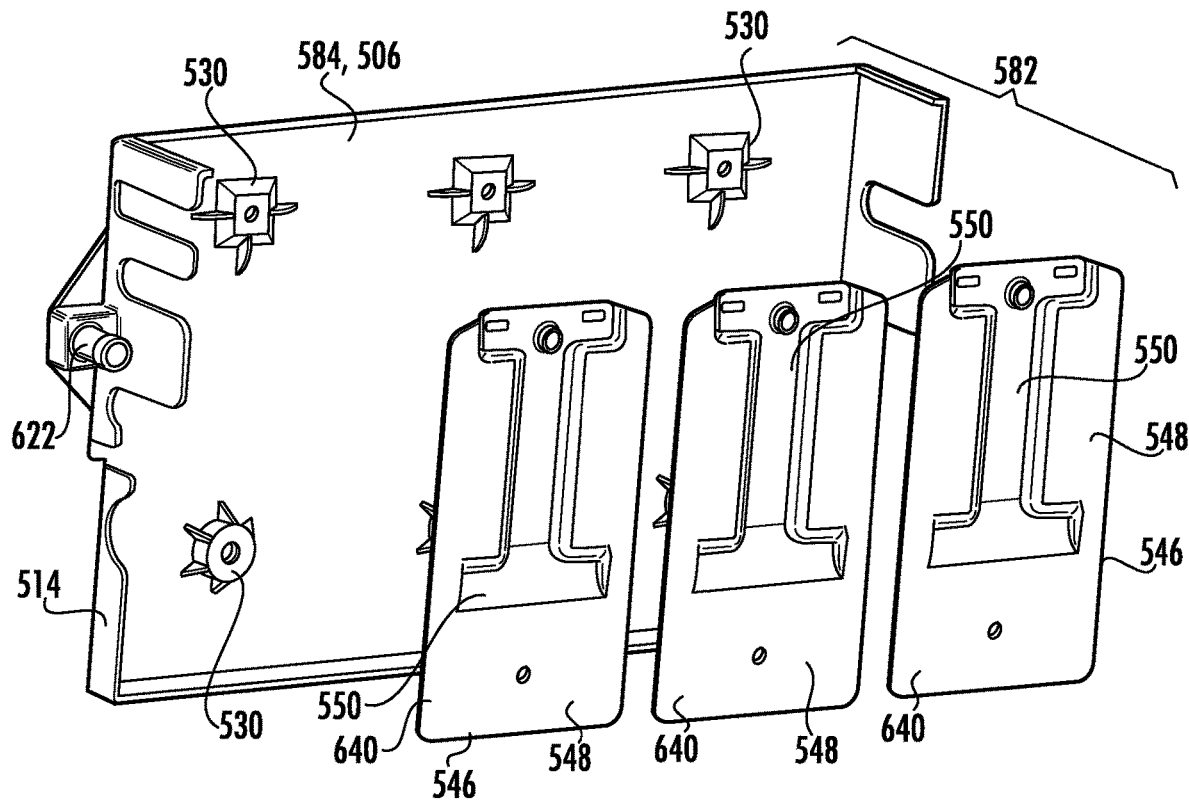
FIG. 54 is an exploded perspective view of the outlet plenum assembly of FIG. 53.

Referring to FIGS. 27-28, for each cell terminal 214, 216, an electrical connector 160 extends between, and provides an electrical connection between the cell terminal 214, 216 and the alpha portion 140 of the corresponding bus bar assemblies 130(1), 130(2), 130(3), 130(4), 130(5) (e.g., the bus bar assembly that faces the cell terminal). For example, the electrical connector 160 may be a wire bond, but is not limited to this type of electrical connector. As used herein, the term "wire bond" refers to an electrical connector in the form of a fine wire composed of high purity gold, aluminium or copper that is attached at one end to the substrate 138 and at the other end to a terminal 214, 216 via a wire bonding process. Other suitable electrical connectors may be used in place of a wire bond as required by the specific application. For example, another suitable electrical connector may include a direct weld between a cell terminal 214, 216 and the alpha portion 140 of the corresponding bus bar assemblies 130(1), 130(2), 130(3), 130(4), 130(5).

In the battery module 40, the positive terminal 214 of each cell 200 is connected to the alpha portion 140 of one bus bar assembly 130 via a first electrical connector 160(1) (FIG. 28), and the negative terminal of that cell 200 is connected to the alpha portion 140 of another bus bar assembly via a second electrical connector 160(2) (FIG. 27). In the illustrated embodiment, the current carrying capacity of the first electrical connector 160(1) is different than the current carrying capacity of the second electrical connector 160(2), e.g., the current carrying capacities of the electrical connectors 160(1), 160(2) are asymmetric. In particular, the current carrying capacity of the first electrical connector 160(1) is less than the current carrying capacity of the second electrical connector 160(2). By providing first and second electrical connectors 160(1), 160(2) in which the current carrying capacity of the first electrical connector 160(1) is less than the current carrying capacity of the second electrical connector 160(2), each cell is electrically connected to the respective bus bar assemblies 130 in such a way that the electrical connection to the cell positive terminal 214 fails before the electrical connection to the cell negative terminal 216, thereby opening the internal electrical circuit of battery module 40.

In the illustrated embodiment, the difference in current carrying capacity of the first and second electrical connectors 160(1), 160(2) is achieved by providing a single wire bond as the first electrical connector 160(1), and providing two wire bonds (e.g., a double wire bond) as the second electrical connector 160(2), where each wire bond has the same current carrying capacity.

In other embodiments, the difference in current carrying capacity of the first and second electrical connectors 160(1), 160(2) may be achieved by providing a single first wire bond as the first electrical connector 160(1), and a single second wire bond as the second electrical connector 160(2), where the first wire bond has a lower current carrying capacity than the second wire bond. This can be implemented, for example, by providing the first wire bond with a smaller diameter than the second wire bond.

In still other embodiments, the difference in current carrying capacity of the first and second electrical connectors 160(1), 160(2) may be achieved by providing a single first wire bond as the first electrical connector 160(1), and a direct weld between the substrate 138 and the negative terminal 216 as the second electrical connector 160(2).

In still other embodiments, the difference in current carrying capacity of the first and second electrical connectors 160(1), 160(2) may be achieved by providing a first electrically conductive strip or lead as the first electrical connector 160(1), and a second electrically conductive strip or lead as the second electrical connector 160(2), where the first electrically conductive strip includes a fuse. This can be implemented, for example, by providing the first electrically conductive strip with a necked portion that fails at a lower current than the remainder of the strap.

Referring to FIGS. 8 and 30-33, the frame 50, including the array 202 of cells 200 that is supported therein, and the bus bars 130 which overlie the cell ends 207, 208 and the cover and base plates 52, 54 of the frame 50, are disposed within the spacer 80. The spacer 80 is an elongate, rectangular, thin-walled tube that includes an open spacer first end 82, an open spacer second end 84 that is opposed to the spacer first end 82 and a spacer sidewall 85 that extends between the spacer first end 82 and the spacer second end 84.

The spacer sidewall 85 has a rectangular shape when seen facing the spacer first or second ends 82, 84, and thus includes four wall portions 86, 90, 94, 96. In particular, the spacer sidewall 85 includes a first wall portion 86, a second wall portion 90 that is spaced apart from, and parallel to, the first wall portion 86, a third wall portion 94 that is perpendicular to the first wall portion 86 and joins the first wall portion 86 to the second wall portion 90, and a fourth wall portion 96 that is spaced apart from, and parallel to the third wall portion 94. The fourth wall portion 96 joins the first wall portion 86 to the second wall portion 90.

The first, second, third and fourth wall portions 86, 90, 94, 96 cooperate to define a spacer interior space 104. The frame 50 is disposed in the spacer interior space 104 in such a way that the first wall portion 86 of the spacer 80 overlies the alpha portions 140 of the first, second and third bus bar assemblies 130(1), 130(2), 130(3) on the first side of the cell array 202. In addition, the second wall portion 90 of the spacer 80 overlies the alpha portions 140 of the fourth and fifth bus bar assemblies 130(4), 130(5) on the second side of the cell array 202. As a result, each of the cell first ends 207 and each of the cell second ends 208 face either the first wall portion 86 or the second wall portion 90. In addition, the frame first and second end caps 56, 58 are disposed in the open spacer first and second ends 82, 84.

The inner surface 88 of the first wall portion 86 and the inner surface 92 of the second wall portion 90 each include linear grooves 98 that extend from the spacer first end 82 to the spacer second end 84. The grooves 98 serve as fluid passageways within the battery module 40, and the same engineered fluid used to flood the battery pack 1 is actively pumped through the grooves 98, as discussed further below. The number of grooves 98 provided on each of the first and second wall portions 86, 90 corresponds to the number of rows of cells 200 in the cell array 202. Each groove 98 is aligned with a row of the cell array 202, and opens facing the cell array 202, whereby the cell ends 207, 208 and electrical connectors 160 are exposed to the cooling effect of the engineered fluid passing through the grooves 98. In other words, each groove 98 provides a coolant fluid passageway 102 that flows between the spacer 80 and the cell array 202. To this end, the grooves 98 are shaped and dimensioned to accommodate a sufficient flow of coolant fluid to maintain the cells 200 at a desired temperature. In addition, the grooves 98 may be shaped and dimensioned to accommodate a flow of gas vented from a cell 200. In the illustrated embodiment, each groove 98 has a rectangular shape as seen when the spacer 80 is viewed in cross section, with lands 100 disposed between, and separating, adjacent grooves 98.

The fluid enters each groove 98 at the spacer first end 82 and may exit the groove 98 at the spacer second end 84. The engineered fluid within the grooves 98 flows across the positive and negative cell terminals including the electrical connectors 160. In some embodiments, the electrical connectors 160 are aligned with the flow direction (e.g., are oriented parallel to the direction of elongation of the grooves 98), whereby fluid pressure losses due to the presence of the electrical connectors 160 in the fluid passageway 102 are minimized.

Because the battery pack 1 is flooded with the engineered fluid, the components of the battery module 40 including the frame 50 and the spacer 80 are not fluid sealed to each other or to other components of the battery module 40. Although the fluid is directed through the fluid passageways 102 defined by the grooves 85, the fluid is not prevented from flowing throughout the battery module 40, including between sidewalls 210 of adjacent cells 200 and through the primary and secondary flow through holes 144, 190 of the bus bar assemblies 130.

The frame 50 and the spacer 80 are formed of a dielectric material such as a polymer. The spacer 80 may be manufactured as a single-piece structure (not shown), or, for ease of assembly with the frame 50, may be manufactured in two U-shaped halves 80(1), 80(2).

Referring to FIGS. 4-5 and 34-35, as previously discussed, each cassette 20 includes three battery modules 40(1), 40(2), 40(3) supported within a cassette housing 22. The cassette housing 22 includes a rigid, U-shaped upper portion 24, and a rigid, U-shaped lower portion 26, which cooperate to form the tube-shaped cassette housing 22 having open ends 23. In some embodiments, the upper and lower portions 24, 26 are formed of steel.

The three battery modules 40(1), 40(2), 40(3) are arranged side-by-side within the cassette housing 22, with a barrier 110 disposed between each adjacent battery module 40. In particular, a first barrier 110(1) is disposed between the first wall portion 86 of the first battery module 40(1) and the second wall portion 90 of the second battery module 40(2), and a second barrier 110(2) is disposed between the first wall portion 86 of the second battery module 40(2) and the second wall portion 90 of the third battery module 40(3). In this configuration, the cell ends 207, 208 of the cells 200 of the one battery module 40 face the cell ends 207, 208 of the cells 200 of the adjacent battery module 40. By placing the barrier 110 between the respective wall portions 89, 90 of the adjacent modules 40(1), 40(2), 40(3) the barrier 110 may serve as a thermal and mechanical shield in the event of cell venting and/or a thermal runaway of a cell 200 of one of the modules 40. To this end, the barrier 110 is a rigid, thin metal plate that is impermeable to gas and has a melting temperature that is greater than 1000 degrees Celsius. In the illustrated embodiment, the barrier 110 is a thin steel plate.

Figure 5:
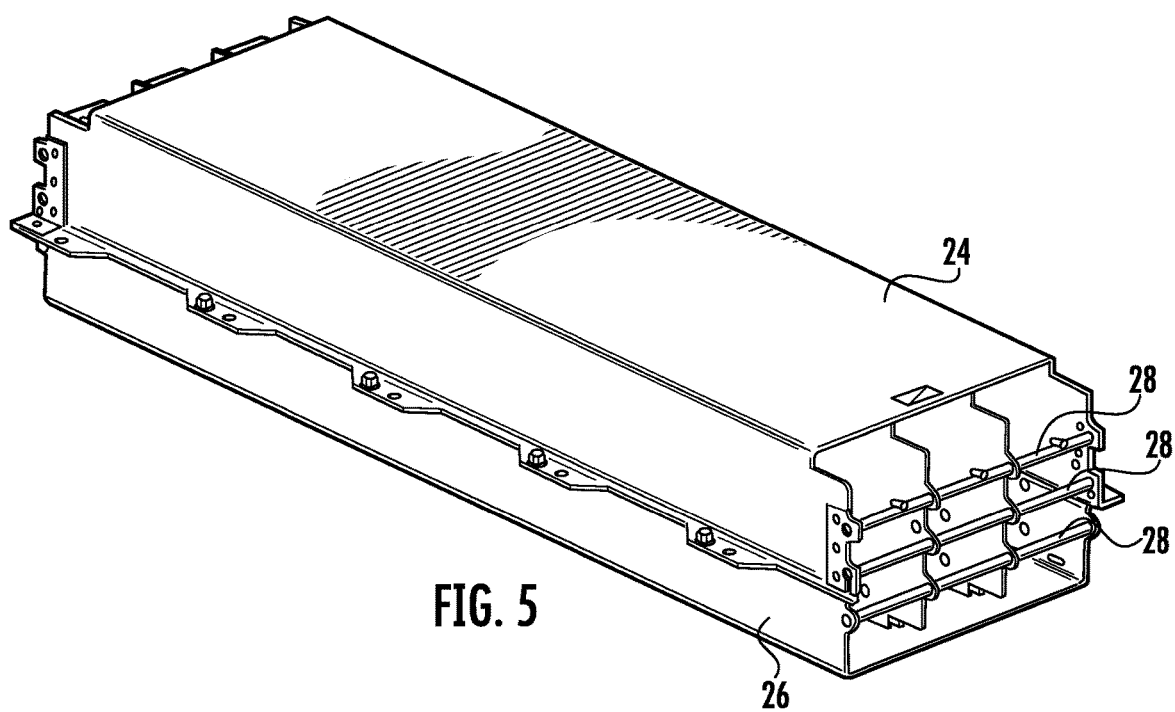
FIG. 5 is a perspective view of a cassette housing with the battery modules omitted.

The battery modules 40(1), 40(2), 40(3) are prevented from exiting the cassette housing open ends 23 by cylindrical retaining bars 28 (FIG. 5). The retaining bars 28 cooperate with the first grooves 76 of the frame first and second end caps 56, 58 and pass through openings 118 along a periphery of the barriers 110(1), 110(2) to retain the battery modules 40(1), 40(2), 40(3) within the cassette housing 22.

The three battery modules 40(1), 40(2), 40(3) are arranged within the cassette housing 22 in such a way that, the battery module terminals 42, 44 protrude outward from the cassette housing 22. In addition, at each open end 23 of the cassette housing 22, the polarities of the three protruding battery module terminals 42, 44 alternate in polarity.

Referring to FIGS. 36-40, the battery pack 1 includes a thermal management system 500 that actively directs the engineered fluid to each battery module 40 disposed in the battery pack housing 2. The thermal management system 500 includes a fluid pump 680, a fluid delivery line 682 that receives pressurized fluid from the fluid pump 680 and delivers it to the cassettes 20, and a fluid return line 692 that collects fluid from the cassettes 20 and returns it to the fluid pump 680. In the illustrated embodiment, the fluid pump 680 is located outside the battery pack housing 2, but in other embodiments, the fluid pump 680 may be disposed inside the battery pack housing 2.

Within the battery pack housing 2, the fluid delivery line 682 splits into four delivery branch lines 684(1), 684(2), 684(3), 684(4). Each delivery branch line 684(1), 684(2), 684(3), 684(4) delivers fluid to two adjacent cassettes 20. To this end, each delivery branch line 684(1), 684(2), 684(3), 684(4) includes a first manifold portion 685(1) that directs fluid to an inlet plenum assembly 502 of the a first one of the adjacent cassettes 20, and a second manifold portion 685(2) that directs fluid to an inlet plenum assembly 502 of the second one of the adjacent cassettes 20. The inlet plenum assembly 502 of each cassette 20 is substantially identical, and an inlet plenum assembly 502 will be described in detail below. Each of the first and second manifold portions 685(1), 685(2) is a tube having an inlet end 686, an opposed outlet end 687, and three delivery ports 688. An inlet end 686 of the first manifold portion 685(2) is connected to a corresponding branch line 684 the fluid delivery line 682, and an outlet end 687 of the first manifold portion 685(1) is connected to an inlet end 686 of the second manifold portion 685(2). The outlet end 687 of the second manifold portion 685(2) is capped (e.g., plugged). The three delivery ports 688 are each connected to inlet openings 522 of the corresponding inlet plenum assembly 502, and provide the fluid to the inlet plenum assembly 502 in parallel.

Each delivery port 688 may include an orifice balancer 690 (FIGS. 44-46). The orifice balancer 690 is an annulus that is disposed within the delivery port 688, and the dimensions of an inner surface 692 of the orifice balancer 690 determine a flow rate through the delivery port 688. By appropriate selection of the dimensions of the orifice balancer 690, the rate of fluid flow through the delivery port 688 can be controlled and adjusted.

Each cassette 20 includes an outlet plenum assembly 582 having an outlet opening 622 and an outlet line 626. The outlet plenum assembly 582 of each cassette 20 is substantially identical, and an outlet plenum assembly 582 will be described in detail below. The outlet line 626 from each cassette 20 is joined to one of two return branch lines 694, which merge into the fluid return line 692.

Referring to FIGS. 41-48, the inlet plenum assembly 502 closes one of the two open ends 23 of the cassette housing 22, and directs fluid to each battery module 40(1), 40(2), 40(3) disposed in the cassette 20. The inlet plenum assembly 502 includes an inlet plenum 504, and inlet flow diverters 540 that are disposed between the inlet plenum 504 and each battery module 40(1), 40(2), 40(3).

The inlet plenum assembly 502 simultaneously distributes fluid to each battery module 40(1), 40(2), 40(3) of the cassette 20. To this end, the inlet plenum 504 and the inlet flow diverters 540 have features that cooperate to simultaneously direct fluid toward the fluid passageways 102 provided in the spacers 80 of each battery module 40(1), 40(2), 40(3), as will now be described.

The inlet plenum 504 comprises an end plate 506 that is parallel to the end caps 56, 58 of the frame 50, and a rim 514 that protrudes from a module-facing surface 508 of the end plate 506. The rim 514 extends along a portion of a peripheral edge 512 of the end plate 506. In the illustrated embodiment, the end plate 506 has a rectangular profile, and the rim 514 extends along three sides of the endplate 506. In use, the rim 514 overlies the cassette housing 22. In addition, the inlet plenum 504 includes a pair of rails 518 that protrude from the module-facing surface 508 of the end plate 506. The rails 518 extend linearly and in parallel to the frame first and second wall portions 86, 90. A rail 518 is aligned with each barrier 110, and thus is configured to receive fluid diverted from an inlet flow diverter 540 and direct it toward the fluid passageways 102.

The inlet plenum end plate 506 includes three fluid inlet openings 522 that are connected to a fluid delivery port 688 of a manifold portion 685 and receive fluid from the fluid delivery line 682. The fluid inlet openings 522 are arranged in a linear row, and a rail 518 is disposed between each adjacent fluid inlet opening 522. Each fluid inlet opening 522 faces one battery module 40 of the three battery modules 40(1), 40(2), 40(3) of the cassette 20. In addition, each fluid inlet opening 522 is centered on an end cap 56, 68 of the frame 50 of the respective battery module 40, and is aligned with a surface of an inlet flow diverter 540, as discussed further below.

Each fluid inlet opening 522 is surrounded by a necked boss 524 that protrudes outwardly from an outward-facing surface 516 of the end plate 506. The boss 524 is shaped and dimensioned to received in, and form a mechanical connection with, a delivery port 688. For example, the boss 524 may have a press-fit connection with the delivery port 688. The orifice balancer 690 (FIGS. 44-46) is disposed in the delivery port 688, and is sandwiched between an inner surface of the delivery port 688 and a terminal end 526 of the necked boss 524. As previously discussed, the orifice balancer 690 enables the inlet plenum assembly 502 to provide fluid to one of the battery modules (e.g., the first battery module 40(1)) at a first fluid flow rate, and to provide fluid to another one of the battery modules (e.g., the second battery module 40(2)) at a second fluid flow rate, where the first fluid flow rate is different than the second fluid flow rate. This is achieved by providing the appropriately sized orifice balancer in the delivery port 688.

The inlet plenum end plate 506 includes snap-fit clips 528 that protrude outwardly from the end plate outward-facing surface 516. The clips 528 receive and support one of the first and second manifold portions 685(1), 685(2).

An inlet flow diverter 540 is provided for each battery module 40(1), 40(2), 40(3) of the cassette 20, and is disposed between the inlet plenum end plate 506 and the frame end cap 56, 58 of the respective battery module 40(1), 40(2), 40(3). The inlet flow diverter 540 is a contoured, rigid plate that is configured to receive fluid that exits the fluid inlet opening 522 and divert the fluid toward the fluid passageways 120 of the respective battery module 40(1), 40(2), 40(3). The inlet flow diverter 540 includes planar first portion 548 that adjoins a peripheral edge 546 of the inlet flow diverter 540, and a domed (e.g., bulging) second portion 550 that is surrounded by the first portion 548. The first portion 548 is parallel to the end plate 506. The second portion 550 protrudes toward the end plate 506 and is aligned with a fluid inlet opening 522. In the illustrated embodiment, the first portion 548 of the inlet flow diverter 540 is secured together with the end plate 506 to the end cap 56, 58 of the frame 50 of the respective battery module 40(1), 40(2), 40(3). In the illustrated embodiment, fasteners such as screws 522 are used to secure the flow diverter 540 and the end plate 506 to the frame 50, and the fastener openings in the end plate 506 are surrounded by stand-offs 530 that provide spacing between the end plate 506 and the flow diverter 504. The inlet flow diverter 540 diverts fluid toward the fluid passageways 120 while diverting fluid away from the first and second grooves 76, 78 provided in the outward facing surface of the respective frame end cap 56, 58.

Referring to FIGS. 49-54, the outlet plenum assembly 582 closes the other of the two open ends of the cassette housing 22. That is, the outlet plenum assembly 582 and the inlet plenum assembly 502 are disposed on opposed ends of the cassette housing 22. The outlet plenum assembly 582 collects fluid discharged from the grooves 98 (e.g., the fluid passageways 102) of the battery module spacers 80. The outlet plenum assembly 582 includes an outlet plenum 584, and outlet flow diverters 640 that are disposed between each battery module 40(1), 40(2), 40(3) and the outlet plenum 584. The outlet plenum 584 is similar to the inlet plenum 504. For this reason, common reference numbers are used to refer to common elements and the description of the common elements is not repeated. The outlet plenum 584 differs from the inlet plenum 504 in that the inlet openings 522, the necked bosses 524 and the rails 518 are omitted. In addition, the outlet plenum includes a single outlet opening 622 that is disposed on an outward-facing surface of the rim 514 and is in fluid communication with the space within the outlet plenum 584. The outlet flow diverters 640 are identical to the inlet flow diverters 540. Again, common reference numbers are used to refer to common elements. The outlet plenum assembly 582 permits fluid that exits each of the fluid channels 120 of the spacer 80 to be collected in the outlet plenum 584 and directed to the outlet opening 622. The outlet opening 622 is connected to the fluid return line 692 via the outlet line 626 and the return branch lines 694.

Referring to FIGS. 55-60, the battery pack 1 includes a pressure management system 300 that provides passive management of the pressure within the sealed battery pack housing 2. The pressure management system 300 may be advantageous, for example, when the engineered fluid has a high coefficient of expansion, and may be sensitive to temperature and/or altitude changes. The pressure management system 300 includes at least one flexible and expandable pressure compensation device 330 that is disposed within the battery pack housing 2, a vent block 302 that is disposed on an outer surface of the battery pack housing 2, and fittings 380, 480 that provide fluid communication between the pressure compensation device 330 and the vent block 302.

In the illustrated embodiment, the pressure compensation device 330 is a set of independent, serially connected flexible and expandable bladders 340. The bladders 340 function like a lung in that the bladders 340 expand or contract to accommodate changes in volume of the changes of the engineered fluid within the sealed battery pack housing 2, for example due to pressure and temperature conditions surrounding the battery pack housing 2. The bladders 340 are a set of three separate bladders 340(1), 340(2), 340(3) that are serially connected via primary and secondary fittings 380, 480. The first bladder 340(1) is connected to, and fluidly communicates with, the vent block 302 via the primary fitting 380, and is connected to, and fluidly communicates with the second bladder 340(2) via the same primary fitting 380. The second bladder 340(2) is also connected to, and fluidly communicates with, the third bladder 340(3) via the secondary fitting 480.

Each bladder 340(1), 340(2), 340(3) is a closed bag that is formed of a gas and moisture impermeable material that is sufficiently flexible to permit the bladders 340 to expand and contract. In addition, each bladder 340(1), 340(2), 340(3) is sufficiently flexible to generally conform to the shape of adjacent structures within the battery pack 1, including the inner surfaces of the battery pack housing 2, the outer surfaces of the cassette housings 22 and other ancillary structures disposed in the battery pack housing 2.

In the illustrated embodiment, each bladder 340(1), 340(2), 340(3) is formed of a laminated sheet having a metal film layer and polymer layers. In one example, the laminated sheet may have three layers including a metal film outer layer, a polyethylene terephthalate (PET) film middle layer and a polypropylene film inner layer. In another example, the laminated sheet may have three layers including a PET film outer layer, a metal foil middle layer and a polypropylene film inner layer.

The number of bladders 340 and the size of each bladder 340 depends on the requirements of the specific application. In the illustrated embodiment, the bladders 340(1), 340(2), 340(3) each have a unique shape and size, and are shaped and dimensioned to fit within the space available within the battery pack 1, which also houses the cassettes 20. The cassettes 20 are arranged in a single layer within the battery pack container 4, and separated into two groups. The two groups of cassettes 20 are separated by a gap 9 (FIGS. 2, 36) that receives the fluid delivery and return lines 682, 692 of the thermal management system as well as other ancillary structures and devices (not shown). The bladders 340(1), 340(2), 340(3) are arranged in the battery pack housing 2 about the cassettes 20, as discussed in detail below.

The first bladder 340(1) is a larger than the second and third bladders 340(2), 340(3), and is disposed between the cassettes 20 and the lid 6. The first bladder 340(1) may be formed, for example, by layering a laminated first sheet 341 with a laminated second sheet 342, and sealing the periphery of the first and second sheets 341, 342 along a seal line 348(1) to form a closed first interior space 358(1). The peripheral edge 356(1) may be sealed, for example via heat application. The first bladder 340(1) has a length and width that are sufficient to overlie each of the eight cassettes 20, and has a very low profile. In other words, the height h1 of the first bladder 340(1) is very small relative to its length 11 and/or width w1, where the height h of each bladder 340 is parallel to the height hp of the battery pack housing 2. For example, when the first bladder 340(1) is uninflated, the height h1 of the first bladder 340(1) may correspond to about the thickness of two sheets 341, 342 of the material used to form the first bladder 340(1).

The first bladder 340(1) includes a first opening 351 that is formed in the first sheet 341 at a location spaced apart from the seal line 348(1) of the first bladder 340(1). The first opening 351 is shaped and dimensioned to receive a first portion 440 of the primary fitting 380 therethrough, and the first sheet 341 is sealed to the first portion 440 of the primary fitting 380 at the first opening 351.

The first bladder 340(1) includes a second opening 352 that is formed in the second sheet 342 at a location spaced apart from the seal line 348(1) of the first bladder 340(1). The second opening 352 is aligned with the first opening 351 in a direction parallel to the height h1. In addition, the second opening 352 is shaped and dimensioned to receive a second portion 442 of the primary fitting 380 therethrough, and the second sheet 342 is sealed to the second portion 442 of the primary fitting 380 at the second opening 352.

In addition, the first bladder 340(1) includes a pair of sealed through openings 358 at a location spaced apart from the bladder peripheral edge 356. The through openings 358 allow ancillary components of the battery pack 1 to pass through the first bladder 340(1). For example, in the illustrated embodiment, the through openings 358 allow fill tubes to pass through the first bladder 340(1). In the illustrated embodiment, the through openings 358 are arranged in the vicinity of the first and second openings 351, 352 such that one through opening 358 is disposed on each of opposed sides of the first and second openings 351.

The second bladder 340(2) is disposed in the gap 9 between the two groups of cassettes 20, and resides below the first bladder 340(1) with respect to the orientation of the battery pack 1 illustrated in FIG. 1. The second bladder 340(2) has an irregular shape, a relatively high profile as compared to the first bladder 341(1), and a width that corresponds to a width of the gap in which it resides. The second bladder 340(2) may be formed, for example, by layering a laminated third sheet 343 with a laminated fourth sheet 344, and sealing the peripheral edge 356(2) of the third and fourth sheets 343, 344 along a seal line 348(2) to form a closed second interior space 358(2). The peripheral edge 356(2) may be sealed, for example via heat application. The second bladder 340(2) includes a third opening 353 that is formed in the third sheet 343 at a location spaced apart from the seal line 348(2) of the second bladder 340(2). The third opening 353 is shaped and dimensioned to receive a third portion 446 of the primary fitting 380 therethrough, and the third sheet 343 is sealed to the third portion 446 of the primary fitting 380 at the third opening 353.

In addition, the second bladder 340(2) includes a fourth opening 354 that is formed in the third sheet 343 at a location spaced apart from the seal line 348(2) of the second bladder 340(2). The fourth opening 354 is at an opposed end of the second bladder 340(2) relative to the third opening 353. The fourth opening 354 is shaped and dimensioned to receive one end 481 of the secondary fitting 480, and the third sheet is sealed to the one end of the secondary fitting 480 at the fourth opening 354.

The third bladder 340(3) is disposed in the gap 9 between the two groups of cassettes 20, and is adjacent to (e.g., end-to-end with) the second bladder 340(2) within the gap 9. Like the second bladder 340(2), the third bladder 340(3) resides below the first bladder 340(1). The third bladder 340(3) has a generally rectangular shape including a width that corresponds to a width of the gap in which it resides. The third bladder 340(3) is lower in height than the second bladder 340(2). The third bladder 340(3) may be formed, for example, by layering a laminated fifth sheet 345 with a laminated sixth sheet 346, and sealing the peripheral edge 356(3) of the fifth and sixth sheets 345, 346 along a seal line 348(3) to form a closed third interior space 358(3). The peripheral edge 356(3) may be sealed, for example via heat application. The third bladder 340(3) includes a single opening, e.g., a fifth opening 355 that is formed in the fifth sheet 345 at a location spaced apart from the seal line 348(3) of the third bladder 340(3). The fifth opening 355 is shaped and dimensioned to receive an opposed end 482 of the secondary fitting 480, and the fifth sheet 345 is sealed to the opposed end 482 of the secondary fitting 480 at the fifth opening 355.

Referring to FIGS. 61-64, the vent block 302 is in fluid communication with the interior spaces 358(1), 358(2), 358(3) of the pressure compensation device 330 and permits the interior spaces to communicate with the atmosphere surrounding the battery pack housing 2. The vent block 302 is a rectangular structure that is disposed on an outer surface of the battery pack lid 6. The vent block 302 includes a lid-facing end 304, an outward-facing end 306 that is opposed to the lid-facing end 304, and four sides 308, 310, 312, 314 that extend between the lid- and outward-facing ends 304, 306. The vent block 302 includes a longitudinal bore 318 that opens at the lid-facing end 304. The longitudinal bore 318 terminates within the vent block 302. The longitudinal bore 318 is threaded, and engages corresponding threads of the first end 381 of the first fitting 380, as discussed further below.

The vent block 302 includes a first transverse bore 322 that is perpendicular to the longitudinal bore 318 and intersects the longitudinal bore 318. The first transverse bore 322 opens on opposed first and third sides 308, 312 of the vent block 302. The opening 324 of the first transverse bore 322 on the vent block first side 308 is closed by a one-way valve 336. When closed, the one way valve 336 is impermeable to air and liquids. The one way valve 336 opens at a predetermined pressure, allowing fluid (e.g., air) to be released from the pressure management system 300. In one example, the one-way valve may be an umbrella valve. The opening 326 of the first transverse bore 322 on the vent block third side 312 is closed by a first fluid-impermeable plug 333.

The vent block 302 includes a second transverse bore 328 that is perpendicular to, and intersects both, the longitudinal bore 318 and the first transverse bore 322. The second transverse bore 328 opens on opposed second and fourth sides 310, 314 of the vent block 302. The opening 332 of the second transverse bore 328 on the vent block second side 310 is closed by a breather membrane 338. The breather membrane 338 permits passage of air, but prevents passage of liquid. In one example, the breather membrane 338 may be a polytetrafluoroethylene (PTFE) membrane. The opening 334 of the second transverse bore 328 on the vent block fourth side 314 is closed by a second fluid-impermeable plug 335.

The longitudinal bore 318 and the first and second transverse bores 322, 328 together define an internal vacancy 316 within the vent block 302.

A cap 339 having a generally cup shape overlies the vent block outward-facing end 306 and sides 308, 310, 312, 314. The cap 339 is secured to the vent block outward-facing end 306 via a fastener. The cap 339 is spaced apart from the vent block sides 308, 310, 312, 314 to ensure good ventilation, while shielding the one-way valve 336 and the breather membrane 338 from debris and/or damage.

Referring also to FIGS. 65 and 66, the primary fitting 380 provides fluid communication between the interior vacancy 316 of the vent block 302 and first interior space 358(1) defined by the first bladder 340(1). In addition, the primary fitting 380 provides fluid communication between the first interior space 358(1) and the second interior space 358(2) defined by the second bladder 340(2). The secondary fitting 480 provides fluid communication between the second interior space 358(2) and the third interior space 358(3) defined by the third bladder 340(3). The primary and secondary fittings 380, 480 will now be described in detail.

The primary fitting 380 provides fluid communication between the vent block internal vacancy 316, the interior space 358(1) of the first bladder 340(1) and the interior space 358(2) of the second bladder 340(2). The primary fitting 380 is an elongated tube that includes an open first end 381 that is connected to the vent block 302, and an open second end 382 that is opposed the first end 381 and is disposed in the second bladder 340(2). The primary fitting first end 381 has an external thread that engages the corresponding threads of the vent block longitudinal bore 318. The primary fitting 380 includes a sidewall 387 that extends between the first and second ends 381, 382. An inner surface of the sidewall 387 provides a longitudinal fluid passage 388. The longitudinal fluid passage 388 extends between the first and second ends 381, 382 of the primary fitting 380, and thus provides fluid communication between the interior space 316 of the vent block 302 and the second interior space 358(2). The primary fitting 380 includes a first transverse fluid passage 400 that is perpendicular to the longitudinal fluid passage 388, intersects the longitudinal fluid passage 388 and opens on opposed sides of the sidewall 387 at first sidewall openings 452 (1). In addition, the primary fitting 380 includes a second transverse fluid passage 450 that is perpendicular to the longitudinal fluid passage 388 and the first transverse fluid passage 400. The second transverse fluid passage 450 intersects the longitudinal fluid passage 388 and the first transverse fluid passage 400, and opens on opposed sides of the sidewall 387 at second sidewall openings 452(2). In use, the primary fitting 380 extends through the first bladder 340(1), with the first and second sidewall openings 452(1), 452(2) disposed in the first interior space 358(1). The first and second transverse fluid passages 400, 450 provide fluid communication between the interior space 316 of the vent block 302 and the first interior space 358(1).

The primary fitting 380 includes the first portion 440 that is disposed between the first and second sidewall openings 452(1), 452(2) and the first end 381 of the primary fitting 380. The first portion 440 corresponds to the location at which the primary fitting 380 is fluidly sealed to the bladder first opening 351. The first portion 440 includes a first flange 402 that is disposed in the first interior space 358(1) and faces the inner surface of the first sheet 341, and a first threaded portion 403 (threads not shown) that protrudes through the first opening 351. In addition, the first portion 440 includes a first seal assembly 404 that secures the first sheet 341 to the first flange 402 with a seal that is fluid-impervious. The first seal assembly 404 includes an elastic, flat washer-shaped gasket 406, a flat washer 408, and a nut 410. The gasket 406 is disposed between the first sheet 341 and the first flange 402. The nut 410 engages the first threaded portion 403 and secures the flat washer 408 against the outward facing surface of the first sheet 341, whereby the first sheet 341 and gasket 406 are clamped between the first flange 402 and the nut 410.

The first portion 440 has a greater diameter than the diameter of the primary fitting first end 381, whereby a shoulder 384 is provided at the transition between the two diameters. In use, the primary fitting 380 is disposed in the battery pack housing 2 with the first end 381 protruding through an opening in the pack housing lid 6. The first end 381 is received within, and engages the threads of, the vent block longitudinal bore 318 to an extent that the shoulder 384 engages an inner surface of the lid 6 via an intervening gasket. Thus, the primary fitting 380 and the vent block 302 cooperate to secure the primary fitting 380 and the vent block 302 to the battery pack housing 2.

In addition, the primary fitting 380 includes the second portion 442 that is disposed between the first and second sidewall openings 452(1), 452(2) and the second end 382 of the primary fitting 380. The second portion 442 corresponds to the location at which the primary fitting 380 is fluidly sealed to the bladder second opening 352. The second portion 442 includes a second flange 412 that is disposed in the first interior space 358(1) and faces the inner surface of the second sheet 342, and a second threaded portion 413 (threads not shown) that protrudes through the second opening 352. In addition, the second portion 442 includes a second seal assembly 414 that secures the second sheet 342 to the second flange 412 with a seal that is fluid-impervious. The second seal assembly 414 is substantially similar to the first seal assembly 404, and common elements are referred to with common reference numbers. In the second seal assembly 414, the gasket 406 is disposed between the second sheet 342 and the second flange 412. In addition, the nut 410 engages the second threaded portion 413 and secures the flat washer 408 against the outward facing surface of the second sheet 342, whereby the second sheet 342 and gasket 406 are clamped between the second flange 402 and the nut 410.

Figure 61:
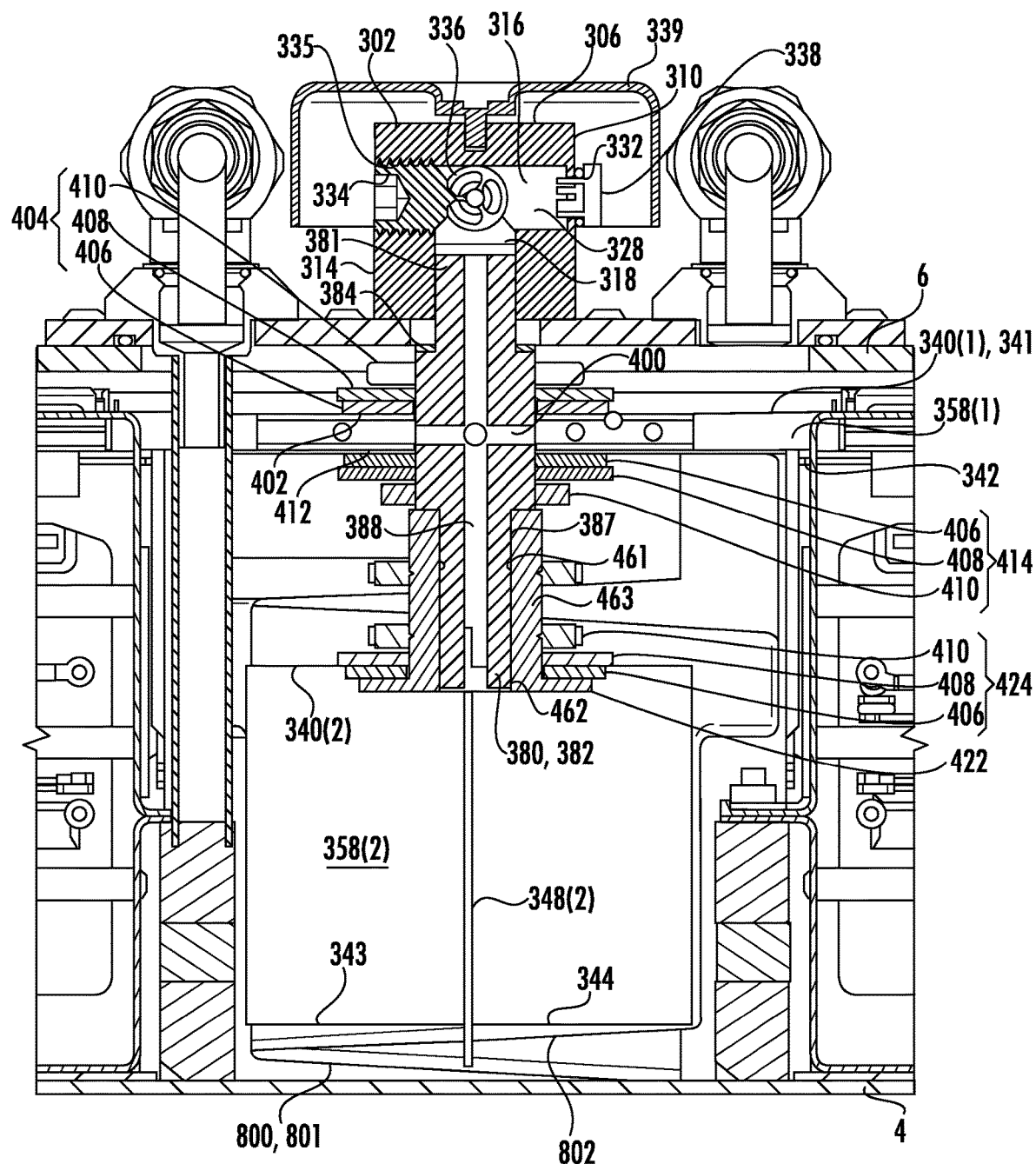
FIG. 61 is a cross sectional view of a portion of the battery pack showing detail of the primary fitting and vent block.
Figure 62:
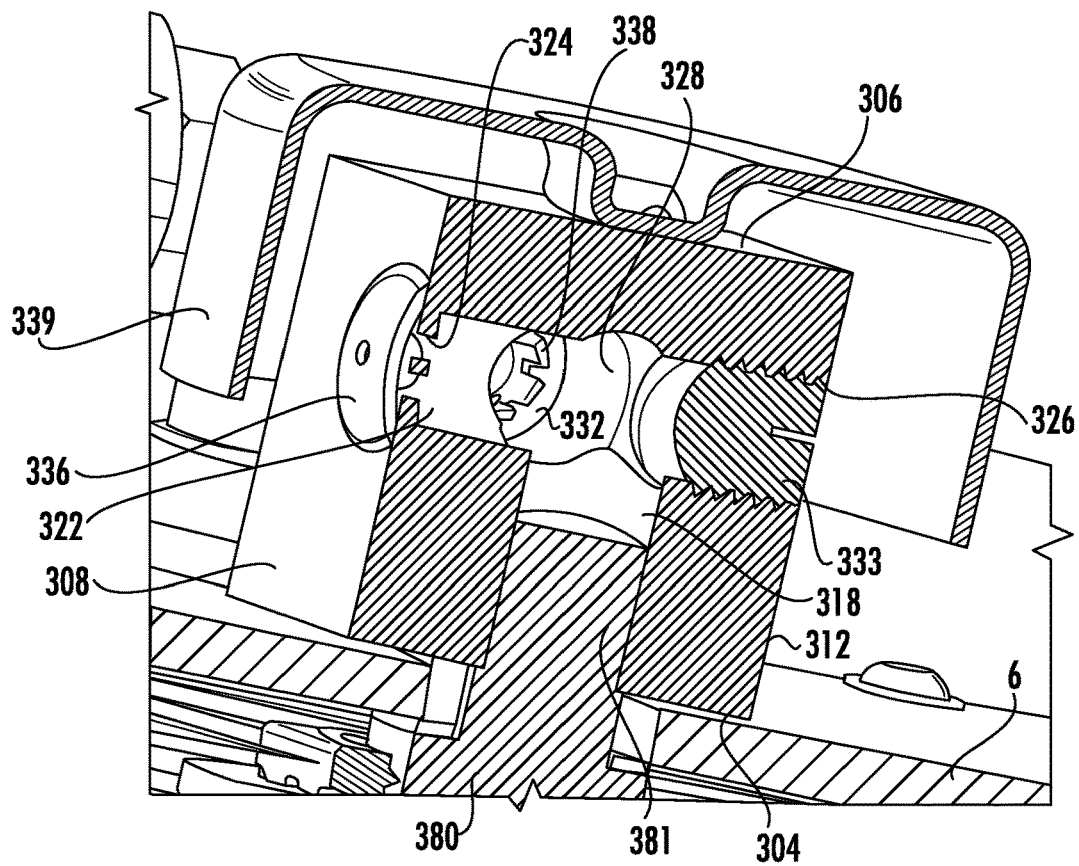
FIG. 62 is a cross sectional view of the vent block.
Figure 63:
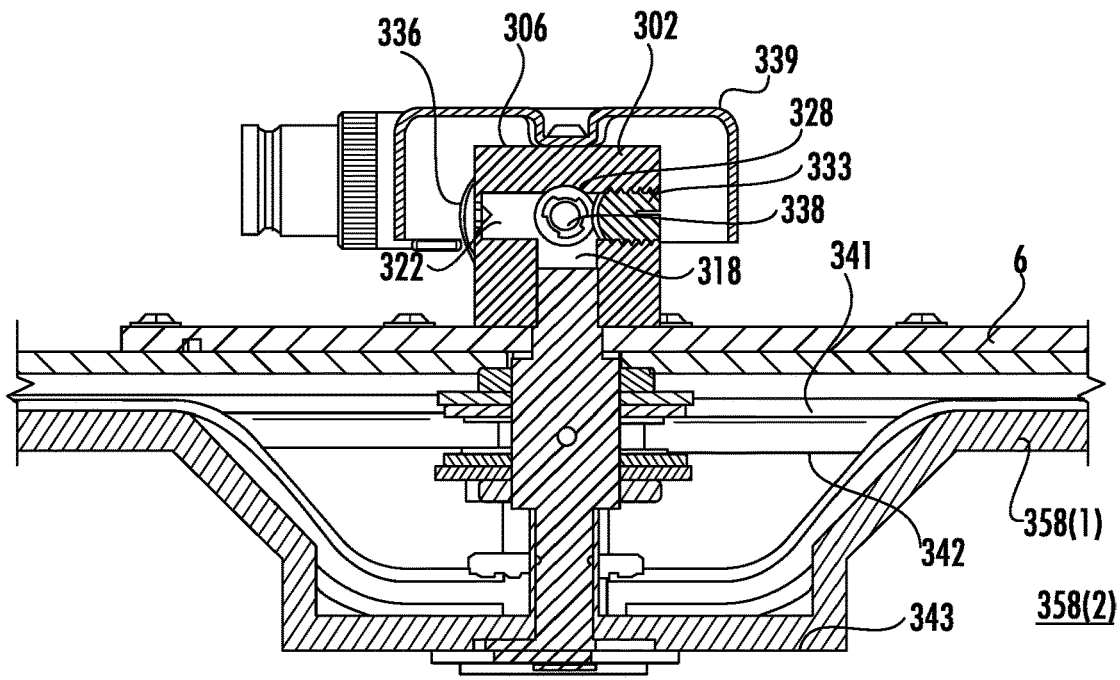
FIGS. 63 and 64 are additional cross sectional views of a portion of the battery pack showing detail of the primary fitting and vent block.
Figure 64:
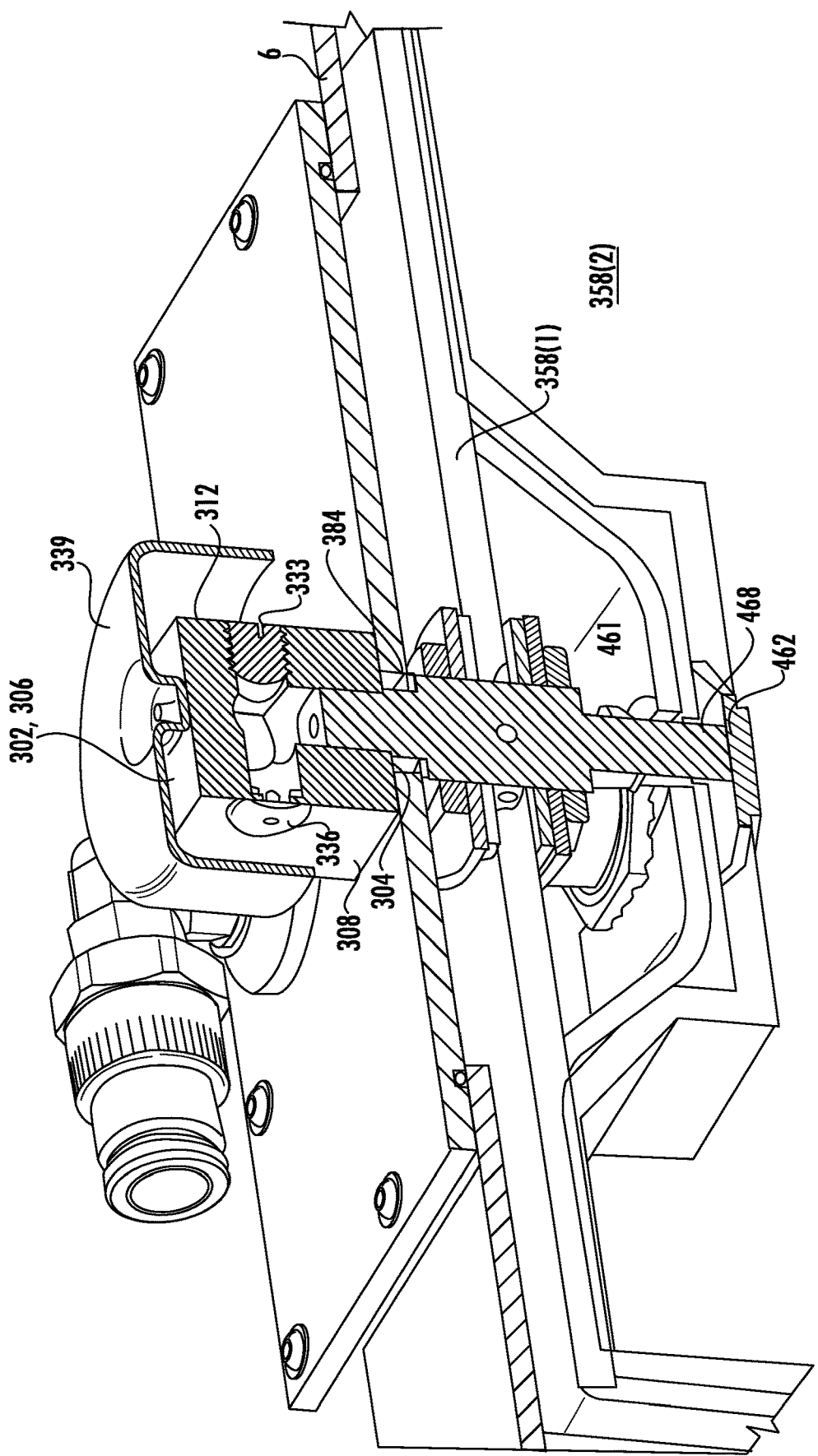

The primary fitting includes a third portion 466 that is disposed between the second portion 442 and the primary fitting second end 382. The third portion 466 includes a shank 468 that extends between the second portion 442 and the primary fitting second end 382, and a collar 463 that surrounds the shank 468. The shank 468 is free of external threads, and includes a pair of O-ring seals 461, 462 (FIG. 61, 64). Each seal 461, 462 is disposed in a circumferential groove 467, 469 so as to protrude outward relative to a surface of the shank 468. The seals 461, 462 are longitudinally spaced apart. The collar 463 has an inner surface 464 that is free of internal threads and engages the shank 468 via a slip fit connection in which the seals 461, 462 are compressed. As a result, the connection between the collar 463 and the shank 468 is also fluid impervious. The collar 463 has a threaded outer surface (threads not shown). In addition, the collar 463 has a distal end 465 that overlies the primary fitting second end 382. The collar distal end 465 includes a third flange 422. The third flange 422 is disposed in the second interior space 358(2) and faces the inner surface of the third sheet 343, and the threaded portion of the collar 463 protrudes through the third opening 353 (e.g., the opening at the proximal end of the second bladder 340(2)). In addition, the third portion 466 includes a third seal assembly 424 that secures the third sheet 343 to the third flange 422 with a seal that is fluid-impervious. The third seal assembly 424 is substantially similar to the first seal assembly 404, and common elements are referred to with common reference numbers. In the third seal assembly 424, the gasket 406 is disposed between the third sheet 343 and the third flange 422. In addition, the nut 410 engages the threaded outer surface of the collar 463 and secures the flat washer 408 against the outward facing surface of the third sheet 343, whereby the third sheet 343 and the gasket 406 are clamped between the third flange 422 and the nut 410. In this configuration, the primary fitting second end 382 is disposed in the interior space 382 of the second bladder 340(2), whereby the interior space 382 of the second bladder 340(2) is in fluid communication with the vent block 302 via the longitudinal fluid passage 388.

Figure 55:
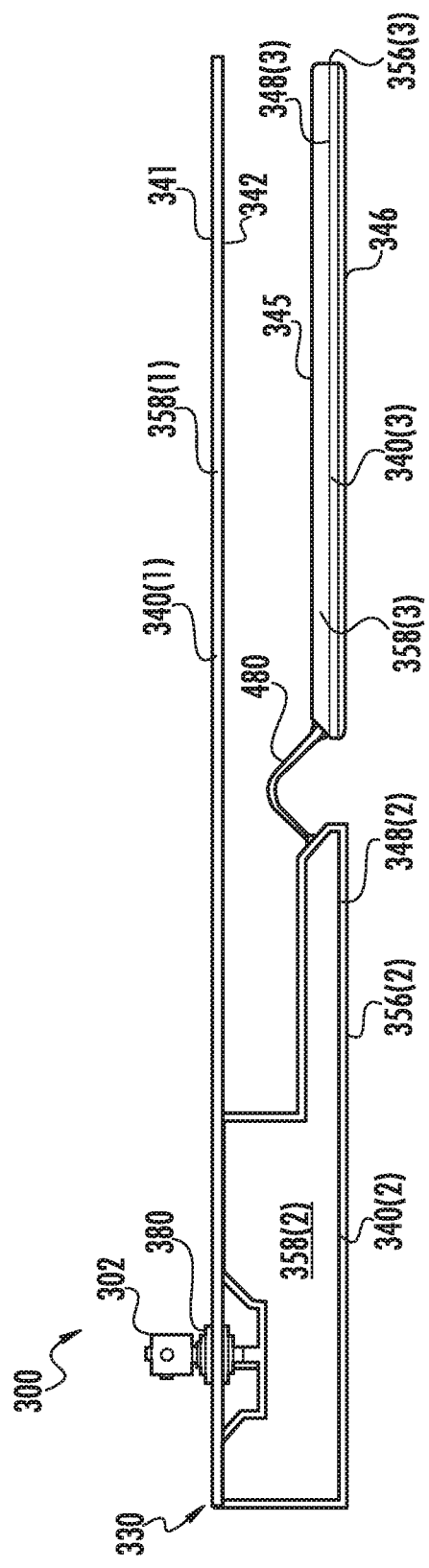
FIG. 55 is a side view of the isolated pressure management system.
Figure 56:
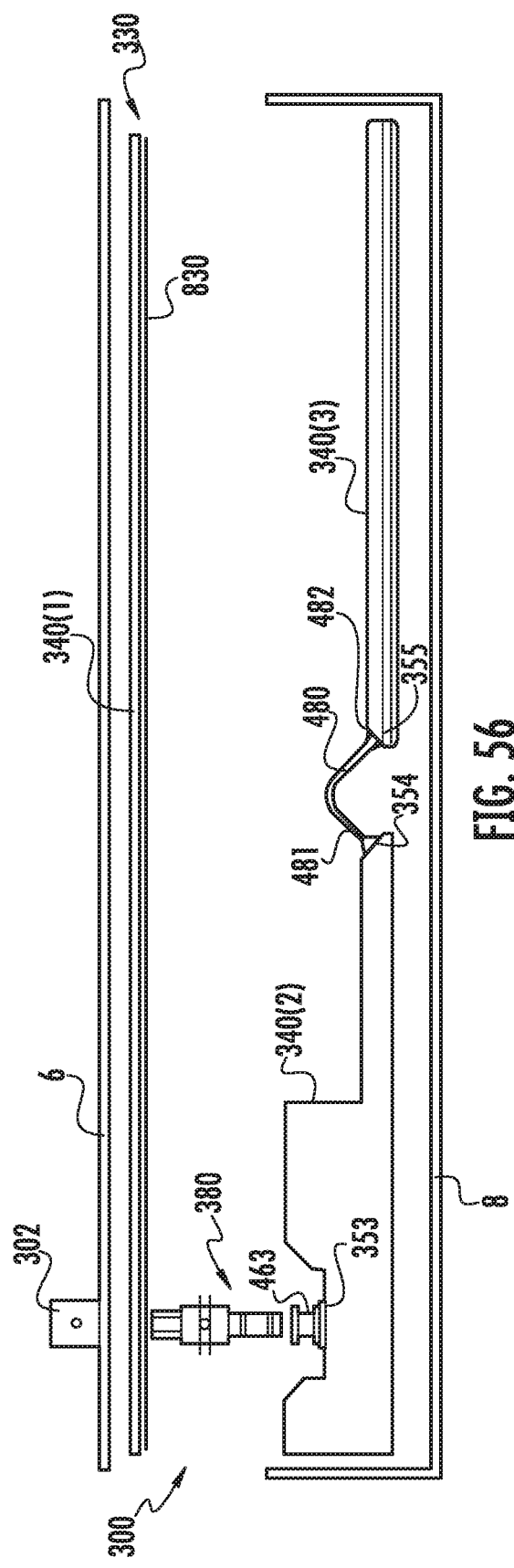
FIG. 56 is an exploded side view of the pressure management system showing relative positions of the lid and container portions of the battery pack housing.
Figure 57:
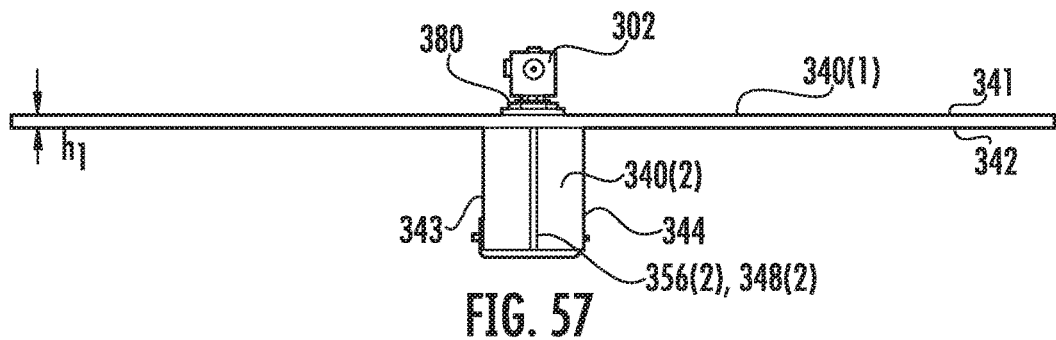
FIG. 57 is an end view of the isolated pressure management system.
Figure 58:
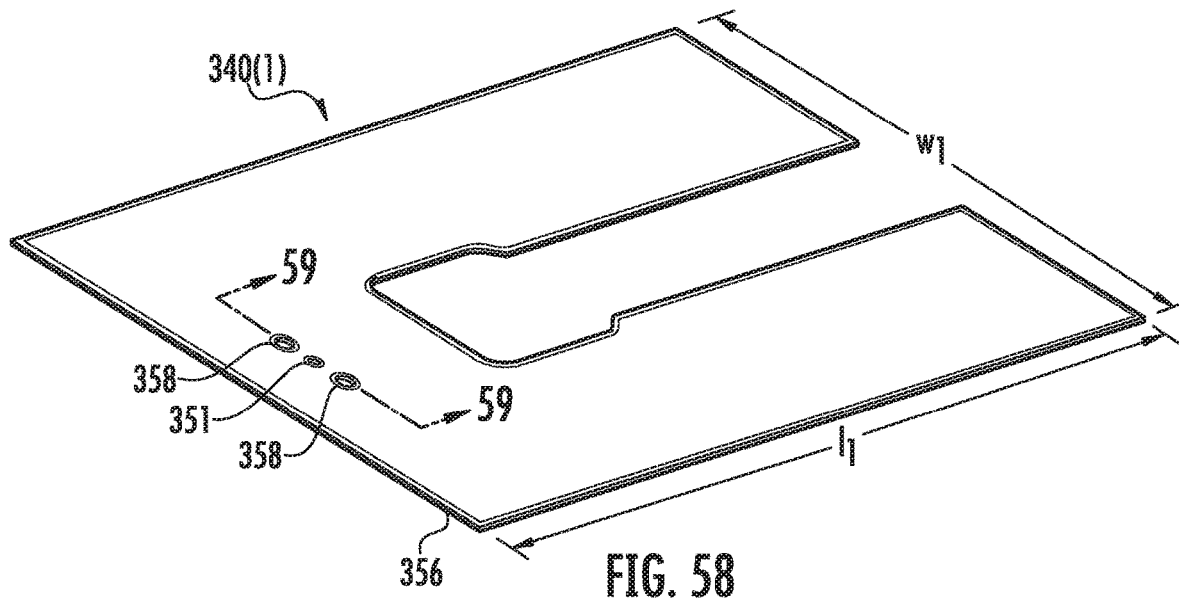
FIG. 58 is a top perspective view of the first bladder.
Figure 59:
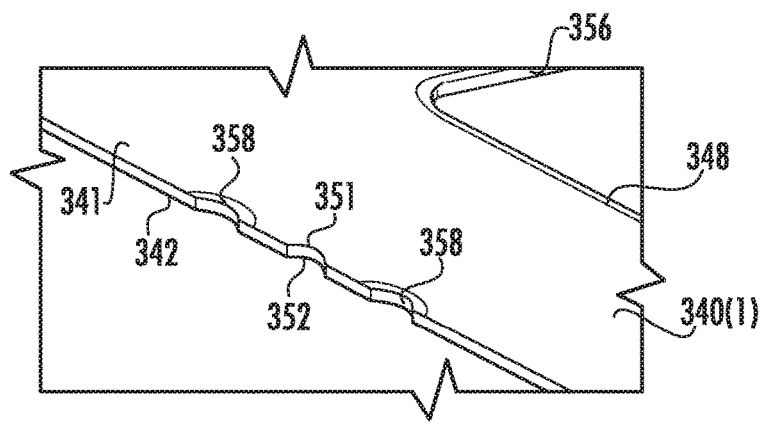
FIG. 59 is a cross sectional view of the first bladder as seen along line 59-59 of FIG. 58.
Figure 60:
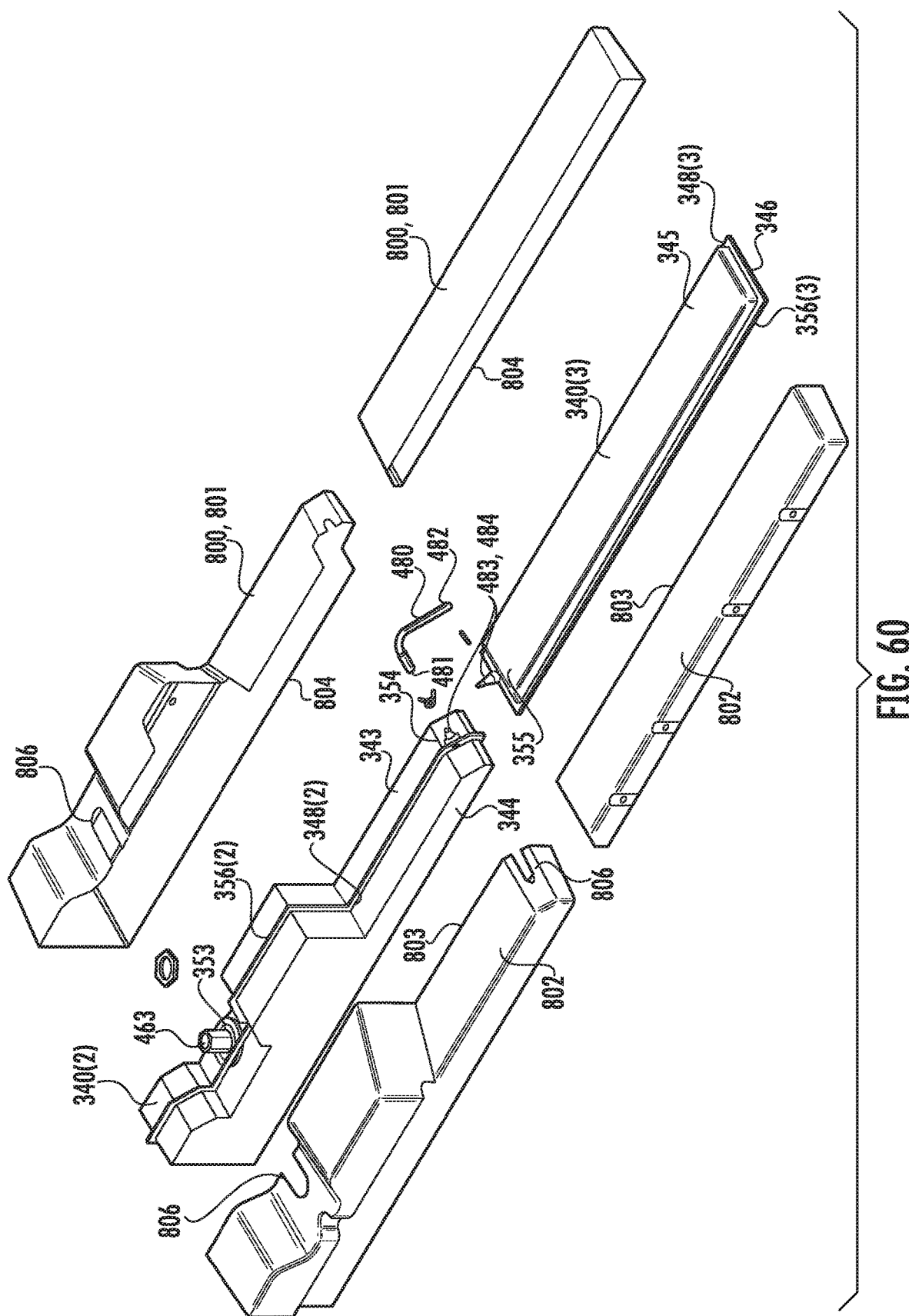
FIG. 60 is an exploded perspective view of the second and third bladders and protective shells.

Referring to FIGS. 55, 56 and 60, the secondary fitting 480 comprises a flexible tube that extends between the fourth opening 354 and the fifth opening 355, where the fourth opening 354 is the opening at the distal end of the second bladder 340(2), and the fifth opening 355 is the opening at the proximal end of the third bladder 340(3). Each of the opposed ends 481, 482 of the secondary fitting 480 includes a low-profile connector 483 that mechanically connects to a mating low-profile connector 484 provided in each of the fourth and fifth openings 354, 355. The connectors 483, 484 are mechanically engaged and provide a fluid-impervious connection.

As previously discussed, the bladders 340(1), 340(2), 340(3) are flexible so as to expand or contract to accommodate fluid volume changes due to the pressure and temperature conditions surrounding the battery pack housing 2. During expansion or contraction, the bladders 340(1), 340(2), 340(3) move relative to the inner surface of the battery pack housing 2, the cassettes 20 and other ancillary components disposed within the battery pack housing 2. In some embodiments, the bladders 340(1), 340(2), 340(3) are provided with fluid permeable protective structures that reduce the possibility of damage to the bladders 340(1), 340(2), 340(3) as they expand and contract within the battery pack housing 2. For example, the battery pack 1 may include a protective mesh sheet 830 (FIG. 56) that is disposed between the first bladder 340(1) and the cassettes 20. In another example, the battery pack 1 may include support shells 800 (FIG. 60) that enclose one or more of the bladders 340(1), 340(2), 340(3). In the illustrated embodiment, support shells 800 are used to protect the second and third bladders 340(2), 340(3).

Each support shell 800 includes a first half-shell 801, and a second half-shell 802 that is separable from the first half-shell 801. In cross section, each of the first half-shell 801 and the second half-shell 802 are generally U-shaped. The first and second half shells 801, 802 open toward each other, and the open end 803 of the second half-shell 802 is partially disposed inside the open end 804 of the first half-shell 801. As a result, the first half-shell 801 and the second half-shell 802 cooperate to form a segmented, hollow structure, in which the first half-shell 801 is freely movable relative to the second half-shell 802. That is, although the second half-shell 802 is partially disposed in the first half-shell 801, the first and second half-shells 801, 802 are only loosely engaged and are not secured to each other. As a result, the support shell 800 is fluid permeable to facilitate full exposure of the bladders 340(2), 340(3) to the engineered fluid that floods the battery pack housing 2.

The first and second half-shells 801, 802 include openings or cut outs 806 that permit the fittings 380, 480 to pass therethrough.

In the illustrated embodiment, the pressure compensation device 330 is a set of serially connected bladders 340. However, the pressure compensation device 330 is not limited being a set of serially connected bladders 340. For example, in some embodiments, the pressure compensation device 330 may be a single bladder. The number of bladders employed, and the shape and dimensions of the bladder(s) employed, are determined by the requirements of the specific application. In addition, the pressure compensation device 330 is not limited to being a flexible, expandable bladder 340. In other embodiments, the bladder(s) 340 may be replaced with one or more pistons or other appropriate devices.

Although the battery pack 1 is described above as being configured to provide relatively high voltage electrical power to a vehicle power train, the battery pack 1 is not limited to high voltage applications. For example, the battery pack 1 may be employed in low voltage applications, for example by reducing the number of battery modules and/or the number of cells within the modules. In another example, the battery pack 1 may be employed to provide electrical power to devices other than vehicles, such environmental control devices, etc.

Although the positive electrode 218 is described here as being electrically connected to the lid portion 205, and the negative electrode 220 is described here as being electrically connected to the container portion 204, it is understood that the cell 200 may alternatively be configured so that the positive electrode 218 is electrically connected to the container portion 204, and the negative electrode 220 is electrically connected to the lid portion 205.

In the battery module 40 described above, the positive terminal 214 of each cell 200 is connected to the alpha portion 140 of one bus bar assembly via the first electrical connector 160(1), and the negative terminal 216 of that cell 200 is connected to the alpha portion 140 of another bus bar assembly via the second electrical connector 160(2). In the battery module 40, the cells 200 are configured such that the cell positive terminal 214 corresponds to the cell lid portion 205, and the cell negative terminal 216 corresponds to the cell container portion 204. It is understood, however, that the cell 200 is not limited to this configuration. For example, in some embodiments, an alternative embodiment cell is configured such that the cell positive terminal 214 corresponds to the cell container portion 204 and the cell negative terminal 216 corresponds to the cell lid portion 205. In a battery module that includes the alternative embodiment cell, the first and second electrical connections 160(1), 160(2) may be configured such that the current carrying capacity of the first electrical connector 160(1) is greater than the current carrying capacity of the second electrical connector 160(2).

Although the current carrying capacities of the electrical connectors 160(1), 160(2) are asymmetric in the above described embodiments, the battery module 40 is not limited to this configuration. For example, in other embodiments, the current carrying capacity of the first electrical connector 160(1) is the same as the current carrying capacity of the second electrical connector 160(2), e.g., the current carrying capacities of the electrical connectors 160(1), 160(2) are symmetric.

Selective illustrative embodiments of the battery module and current collectors are described above in some detail. It should be understood that only structures considered necessary for clarifying the battery module and current collectors have been described herein. Other conventional structures, and those of ancillary and auxiliary components of the battery module and current collectors, are assumed to be known and understood by those skilled in the art. Moreover, while working examples of the battery module and current collectors have been described above, the battery module and current collectors are not limited to the working examples described above, but various design alterations may be carried out without departing from the devices as set forth in the claims.

We claim:

1. A battery pack comprising:
 a battery pack housing having a lid joined to an open end via a fluid-impermeable seal;
 a battery module disposed within the battery housing and comprising a plurality of electrochemical cells; and
 a pressure compensation device positioned within the battery pack housing, the pressure compensation device comprising a first bladder fluidly coupled to a second bladder by a primary fitting,
  wherein the battery pack housing is filled with a dielectric fluid, and
  wherein the pressure compensation device comprises a second fluid.

2. The battery pack of claim 1, further comprising a third bladder fluidly coupled to the second bladder by a secondary fitting.

3. The battery pack of claim 1, wherein the first bladder is at least partially positioned between the lid and the battery module.

4. The battery pack of claim 1, wherein the primary fitting protrudes through the lid of the battery housing and is coupled to a vent block having a bore positioned outside of the battery pack housing, wherein the bore opens at a predetermined fluid pressure.

5. The battery pack of claim 1, wherein the second bladder is disposed around the battery module.

6. The battery pack of claim 2, wherein at least two battery modules are grouped together as a cassette, and the second bladder is disposed around the cassette.

7. The battery pack of claim 6, wherein the battery pack comprises a first pair of cassettes, and the second bladder is disposed between the cassettes of the first pair of cassettes.

8. The battery pack of claim 7, further comprising a second pair of cassettes, and the third bladder is disposed between the cassettes of the second pair of cassettes.

9. The battery pack of claim 2, wherein at least one of the first bladder, the second bladder, and the third bladder comprises a pair of metal-and-polymer laminated sheets coupled together along a seal line.

10. The battery pack of claim 9, wherein the pair of metal-and-polymer laminated sheets are coupled together along the seal line via heating.

11. The battery pack of claim 2, wherein the secondary fitting comprises a flexible tube.

12. The battery pack of claim 1, further comprising a protective sheet positioned between the first bladder and the battery module.

13. The battery pack of claim 1, wherein at least one of the first bladder and the second bladder comprises a fluid permeable support shell.

14. The battery pack of claim 13, wherein the support shell comprises a first half-shell and a second-half shell positioned around a corresponding bladder.

15. A battery pack comprising:
 a battery pack housing having a lid joined to an open end via a fluid-impermeable seal;
 a cassette disposed within the battery housing comprising at least a pair of battery modules, wherein each of the battery modules comprise a plurality of electrochemical cells; and
 a pressure compensation device positioned within the battery pack housing, the pressure compensation device comprising:
  a first bladder at least partially positioned between the lid and the cassette,
  a second bladder fluidly coupled to the first bladder by a primary fitting and disposed at least partially around the cassette, and
  a third bladder fluidly coupled to the second bladder by a secondary fitting,
  wherein the battery pack housing is filled with a dielectric fluid,
  wherein the pressure compensation device comprises a second fluid,
  wherein the primary fitting protrudes through the lid of the battery housing and is coupled to a vent block having a bore positioned outside of the battery pack housing, and
  wherein the bore opens at a predetermined fluid pressure.

16. The battery pack of claim 15, wherein the battery pack comprises a first pair of cassettes, and the second bladder is disposed between the cassettes of the first pair of cassettes.

* * * * *